United States Patent
Duncan

(10) Patent No.: US 11,662,106 B2
(45) Date of Patent: May 30, 2023

(54) HIGH EFFICIENCY DEHUMIDIFICATION SYSTEM AND METHOD

(71) Applicant: Scot M. Duncan, Laguna Hills, CA (US)

(72) Inventor: Scot M. Duncan, Laguna Hills, CA (US)

(73) Assignee: Scot M. Duncan, Laguna Hill, CA (US)

( * ) Notice: Subject to any disclaimer, the term of this patent is extended or adjusted under 35 U.S.C. 154(b) by 0 days.

(21) Appl. No.: 16/975,071

(22) PCT Filed: Feb. 21, 2019

(86) PCT No.: PCT/US2019/019035
§ 371 (c)(1),
(2) Date: Aug. 21, 2020

(87) PCT Pub. No.: WO2019/165133
PCT Pub. Date: Aug. 29, 2019

(65) Prior Publication Data
US 2021/0131681 A1    May 6, 2021

Related U.S. Application Data

(60) Provisional application No. 62/634,621, filed on Feb. 23, 2018.

(51) Int. Cl.
*F24F 3/153* (2006.01)
*B01D 53/26* (2006.01)
(Continued)

(52) U.S. Cl.
CPC ............ *F24F 3/153* (2013.01); *B01D 53/265* (2013.01); *F24F 3/044* (2013.01); *F24F 3/14* (2013.01);
(Continued)

(58) Field of Classification Search
CPC .............. F24F 3/153; F24F 2003/1452; F24F 2003/1446; F24F 11/83; F24F 11/84; F24F 11/85
See application file for complete search history.

(56) References Cited

U.S. PATENT DOCUMENTS 2,160,389 A    5/1939    Palmer
2,200,118 A    5/1940    Miller
(Continued)

FOREIGN PATENT DOCUMENTS

JP    59-200140 A    11/1984
JP    S61-76232 U    5/1986
(Continued)

OTHER PUBLICATIONS

Chauhan, S.S. et al. (Sep. 1, 2016, e-published Jun. 2016), "Parametric analysis of a combined dew point evaporative-vapour compression based air conditioning system," Alexandria Engineering Journal, vol. 55, Issue 3, pp. 2333-2344.
(Continued)

*Primary Examiner* — Christopher R Zerphey
(74) *Attorney, Agent, or Firm* — Mintz, Levin, Cohn, Ferris, Glovsky and Popeo, P.C.

(57) ABSTRACT

This document describes a high efficiency dehumidification system (HEDS) and method of operating the same. The HEDS systems and physical implementations can include a variety of equipment, such as fans, filtration systems, fluid-conveying coils, piping or tubing, heat transfer coils, vents, louvers, dampers, valves, fluid chillers, fluid heaters, or the like. Any of the implementations described herein can also include controls and logic, responsive to one or more sensors or other input devices, for controlling the equipment for each implementation described herein.

20 Claims, 52 Drawing Sheets

(51) Int. Cl.

| | | |
|---|---|---|
| *F24F 3/044* | (2006.01) | |
| *F24F 3/14* | (2006.01) | |
| *F24F 5/00* | (2006.01) | |
| *F24F 11/84* | (2018.01) | |
| *F24F 11/85* | (2018.01) | |

(52) U.S. Cl.
CPC .............. *F24F 3/1405* (2013.01); *F24F 5/00* (2013.01); *F24F 11/84* (2018.01); *F24F 11/85* (2018.01)

(56) References Cited

U.S. PATENT DOCUMENTS

| | | | |
|---|---|---|---|
| 2,286,604 A | 6/1942 | Crawford | |
| 2,299,531 A | 10/1942 | Crawford | |
| 2,515,825 A | 7/1950 | Grant | |
| 2,928,260 A | 3/1960 | Blum | |
| 3,625,022 A | 12/1971 | Johnson | |
| 4,271,678 A | 6/1981 | Liebert | |
| 4,380,910 A | 4/1983 | Hood et al. | |
| 4,407,134 A | 10/1983 | Snaper | |
| 4,427,055 A | 1/1984 | Heavener | |
| 4,559,788 A | 12/1985 | McFarlan | |
| 4,667,479 A | 5/1987 | Doctor | |
| 4,920,756 A | 5/1990 | Howland et al. | |
| 4,942,740 A | 7/1990 | Shaw et al. | |
| 5,031,411 A | 7/1991 | Gehring et al. | |
| 5,193,352 A | 3/1993 | Smith et al. | |
| 5,337,577 A | 8/1994 | Eiermann | |
| 5,390,505 A | 2/1995 | Smith et al. | |
| 5,540,058 A | 7/1996 | Yi et al. | |
| 5,607,011 A | 3/1997 | Abdelmalek | |
| 5,613,372 A | 3/1997 | Beal et al. | |
| 5,802,862 A * | 9/1998 | Eiermann | F24F 3/14 62/185 |
| 5,816,066 A | 10/1998 | Aoki et al. | |
| 5,953,926 A | 9/1999 | Dressier et al. | |
| 6,260,366 B1 | 7/2001 | Pan | |
| 6,269,650 B1 | 8/2001 | Shaw | |
| 6,694,757 B1 * | 2/2004 | Backman | F24F 3/153 62/176.6 |
| 6,826,921 B1 | 12/2004 | Uselton | |
| 6,976,365 B2 | 12/2005 | Forkosh et al. | |
| 7,219,505 B2 | 5/2007 | Weber et al. | |
| 7,231,774 B2 | 6/2007 | Taras et al. | |
| 8,151,579 B2 * | 4/2012 | Duncan | F28F 1/00 62/96 |
| 8,408,015 B2 | 4/2013 | Duncan | |
| 8,514,572 B2 | 8/2013 | Rogers | |
| 8,534,346 B1 | 9/2013 | Mecozzi | |
| 8,783,053 B2 | 7/2014 | McCann | |
| 8,794,002 B2 | 8/2014 | Held et al. | |
| 9,091,450 B2 | 7/2015 | Ritchie | |
| 9,638,472 B2 | 5/2017 | Duncan | |
| 10,260,761 B2 | 4/2019 | Martin | |
| 10,551,078 B2 * | 2/2020 | Eiermann | F24F 11/83 |
| 10,829,370 B2 | 11/2020 | Collins | |
| 2003/0061822 A1 | 4/2003 | Rafalovich | |
| 2003/0221438 A1 | 12/2003 | Rane et al. | |
| 2004/0065099 A1 | 4/2004 | Grabon et al. | |
| 2006/0218949 A1 | 10/2006 | Ellis et al. | |
| 2009/0064692 A1 | 3/2009 | Duncan | |
| 2011/0232319 A1 | 9/2011 | Hanson | |
| 2014/0048244 A1 | 2/2014 | Wallace | |
| 2016/0273815 A1 | 9/2016 | Downie et al. | |

FOREIGN PATENT DOCUMENTS

| | | |
|---|---|---|
| JP | S61-89763 U | 6/1986 |
| JP | S63-279035 A | 11/1988 |
| JP | 7-233968 A | 9/1995 |
| JP | H9-287797 A | 11/1997 |
| JP | 2002-61903 A | 2/2002 |
| JP | 2002-267206 A | 9/2002 |
| JP | 2004-12016 A | 1/2004 |
| JP | 2005-069552 A | 3/2005 |
| JP | 2005-207712 A | 8/2005 |
| JP | 2005-211742 A | 8/2005 |
| JP | 2006-177567 A | 7/2006 |
| JP | 2006-207856 A | 8/2006 |
| JP | 2006-292299 A | 10/2006 |
| JP | 2007-064556 A | 3/2007 |
| JP | 2016-194383 A | 11/2016 |

OTHER PUBLICATIONS

Dean, J. et al. (Nov. 1, 2012), "Dew Point Evaporative Comfort Cooling Energy and Water Projects Demonstration Plan SI-0821," pp. 1-198, XP055844829, URL:https://www.nrel.gov/docs/fyl3osti/562 56-1.pdf. [Retrieved on Sep. 27, 2021].

Machine Translation of JP 2004-012016, PAJ, "Air Conditioner and its Operation and Method," description. 9 pages, Jan. 15, 2004.

Machine Translation of JP 2005-069552 to Kimuro, PAJ, Mar. 17, 2005. "Water Heat Source Heat Pump Unit." 13 pages.

Notice of Reasons for Rejection issued in Japanese Application No. 2010-524203, dispatch date Nov. 5, 2013. 4 pages.

\* cited by examiner

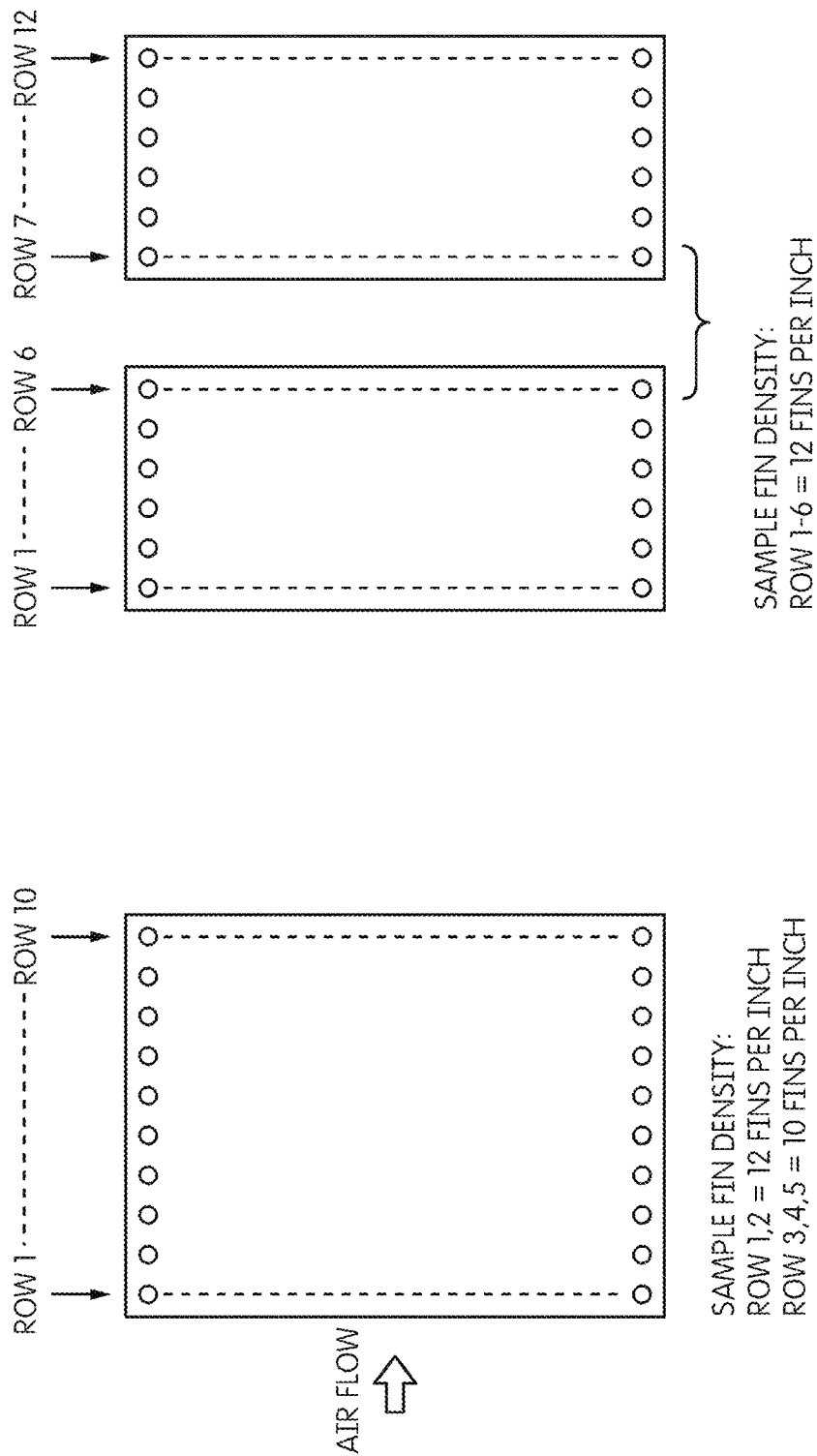

HIGH EFFICIENCY DEHUMIDIFICATION SYSTEM AND METHOD

CROSS-REFERENCE TO RELATED APPLICATIONS

This application claims priority to U.S. Provisional Patent Application No. 62/634,621, filed Feb. 23, 2018, and titled "High Efficiency Dehumidification System and Method," the entirety of which is incorporated by reference herein.

BACKGROUND

Existing coil and dehumidification unit designs commonly implemented for cooling, dehumidification and reheat duties have a number of drawbacks.

Common problems created by industry standard cooling coil, cooling unit, cooling systems and HVAC designs include, but are not limited to: high airside pressure drop; excessive cooling coil vertical height that creates a condensate "stacking" effect; inadequate numbers of coil rows can create a condensate stacking effect; inadequate and poorly designed cooling coil drain pans; excessive air velocity across the coil sections during deep dehumidification duties; excessive liquid water (condensate) being carried off of the coil into the unit and downstream ductwork; and condensate carry-off being re-evaporated into the airstream; condensate being carried off and re-evaporated off of the cooling coil and drain pan systems due to compressor cycling on and off; condensate being carried off and re-evaporated off of the cooling coil and drain pan systems due to temperature swings; inability to unload far enough to provide proper temperature and RH control when loads are light; energy waste, excessive water and chemical consumption; excessive energy rejection to, or withdrawal from, ground coupled HVAC systems; undersized ductwork and air distribution terminal units; and other common system design and operational problems.

High airside air pressure drop across the coils, usually between 0.8 inches of water column and 1.2 inches of water column contribute to energy waste, condensate carry off from the coils, and system operational and performance problems. Excessive coil vertical height, which creates a condensate "stacking" effect, whereby the condensate is being produced at a faster rate than it can be drained out of the coil surface area can create or contribute to a number of problems. Condensate can partially or completely block the airflow through significant area of the coil, so little or no air passes through the water-logged coil section and heat transfer between the air and the cooling fluid contained within the cooling coil tubing is minimized.

Major HVAC equipment manufacturers do not seem to be aware of this situation—they rate the capacity of a 4' tall coil the same as they rate the capacity of two 2' tall coils. In the real world, the performance is not the same. Design engineers routinely size their coils at greater than 450 feet per minute, with most designs being above 500 feet per minute and even up to and higher than 550 feet per minute face velocities across the heat transfer surface area.

When sections of a coil finned surface area become partially or fully water saturated with condensed moisture, several negative things happen. The air velocity through that section of the coil are reduced, or even dropped to zero, due to the added air pressure drop across the coil caused by the condensed water being held in the coil heat transfer fin pack. When the air velocity through that section of the coil is reduced due to the higher air pressure drop through that section caused by the water being held in the finned surface area of the coil, the air that does pass through that section of the coil has more contact time with the finned heat transfer area of the coil, so a greater level of condensate generation per CFM of airflow occurs through that coil section, making the condensate problem worse.

When the air velocity through one section of a coil is reduced due to partial or full water saturation of that coil section, the air velocity through the remaining coil face area must be increased in order to deliver the same volume of air from the unit. The higher air velocity through the coil causes the air pressure drop through the cooling coil to increase significantly. This higher airflow/coil face velocity can increase to the point that the condensed water is actually blown or pulled off of the coil and into the unit and downstream ductwork or occupied spaces. The higher air pressure drop can cause the fan power draw to increase, wasting energy, or, if it is a constant air volume (CAV) fan with no means to control air flow as systems pressure drops rise and fall, the actual air flow rate being delivered to the spaces will be decreased. In hospitals and other critical facilities that rely on constant air flows to maintain pressure relationships, this can cause life-threatening problems.

Air velocities that are too high, or that are higher than design air velocities, negatively impact the performance of Ultraviolet Germicidal Irradiation (UVGI), Photo Catalytic Oxidation (PCO) and other chemical-biological mitigation measures as air contact time with the technologies is minimized. Air contact time is important to many of these technologies.

When the airflow through a coil section is partially or completely blocked, the cooling fluid on the inside of the coil heat transfer tubing is not coming in contact with the air (load) via the finned heat exchanger surface area to the extent required to properly and effectively transfer heat from the air in contact with the finned surface area to the chilled fluid contained inside the coil tubing. Accordingly, the chilled fluid temperature rise can be reduced in a significant manner, creating energy waste and operational problems on several levels.

This problem can be a big contributor to the "Low Delta T Syndrome". The Low Delta T Syndrome exists when the chilled fluid temperature differential between the fluid being supplied and the fluid being returned to the cooling plant is less than the design temperature differential, and can cause significant energy waste in the chiller plant and overall HVAC systems, and this problem, in and of itself, can contribute to mold growth in the equipment, ductwork and facility.

In the case of an excessive condensate flow rate actually blocking airflow through a section of a coil, there is zero heat transfer between the air and the chilled fluid contained within the coil tubing, since there is no air in contact with the finned surface area of the coil where it is water saturated. The chilled fluid inside the tubing is essentially only in heat transfer contact with condensed water on the exterior of the coil, so the chilled fluid is only cooling condensate down, and the condensate is about to be sent into the condensate drain system. No useful work will occur in that section of the coil, and in fact it is very detrimental to HVAC system operations. The condensate is already very cold, so the chilled fluid inside the heat transfer tubing that is in contact with the condensate may only experience a temperature rise of 1° F. to 3° F., vs. a typical design temperature rise of 10° F. to 16° F.

A higher chilled fluid flow rate is required for several reasons—there is a greater dehumidification load than required, due to the need to sub-cool air to deliver the required cooling capacity to the loads. Further, latent cooling requires a higher chilled fluid flow rate than sensible cooling. A potentially significant portion of the chilled fluid flow through the coil is experiencing a very low temperature differential and doing near zero effective work with the chilled fluid.

When a section of a coil is partially or fully blocked by condensate stacking, the air velocity increases through the remaining coil surface area. Coil air pressure drop is an essentially squared function with air face velocity through a coil, so if the bottom 8" of a 48" tall coil bank are saturated with condensed moisture, the face velocity through the remaining coil area can be increased by a factor of (48"/(48"−8"))=1.2. The air pressure drop is a squared function of that, so, (1.2)^2=1.44, or a 44% increase in the air pressure drop can occur. A 0.8" air pressure drop coil has just become a 1.15" air pressure drop coil, which can either require more fan energy, or reduce the amount of air available to cool the space if the fan system cannot provide the design airflow through the coil at that higher air pressure drop.

In this example, the coil is losing approximately 20% of the available air flow area, so the air flow velocity through the coil has increased by approximately 20%. There is a high likelihood that condensed moisture will be carried off of this coil, starting very near the top of the coil, all the way down to where the condensed moisture water blockage occurs.

If the higher air pressure drop through the coil section cannot be accommodated by higher fan speeds and higher fan energy to blow the required amount of air into the HVAC system, the amount of cooling capacity at that supply air temperature setpoint can be inadequate to meet the needs of the loads. The standard solution to not having enough air flow to cool a space is to reduce the supply air temperature setpoint to try to meet the loads with a lower volume of colder air.

Reducing the supply air temperature setpoint can make the condensed water carry-off and low chilled fluid system temperature differential problems even worse. As the supply air temperature setpoint is reduced, a higher volume of chilled fluid must be circulated through the coil, and even more condensate can be created due to the lower average chilled fluid temperatures inside the coil tubing and at the coil finned heat transfer surface. This increased amount of condensate can further reduce the coil finned area that is available to cool the air, which creates higher air velocities through the coils, which then causes a greater volume of condensate to be carried off of the coils. A lower air temperature setpoint will require an even higher volume of chilled fluid, and the higher chilled fluid volumes will result in an even lower chilled fluid temperature differential. Thus, the problem compounds itself.

Industry standard cooling coil and cooling unit designs further include the problem of high air pressure drop of air filters downstream of the cooling coil system(s) causing wasted fan energy, as well as condensation of moisture in the filter bank.

In many applications, post-AHU air filtration is required by Code authorities, or by the needs of the process that is being served by the AHU. In typical designs, the air filters exhibit a very high air face velocity, and a corresponding high air pressure drop. As the air filters do their job, they filter dirt and other particles and life forms out of the air, which further increases the air pressure drop through the air filters. A dirty air filter can exhibit an air pressure drop that is two to three times greater than the clean filter air pressure drop. When air experiences a drop in pressure, a drop in temperature accompanies this pressure drop. When air temperature is reduced, condensation can form inside the air filters and downstream from the air filters if the air was close to the dewpoint temperature. This can occur even if there is no condensate being carried off of the cooling coils.

Additionally, there are no perfectly tuned HVAC control systems, or chiller and compressor equipment, so temperature cycling (swings) can and do occur. Chiller compressors and DX systems that have stages of capacity, rather than fully modulated control down to 0% loads can and do abruptly change chilled water supply temperatures which affects AHU supply air temperatures as the staging up and down occurs, chillers and compressors with various forms of unloading or capacity control, such as hot gas bypass, can exhibit erratic temperature control, even changes in the condensing temperature and pressure can change chiller capacity and chiller supply water temperatures. When chillers or compressors are staged on and off, the plant leaving water temperatures or AHU supply air temperatures can change to a great degree. Some control systems are designed to allow the CHWS temperature or AHU supply air temperature to increase by several degrees before another stage of cooling is added. Control valves and thermal expansion valves and electronic expansion valves for heat transfer coils are rarely tuned to cover the entire breadth of operating conditions that are experienced—they may be tuned for full load, and not perform well at low loads or vice versa. All of these things and many others, conspire to create temperature swings in the supply air temperature leaving the AHU's. When the air temperature is below setpoint, the equipment, filters, ductwork, insulating systems and the like are all driven to a low temperature. When the air temperature swings above setpoint, less dehumidification occurs, and even re-humidification from water in the coil fin pack and drain pan, and when the warmer, wetter air comes in contact with the colder surface areas, if the dewpoint temperature of the air is above the surface temperature of the equipment, filters, ductwork, insulation systems, etc., condensation will occur.

Industry standard cooling coil and cooling unit designs further include the problem of excessive chilled fluid volume flow rates being required for dehumidification duties. Typically sized and designed cooling coils require significantly greater volumes of chilled fluid to meet dehumidification needs. This creates a "Low Delta T Syndrome" with significant negative energy and capital cost consequences.

The inherent design of DX systems makes them relatively poor at performing latent cooling duties. Many DX based air conditioning systems use 3 or 4 row cooling coils, and relatively high air velocities, which are both detrimental to meeting latent cooling loads.

A substantial amount of cooling coil surface area must be dedicated to creating "superheat". Superheat is heat added to the refrigerant, after it has been evaporated and turned into a gas, and is required to ensure that liquid refrigerant, in any form, never makes it back to the compressor.

For these reasons, DX based systems have even less effective surface area for latent cooling than would be expected because of their fewer rows and higher air velocities.

Further problems include high approach temperatures between the cooling fluid leaving the coil and the air temperature entering the cooling coil. This creates energy waste and unstable temperature control in real world applications.

Smaller coils with less heat transfer liquid thermal mass are much more susceptible to temperature swings than larger coils. A "typical" coil may have 75% less heat transfer fluid mass when compared to coils described herein.

Other problems include: potential mismatch between the amount of sensible and latent cooling needed for dehumidification duties; numbers of rows of coil tubing and finned heat exchanger surface are typically inadequate for dehumidification duties; or undersized and improperly designed coils require a high approach temperature between the air entering the coil and the water leaving the coil.

As coils and their heat transfer fins age, corrosion, dirt and biological growth can further degrade performance that was most likely inadequate in the first place, so the problems become worse over time. This can create situations where control systems are unable to maintain stable dry bulb temperature, dew point temperature and relative humidity control.

Most installed cooling/dehumidification systems do not operate well or consistently at low loads, especially with high pressure/temperature differentials between the refrigerant suction pressure/temperature and the refrigerant condensing pressure/temperature. These conditions are called low load/high lift conditions. Under low load/high lift conditions, the compressors need to be "false loaded" to a very significant degree to keep them operational and stable, but many/most HVAC systems are not equipped with an effective means to add load to the compressor while still maintaining proper temperature/RH/load control. Some compressors cannot unload effectively below 30% to 40% capacity, even when the cooling/dehumidification load being presented to them is 10% or lower. This causes several undesirable things to occur. Most installed DX based compressors for homes, apartments, hotels, barracks etc. have single stage capacity control, the compressor is either on, or it is off, with capacity control being provided by the refrigerant expansion valves, but the compressor is still running at full speed.

Conventional HVAC systems might use a typical air cooled, direct expansion (DX), single zone, single compressor, HVAC design operating on a humid day, under less than 100% continuous load conditions, which is where it will run 99% of the time during the dehumidification season. The compressor(s) is (are) controlled based on a thermostat, or combined thermostat/humidistat to maintain conditions in the spaces being served. If the temperature or humidity exceeds the desired setpoint, the compressor can be started and cooling/dehumidification process will start.

With a typical HVAC design, the built-in controls contain an "anti-recycle timer" which keeps the compressor from experiencing too many start/stop cycles per hour to protect the equipment from damage, motor over-heating and the like. They are also equipped with built in safeties that look at the refrigerant temperatures and pressures and the safeties will shut the compressors off if the evaporator refrigerant pressure/temperature gets too low/cold, or if the condenser pressure/temperature gets too high/hot.

The typical HVAC system design in this example stages the compressor on and off for capacity control and it is not equipped with Hot Gas By-Pass (HGBP). For this example, assume that there is a 1 degree dead band that controls the start/stop for the compressor. This means that the compressor can be started 1° F. above the thermostat setpoint and stopped when the temperature is 1° F. lower than the thermostat setpoint, so if the thermostat setpoint was 72° F., the compressor would start at 73° F. and shut down when the temperature dropped to 71° F., a 2° F. temperature swing.

Using an average cooling load of 50%, the compressor can be running for approximately 50% of the time, and off for approximately 50% of the time. Compressor staging based capacity control is like trying to average 50 MPH on the freeway by driving 100 MPH for 5 minutes, then slamming on the brakes and being stopped for 5 minutes, then repeating the process continually. If the system is equipped with only a thermostat, which is typically the case, here is how the system operation will appear:

As an example, starting from compressor startup, the space temperature can be at 73° F. and the space can be humid. Since the only form of cooling capacity control is via starting and stopping the compressor, the compressor is providing 100% capacity against a 50% load. The excess capacity overcools the air in the ductwork, and condenses significant volumes of water out of the air onto the cooling coil. Within the span of 5 to 10 minutes, the space temperature will have dropped to the lower setpoint limit and will be shut down. The fan can be running to meet ventilation, pressurization, make-up air or other requirements. Since there is no cooling capacity coming from the compressor, and there is significant condensate buildup on the cooling coils, the warm return/mixed air that is being passed through the cooling coil immediately starts to re-evaporate the water from the cooling coils and drain pans and re-injecting that moisture into the equipment, ductwork and facility. Since the ductwork and air distribution system was subcooled, moisture can start to condense inside the air distribution system, even on and under the insulation system, creating an environment that allows biological growth to occur. Additionally, the space is being re-humidified by the warm moist air that is coming off of the cooling coils when the compressor cycles off. Additional energy will have to be expended again, to remove moisture that was just removed a few moments ago.

If the system is equipped with a thermostat and a humidistat, which could be the case for a space with RH (Relative Humidity) control strategies, here is how the system operation will appear: Operation can be similar to the thermostat-only design, but the humidistat will typically try to keep the compressor running longer, as the intermittent operation of the compressor, and the re-humidification process that occurs every time the compressor cycles off does not allow the RH to be properly controlled.

In an attempt to lower the RH of the space being controlled, the compressor will stay running longer, and will over-cool the air to a greater extent, and the compressor will likely get cycled off when the refrigerant safeties detect that the refrigerant is too cold. The makes the problems described above even worse. The spaces can be over-cooled, which can actually increase the space RH and increase the chances for condensation to occur in the conditioned spaces. The ductwork and air distribution system can be over-cooled, creating the potential for even greater condensation inside the HVAC system when the compressor cycles off and the condensate re-evaporation, re-humidification process starts to occur.

If the system is equipped with Hot Gas By-Pass (HGBP), as may be the case for larger systems, here is how the system operation would be in this example: If the hot refrigerant gas is injected into the refrigerant distributor, there is a high potential for the supply air temperature control to be lost—the air temperature leaving the cooling coil can be higher than required to perform dehumidification duties. This leads to a myriad of problems. This is discussed in greater detail later in this application.

In most conventional systems, condensed moisture (water) gets re-evaporated off of the cooling coils when the cooling coil capacity is cycled off or temperature swings occur for any reason. The relative humidity control effectiveness of direct expansion (DX) can be very poor, unless the unit is on and running at 100% capacity. Similarly, many chilled water based cooling systems do not properly control RH, which can cause mold growth.

SUMMARY

This document presents high efficiency dehumidification systems, high efficiency cooling and heating plant systems, systems that allow precise temperature and RH control even down to very low loads, systems that extend or enhance the capacity, efficiency and viability of ground-sourced heat pumps and their earth-sourced cooling and heating energy storage, capacity and efficiency, and methods of controlling, optimizing and operating the same.

In some aspects, a high efficiency dehumidification system for an air handling unit (AHU) is disclosed. The system include a cooling coil having an inlet to receive chilled liquid at a first temperature from a cooling plant to cool air that passes over the cooling coil, and having an outlet to output spent chilled liquid at a second temperature, the second temperature being greater than the first temperature due to heat exchange from the air to the chilled liquid. The system further includes a first fluid conduit having an input connected with the output of the cooling coil, the first fluid conduit further having an output junction having first and second outputs, and a cooling recovery coil having an inlet connected with the first output of the output junction of the first fluid conduit to receive at least a portion of the spent chilled liquid at about the second temperature. In some aspects, the cooling recovery coil includes an outlet to return the spent chilled liquid from the cooling recovery coil to the cooling plant, a remaining portion of the spent chilled liquid bypassing the cooling recovery coil via the second output of the output junction of the first fluid conduit and returning to the cooling plant. In still some aspects, the system further includes a second fluid conduit having a plurality of inputs, the plurality of inputs including at least one input connected with each of the first and second outputs of the output junction, the second fluid conduit further having an output to return the spent chilled liquid to the cooling plant. The system further can further include a control valve on the second fluid conduit to control a flow rate of the spent chilled liquid from the cooling recovery coil to the cooling plant.

In yet other aspects, a high efficiency dehumidification system for a fan coil unit for providing heat transfer to building is disclosed. The system includes a preheat coil for receiving a preheating liquid from one or more heat recovery units to preheat air that passes over the preheat coil, and a cooling coil having an inlet to receive chilled liquid at a first temperature from a heat pump to cool the preheated air that passes over the cooling coil, and having an outlet to output spent chilled liquid at a second temperature, the second temperature being greater than the first temperature due to heat exchange from the air to the chilled liquid. The system can further include a first fluid conduit having an input connected with the outlet of the cooling coil and an outlet. The system can further includes a cooling recovery coil having an inlet connected with the outlet of the first fluid conduit to receive at least a portion of the spent chilled liquid at about the second temperature, and having an outlet to return the spent chilled liquid from the cooling recovery coil to the cooling plant. The system can further include a second fluid conduit having an input connected with the first and second outputs of the output junction, the second fluid conduit further having an output to return the spent chilled liquid to the heat pump. In some aspects, the system can further include a reheat coil having an inlet from the heat pump and the one or more heat recovery units, and an outlet to the one or more heat recovery units, to control a temperature of the air from the cooling recovery coil.

Systems are presented that can control temperatures and relative humidity at cooling loads down to 0% load, in an efficient, stable and reliable manner. In yet other aspects, any of the systems described herein can include a control system to evaluate input data representing one or more variables, and to determine one or more outputs to control the system to control the one or more variables.

Additional options such as Ultraviolet Germicidal Irradiation (UVGI), Photocatalytic Oxidation (PCO), alternate heating or reheating sources, and after-filters are shown. A unique benefit of HEDS that is not available with other systems is that the lower air velocities designed into HEDS units provides significantly longer contact time between UVGI, PCO, chemical/biological risk mitigation systems, heating, reheating and filtration systems, which can significantly improve their effectiveness. Humidifiers can also be installed for loads that must maintain minimum RH levels.

The details of one or more embodiments are set forth in the accompanying drawings and the description below. Other features and advantages can be apparent from the description and drawings, and from the claims.

BRIEF DESCRIPTION OF THE DRAWINGS

These and other aspects will now be described in detail with reference to the following drawings.

FIGS. 65-66 are variations of a condensate management system consistent with implementations of the current subject matter;

Like reference symbols in the various drawings indicate like elements.

DETAILED DESCRIPTION

Figure 1:
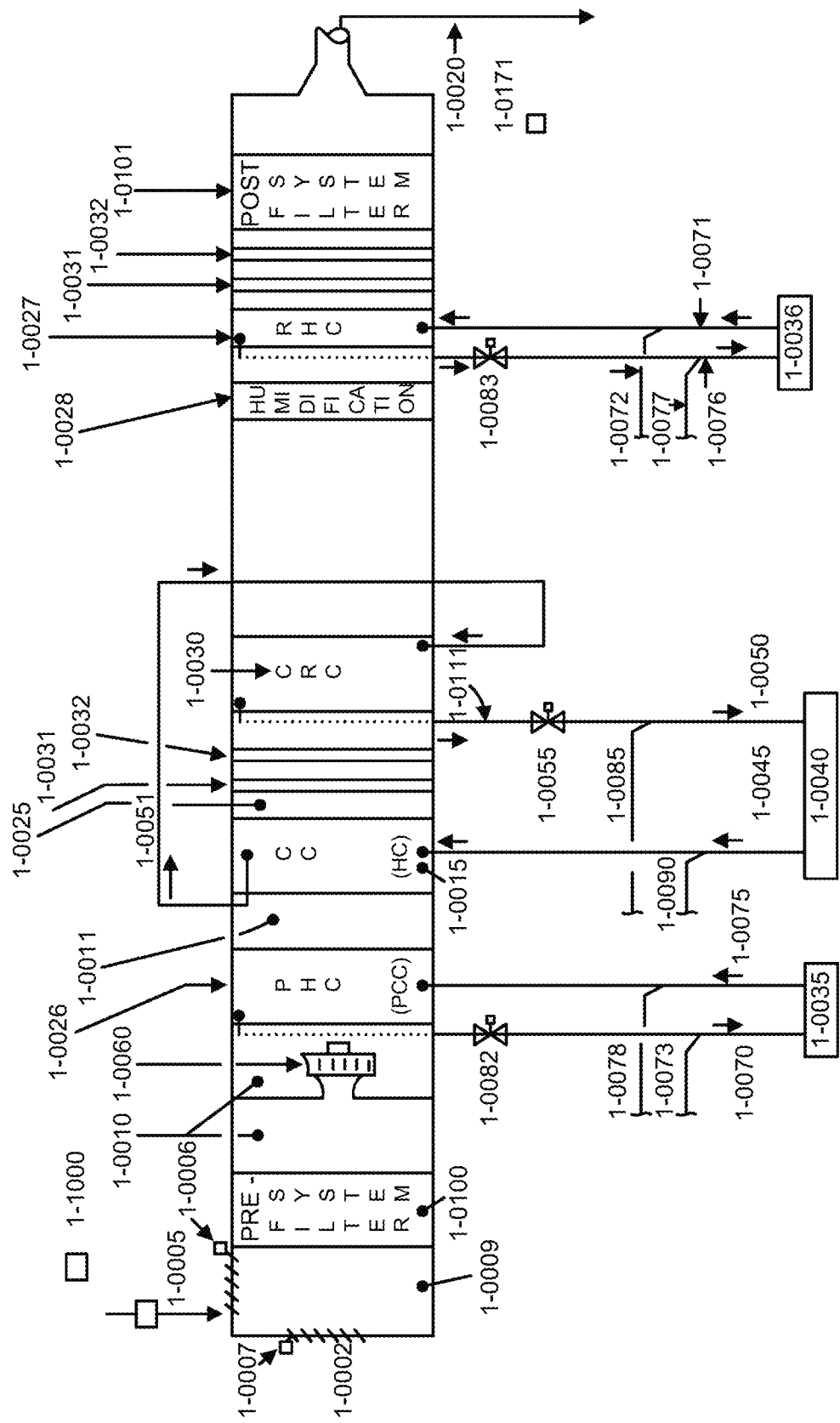
FIG. 1 illustrates a failsafe cooling coil and cooling recovery coil system for a multi-unit structure.

This document describes a high efficiency dehumidification systems (HEDS), condensate management systems, coil cleaning systems, and methods of operating the same. These systems described herein may address one or more of the disadvantages described above. The systems consistent with implementations of the current subject matter described herein may dehumidify air passing through the systems as a result of the configurations described herein, but may be used in other implementations. The HEDS systems and physical implementations can include a variety of equipment, such as fans, filtration systems, fluid-conveying coils, piping or tubing, heat transfer coils, vents, louvers, dampers, valves, actuators, fluid chillers, fluid heaters, or the like. Any of the implementations described herein can also include controls and logic, responsive to one or more sensors or other input devices or data exchange systems, for controlling the equipment for each implementation described herein. The term "water," or "fluid" as used herein, broadly describes a liquid-based heat rejection or heat transfer system. The term "air handling unit" ("AHU") or "fan coil unit" ("FCU") broadly describes equipment that is designed to provide temperature and relative humidity control to meet space conditioning and process needs. The terms "tubing", "piping" or "fluid conduit" as used herein, broadly described a passageway or means of transferring the fluid from one component to another, or with a component.

Energy recovery options are shown on some implementations, but are not shown on others. One skilled in the art would understand that similar heat recovery opportunities are available from each of the implementations described herein.

While sequences of operation and software to control each implementation are generally described, one or more implementations can include software that implement algorithms and strategies that are self-tuning, self-learning, anti-equipment cycling, and are set up to make the HEDS design renewable energy and energy storage friendly, including software that allows the HEDS system to be utilized as a Demand Response tool, or a Distributed Energy Resource, while still maintaining the relative humidity needs of the space. These features are exclusive to the HEDS design.

Sample control system instrumentation inputs include one or more of the following:

Air Filters Differential Pressure

Fresh air intake conditions, Return air conditions, Mixed air conditions, Supply fan plenum conditions, Preheat coil leaving air conditions, Cooling coil leaving air conditions, Cooling Recovery Coil leaving air conditions, Cooling Recovery Coil #2 leaving air conditions, Reheat coil leaving air conditions, Supply air conditions, Exhaust air conditions, Space or process load conditions, conditions for other energy recovery or reclaim, or heat transfer systems, including: Dry bulb temperature, Wet bulb temperature, Dewpoint temperature, Relative Humidity Setpoints, including minimum and maximum setpoints, for each of the above variables, Air flow rate Air flow rate setpoints, including minimum and maximum setpoints, Water flow rates and inlet and outlet temperatures for each coil system, Water flow rates and inlet and outlet temperatures for each energy recovery or heat transfer system, Water flow rates and inlet and outlet temperatures for each cooling and heating system.

Energy associated with all coils, energy recovery, heat transfer system, cooling and heating system and their parasitic loads (pumps, fans, etc.)

Air distribution/return/exhaust systems and space/process conditions as appropriate Fan kW, all fan types, e.g., supply, return, exhaust, lab hood, make up air unit, recirculating air unit, DOAS Fan speed, all fan types, e.g., supply, return, exhaust, lab hood, make up air unit, recirculating air unit, DOAS Pressures, pressure differentials, relative pressures, filter pressure drop, both setpoints for these variables and the actual value of the variables.

Damper position commands, return air, fresh air, economizer VAV, CAV, MZU, FPMXB, other air distribution equipment Damper position, actual, return air, fresh air, economizer VAV, CAV, MZU, FPMXB, other air distribution equipment Information available from Cooling plant—chillers, heat recovery chillers, heat pumps, glycol chillers, ground source heat pumps, primary, secondary and tertiary chilled water pumps, cooling tower fans, condenser water pumps, chilled water supply temperature set point and actual values, evaporator refrigerant temperature, pressure, and approach temperature, condenser water supply temperature set point and actual values, condenser refrigerant temperature, pressure, and approach temperature. Refrigerant superheat, chiller KW and motor speed and frequency, chilled water and condenser water flow rates, temperature differentials, pressure differentials. Evaporator and condenser differential pressure minimum and maximum setpoints, compressor Inlet Guide Vane (IGV) position commands and actual positions, on/command status, on/off status, load recycle status, alarm status, refrigerant level, evaporator, refrigerant level, condenser, other information that is available via a network connection, hardwired, RF or Wi-Fi.

Instrumentation is included to measure the air pressure drop across the cooling recovery coil(s) (CRC). This air pressure drop can be used to calculate the air flow rate of the fresh air entering the system. The CRC is a dry coil, with no condensation occurring, so the air pressure drop will not vary as the loads vary, only as the CFM's vary, so this is a viable and repeatable control methodology.

The air pressure drop across the CRC(s) is high enough that reasonably priced instrumentation can be utilized to measure the differential pressure and air flow. With a typical reheat coil, the air pressure drop at 100% air flow may only be 0.01" to 0.03". Pressure drop varies with the square of air flow, so as the air flow drops off, the air pressure drop across the coil drops off very rapidly. HEDS CRC's are larger and have a higher air pressure drop, so the measurements will be more accurate and repeatable.

A HEDS-unique control algorithm is used to modulate the damper systems, fan speed and other variables as needed to maintain the desired fresh air setpoint. The fresh air setpoint is varied based on time of day, type of day, day of week, occupancy, operational mode, demand controlled ventilation controls and other variables.

In accordance with implementations described herein, the following reference numbers can be referred to for specific elements of the systems and methods:

1-0001 heating, cooling, dehumidification and air purification system
1-0002 return air
1-0003 air handling unit
1-0005 fresh air
1-0006 fresh air damper and damper actuator
1-0007 return air damper and damper actuator, (N/A for 100% fresh air systems)
1-0009 fresh air and return air mixing plenum, (N/A for 100% fresh air systems)
1-0010 mixed air
1-0011 pre-heat coil (PHC) discharge air plenum
1-0015 cooling coil (CC or C/C) or heating coil (HC) heat transfer system
1-0020 discharge air (supply air) from unit
1-0025 cooling coil (heating coil) discharge air plenum
1-0026 pre-heat coil (or pre-cool coil) heat transfer system
1-0027 re-heat coil (RHC) (or post-cool coil (Post-CC)) heat transfer system
1-0028 humidification system
1-0030 cooling recovery coil (CRC or CRC #1) heat transfer system
1-0031 Ultra Violet Germicidal Irradiation (UVGI), and other chemical/biological neutralizing and filtration systems
1-0032 Photocatalytic Oxidation (PCO), and other chemical/biological neutralizing and filtration systems
1-0033 cooling recovery coil #2 (CRC #2) heat transfer system
1-0035 heating source
1-0036 heating source
1-0040 cooling plant
1-0045 chilled fluid supply piping (e.g., conduit) (warmed fluid supply piping (e.g., conduit) when system is used for heating)
1-0050 chilled fluid return piping (e.g., conduit) (warmed fluid return piping (e.g., conduit) when system is used for heating)
1-0051 cooling coil (heating coil) piping (e.g., conduit) (warmed (or cooled) fluid leaving the CC being delivered to other components)
1-0055 control valve
1-0056 flow control valve (FCV), automatic flow control valve (AFCV), resettable automatic flow control valve (RAFCV)
1-0057 cooling recovery coil bypass valve and piping (e.g., conduit), various valve types
1-0060 fan(s) or blower(s), motor(s), engines to move air
1-0070 heating fluid return piping (e.g., conduit) system
1-0071 heating fluid supply piping (e.g., conduit) system
1-0072 heating fluid supply piping (e.g., conduit) system to other loads
1-0073 heating fluid return piping (e.g., conduit) system from other loads
1-0075 heating fluid supply piping (e.g., conduit) system
1-0076 heating fluid return piping (e.g., conduit) system
1-0077 heating fluid return piping (e.g., conduit) system from other loads
1-0078 heating fluid supply piping (e.g., conduit) system to other loads
1-0081 three way control valve (and associated controls, operational and optimization logic)
1-0082 PHC control valve (and associated controls, operational and optimization logic)
1-0083 reheat coil (RHC) control valve (and associated controls, operational and optimization logic)
1-0084 reheat coil (RHC) control valve (and associated controls, operational and optimization logic)
1-0085 chilled fluid return piping (e.g., conduit) from other loads (warmed fluid return piping (e.g., conduit) when system is used for heating)
1-0090 chilled fluid supply piping (e.g., conduit) to other loads (warmed fluid supply piping (e.g., conduit) when system is used for heating)
1-0100 pre-filtration system and odor, chemical/biological neutralizing and filtration systems as required
1-0101 post- or after-filtration system and odor, chemical/biological neutralizing and filtration systems as required
1-0111 fluid piping (e.g., conduit) leaving CRC (CRC #1)
1-0113 fluid piping (e.g., conduit) leaving CRC (CRC #1) and entering CRC #2
1-0115 fluid piping (e.g., conduit) leaving CRC #2
1-0171 conditioned space or process load

1-0310 CRC bypass valve. Manual valve, modulating control valve, two position control valve, differential pressure control valve, resettable differential pressure control valve, flow control valve, automatic flow control valve, and resettable automatic flow control valves. Valves are of various types, configurations and operating characteristics

1-0410 During cooling season, fluid leaving CC and being supplied to other cooling systems (e.g., OSA pre-cool coils, radiant cooling, induction units, active or passive chilled beams, under-floor air handling units and other systems). During heating season, where CC acts as an HC, fluid leaving HC and being supplied to other heating systems (e.g., OSA pre-heat coils, radiant heating, induction units, active or passive chilled beams (which also provide heating), under-floor air handling units and other systems).

1-0415 fluid being returned to the system

1-0420 During cooling season, fluid leaving CRC and being supplied to other cooling systems (e.g., OSA pre-cool coils, radiant cooling, induction units, active or passive chilled beams, under-floor air handling units and other systems). During heating season, where CC acts as an HC, fluid leaving CC/CRC and being supplied to other heating systems (e.g., OSA pre-heat coils, radiant heating, induction units, active or passive chilled beams (which also provide heating), under-floor air handling units and other systems).

1-0425 fluid being returned to the system

1-0430 During cooling season, fluid leaving main chilled fluid piping (e.g., conduit) system and being supplied to other cooling systems (e.g., OSA pre-cool coils, radiant cooling, induction units, active or passive chilled beams, under-floor air handling units and other systems). During heating season, where CC acts as an HC, fluid leaving main fluid piping (e.g., conduit) system and being supplied to other heating systems (e.g., OSA pre-heat coils, radiant heating, induction units, active or passive chilled beams (which also provide heating), under-floor air handling units and other systems).

1-0435 fluid being returned to the system

1-0440 fluid leaving the PHC and being supplied to other heating systems (e.g., OSA pre-heat coils, radiant heating, induction units, active or passive chilled beams (which also provide heating), under-floor air handling units and other systems).

1-0445 fluid being returned to the system

1-0450 fluid leaving main fluid piping (e.g., conduit) system and being supplied to other heating systems (e.g., OSA pre-heat coils, radiant heating, induction units, active or passive chilled beams (which also provide heating), under-floor air handling units and other systems).

1-0455 fluid being returned to the system

1-0460 fluid leaving the RHC and being supplied to other heating systems (e.g., OSA pre-heat coils, radiant heating, induction units, active or passive chilled beams (which also provide heating), under-floor air handling units and other systems).

1-0465 fluid being returned to the system

1-0470 fluid leaving main fluid piping (e.g., conduit) system and being supplied to other heating systems (e.g., OSA pre-heat coils, radiant heating, induction units, active or passive chilled beams (which also provide heating), under-floor air handling units and other systems).

1-0475 fluid being returned to the system

1-0510 energy recovery system control valve (and associated controls, operational and optimization logic) for reheat coil system

1-0520 energy recovery system control valve (and associated controls, operational and optimization logic) for chiller low load, non-cycling system

1-1010 conditioned space or process loads instrumentation, controls, operational and optimization logic

1-1050 fluid bypass control valve (and associated controls, operational and optimization logic)

1-1060 fluid added volume tank to improve operations, reduce thermal and equipment cycling, and improve resiliency

1-1070 fluid supply piping (e.g., conduit) from ground coupled heat sink or heat source to PHC heat transfer system

1-1072 control valve (and associated controls, operational and optimization logic)

1-1075 fluid return piping (e.g., conduit) from PHC heat transfer system to ground coupled heat sink or heat source

1-1080 fluid supply piping (e.g., conduit) from ground coupled heat sink or heat source to RHC heat transfer system

1-1082 control valve (and associated controls, operational and optimization logic)

1-1085 fluid return piping (e.g., conduit) from RHC heat transfer system to ground coupled heat sink or heat source

1-1100 fluid expansion tank, plus associated controls, piping (e.g., conduit) and instrumentation

1-1200 chilled or heated fluid pumping system for heat sink, heat source, heating energy being recovered, heating energy being added to the heat sink, cooling energy being recovered, cooling energy being added to the heat sink.

1-1210 chilled or heated fluid pumping system for loads being served

1-1300 heat pump system or cooling system utilizing a ground coupled heat rejection system

1-2000 energy recovery system feeding the PHC (and associated controls, operational and optimization logic)

1-2002 control valve for fluid piping (e.g., conduit) from ground coupled heat sink or heat source to PHC heat transfer system (and associated controls, operational and optimization logic)

1-2006 energy recovery system feeding the RHC (and associated controls, operational and optimization logic)

1-2008 control valve for fluid piping (e.g., conduit) from ground coupled heat sink or heat source to RHC heat transfer system (and associated controls, operational and optimization logic)

1-2010 heating/cooling energy recovery unit #1 (HCRU #1)

1-2012 control valve for heating/cooling energy recovery unit #1 (HCRU #1) (and associated controls, operational and optimization logic)

1-2020 heating/cooling energy recovery unit #2 (HCRU #2)

1-2022 control valve for heating/cooling energy recovery unit #2 (HCRU #2) (and associated controls, operational and optimization logic)

1-2030 additional heating/cooling energy recovery units (HCRU #XXXX)

1-2032 control valves for additional heating/cooling energy recovery units (HCRU #XXXX) (and associated controls, operational and optimization logic)

1-2040 ground coupled field for heat rejection or heat reclamation

1-2042 control valve for ground coupled field for heat rejection or heat reclamation (and associated controls, operational and optimization logic)

1-2044 control valve for ground coupled field for heat rejection or heat reclamation (and associated controls, operational and optimization logic)

1-2046 control valve for ground coupled field for heat rejection or heat reclamation (and associated controls, operational and optimization logic)

1-2048 control valve for ground coupled field for heat rejection or heat reclamation (and associated controls, operational and optimization logic)

1-2050 cooling and cooling/heating system utilizing the earth for heat rejection or heat rejection and reclamation

1-2060 cooling augmentation system. Allows added "cooling energy" to be injected into the ground coupled field, for use at a later time.

1-2062 control valve for cooling augmentation system and associated controls, operational and optimization logic).

1-2070 heating augmentation system. Allows added "heating energy" to be injected into the ground coupled field, for use at a later time.

1-2072 control valve for heating augmentation system and associated controls, operational and optimization logic).

1-3000 overall system instrumentation, controls, operational and optimization logic.

FIG. 1 illustrates a failsafe cooling coil and cooling recovery coil system. The system includes one control valve per cooling coil/cooling recovery coil system. The system failsafe cooling coil and cooling recovery coil system employs a failsafe reheat system using a cooling recovery coil. The cooling recovery coil (CRC) 1-0030 is in direct communication with cooling coil (CC) 1-0015—all of the water that leaves the CC 1-0015 goes through the CRC 1-0030—and a single control valve can be used as one part of the capacity variation control algorithm. In some implementations, however, no control valves are used. A manual bypass valve and the associated piping to allow some of the chilled fluid that leaves the CC 1-0015 to bypass the CRC 1-0030 can also be included. Alternately, some combination of fixed or adjustable, differential pressure control valves or automatic control valves, modulating control valves, and manual control valves can be utilized to control the flow through and around the coil systems. The CRC heat transfer tubing can be located in the same frame as the CC, or it/they can be located remotely.

In one implementation, 100% of the fluid flow that passes through the cooling coil (CC) 1-0015 passes through the cooling recovery coil (CRC) 1-0030. With this configuration, even if there is some form of an equipment or control system failure, the cooled and dehumidified air gets reheated by the CRC so that it does not leave the air handling unit (AHU) with saturated or nearly saturated air conditions. In other implementations, rather than 100% of the CHW flow passing from the CC 1-0015 into the CRC 1-0030, a desired fraction of the water can pass from the CC 1-0015 into the CRC 1-0030, with the remainder bypassing the CRC 1-0030. The lower Relative Humidity (RH) air leaving the failsafe CRC 1-0030 reduces the potential for condensation to occur, and for relative humidity levels to rise above the desired levels.

Control strategies can be implemented that efficiently minimize the cooling load on the compressor, while reducing compressor on/off cycling and moisture re-evaporation off of the cooling coils and drain pans, while still keeping the building(s) positively pressurized with low relative humidity air as needed. This is critical to keeping high moisture content, high vapor pressure air from migrating into the building or area being treated/conditioned.

The control system is designed to vary overall capacity and energy draw, sensible, latent and energy recovery capacity by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. In accordance with some implementations, the control methods and sequences may be performed at least in part, by one or more controllers connected with each of the HEDS-based systems described herein, consistent with implementations of the current subject matter. Such control methods are described in more detail below. The sequences shown and described herein are non-exhaustive and non-limiting. For example, each sequence shown and described may include one or more steps, each of which may not be required. Each step of each sequence may also be performed by the controller (e.g., control system 300) in a different order. In some implementations, each sequence may be combined with one or more other sequences.

For a given load, the control system can vary the dehumidification (moisture removal) capacity by changing some or all of the following variables and setpoints. To lower the dewpoint temperature of the air leaving the cooling coil, fan speed setpoints and speeds, CFM setpoints and CFM's, AHU static pressure setpoints, chilled fluid supply temperature setpoints, and chilled fluid supply temperatures are reduced to lower the dewpoint temperature of the air leaving the cooling coil. Chilled fluid flow through the coil systems, chilled fluid pump speed setpoints and speeds, chilled fluid system differential pressure setpoints and differential pressures can be increased to lower the dewpoint temperature of the air leaving the cooling coil.

To raise the dewpoint temperature of the air leaving the cooling coil, fan speed setpoints and speeds, CFM setpoints and CFM's, AHU static pressure setpoints, chilled fluid supply temperature setpoints and chilled fluid supply temperatures can be increased to raise the dewpoint temperature of the air leaving the cooling coil. Chilled fluid flow through the coil systems, chilled fluid pump speed setpoints and speeds, chilled fluid system differential pressure setpoints and differential pressures can be reduced to raise the dewpoint temperature of the air leaving the cooling coil.

For a given load, the control system can vary the sensible capacity of the cooling coil by changing some or all of the following variables and setpoints. To lower the drybulb temperature of the air leaving the cooling coil, fan speed setpoints and speeds, CFM setpoints and CFM's, AHU static pressure setpoints, chilled fluid supply temperature setpoints and chilled fluid supply temperatures can be reduced to lower the drybulb temperature of the air leaving the cooling coil. Chilled fluid flow through the coil systems, chilled fluid pump speed setpoints and speeds, chilled fluid system differential pressure setpoints and differential pressures can be increased to lower the drybulb temperature of the air leaving the cooling coil.

To raise the drybulb temperature of the air leaving the cooling coil, fan speed setpoints and speeds, CFM setpoints and CFM's, AHU static pressure setpoints, chilled fluid supply temperature setpoints and chilled fluid supply temperatures can be increased to raise the drybulb temperature of the air leaving the cooling coil. Chilled fluid flow through the coil systems, chilled fluid pump speed setpoints and speeds, chilled fluid system differential pressure setpoints and differential pressures can be reduced to raise the drybulb temperature of the air leaving the cooling coil.

For a given load, the control system can vary the sensible reheat capacity of the cooling recovery coil by changing some or all of the following variables and setpoints. To lower the drybulb temperature of the air leaving the cooling recovery coil, fan speed setpoints and speeds, CFM setpoints and CFM's, AHU static pressure setpoints, chilled fluid supply temperature setpoints and chilled fluid supply temperatures can be increased to lower the drybulb temperature of the air leaving the cooling recovery coil. Chilled fluid flow through the coil systems, chilled fluid pump speed setpoints and speeds, chilled fluid system differential pressure setpoints and differential pressures can be increased to lower the drybulb temperature of the air leaving the cooling recovery coil.

To raise the drybulb temperature of the air leaving the cooling recovery coil, fan speed setpoints and speeds, CFM setpoints and CFM's, AHU static pressure setpoints, chilled fluid supply temperature setpoints and chilled fluid supply temperatures can be decreased to raise the drybulb temperature of the air leaving the cooling recovery coil. Chilled fluid flow through the coil systems, chilled fluid pump speed setpoints and speeds, chilled fluid system differential pressure setpoints and differential pressures can be decreased to raise the drybulb temperature of the air leaving the cooling recovery coil.

For a given load, the control system will vary the energy recovery capacity of the unit by changing some or all of the following variables and setpoints. Fan speed setpoints and speeds, CFM setpoints and CFM's, AHU static pressure setpoints, chilled fluid supply temperature setpoints and chilled fluid supply temperatures can be controlled to vary the energy recovery capacity of the unit. In addition, chilled fluid flow through the coil systems, chilled fluid pump speed setpoints and speeds, chilled fluid system differential pressure setpoints and differential pressures can be controlled to vary the energy recovery capacity of the unit. Dry bulb and dewpoint supply air temperature setpoints for the unit can be controlled to vary the energy recovery capacity of the unit.

To augment the above control system sequences, to meet the desired system setpoints, these variables shall also be controlled: heated fluid flow through the coil systems, heated fluid pump speed setpoints and speeds, heated fluid system differential pressure setpoints and differential pressures, heated fluid supply temperature setpoints and heated fluid supply temperatures.

Sensors monitor the indoor and outdoor conditions and use the various components of the system as needed to maintain indoor dry bulb, dewpoint and RH % setpoints. There are setback setpoints programmed into the system, to allow wider tolerances when facilities are not occupied, while still maintaining the conditions needed to reduce/eliminate mold growth related to HVAC system design and operations.

Control and optimization strategies included with the system described herein are designed to control air dry bulb temperatures, dewpoint temperatures, wet bulb temperatures and relative humidity, as well as air volumes to ensure that the desired comfort, relative humidity and temperature conditions are met at the lowest energy point during hours of normal activity, and that reduced air volumes, even down to zero CFM, can be used when the spaces are not occupied, or occupied in a manner that allows wider thermal comfort bounds to be utilized.

Other built in operational modes include a Continuous Dehumidification Mode, a Batch Dehumidification Mode, a Facility Dry-out Mode, a Constant Facility Pressurization Mode, these are briefly described later in this application.

Additional options such as Ultraviolet Germicidal Irradiation (UVGI), Photocatalytic Oxidation (PCO), alternate heating or reheating sources, and after-filters are shown. A unique benefit of HEDS that is not available with other systems is that the lower air velocities designed into HEDS units provides significantly longer contact time between UVGI, PCO, Chemical/biological risk mitigation systems, heating, reheating and filtration systems, which can significantly improve their effectiveness. Humidifiers can also be installed for loads that must maintain minimum RH levels. Not all potential options have been shown.

For example, FIG. 1 illustrates a system including a cooling and/or dehumidification system. The cooling and/or dehumidification system may include one or more components, such as a pre-filtration system 1-0100, one or more fans/blowers 1-0060, a pre-heat coil 1-0026, a cooling coil 1-1-0015, one or more UVGI systems 1-0031, and a cooling recovery coil 1-0030. In some implementations, return air 1-0002 passes through an inlet having a return air damper/actuator 1-0007 and/or fresh air 1-0005 passes through another inlet having a fresh air damper/actuator 1-0006 into a mixing plenum 1-0009. Mixed air 1-0010 from the mixing plenum 1-0009 is blown by the one or more fans/blowers 1-0060 through the cooling and/or dehumidification system. The air may pass through the pre-heat coil 1-0026 into a pre-heat coil discharged air plenum 1-0011. The air may also pass through the cooling coil 1-0015 into a cooling coil discharged air plenum 1-0025. The discharged air may pass through one or more biological control systems (UVGI, etc.) 1-0031 and/or one or more additional biological control systems (e.g., PCO, etc.) 1-0032. The air may then pass through the cooling recovery coil 1-0030.

In some implementations, one or more fluid conduits provide a passageway for fluid to pass between the each of the coils (e.g., the PHC, the CC, the CRC, etc.) and/or between each of the coils and an external system, such as a cooling/chiller plant 1-0040 or heating source 1-0035, 1-0036. Each fluid conduit may include one or more sections, or one or more fluid conduits. For example, a fluid conduit may provide a fluid passageway for fluid to flow between the heating source 1-0035 and the PHC 1-0026. As shown, the heating fluid supply 1-0075 flows from the heating source 1-0035 to an inlet of the PHC 1-0026 and through an outlet of the PHC back to the heating source 1-0035 as heating fluid return 1-0070. As the fluid passes through the PHC, the temperature of the air passing through the PHC increases, while the temperature of the fluid passing through the PHC decreases. In some implementations, the fluid conduit includes a PHC control valve 1-0082 that controls the flow rate of the fluid flowing through the PHC and/or from the outlet of the PHC to the heating source 1-0035. The fluid conduit may also provide a heating fluid supply to other loads at 1-0078 and return the heating fluid supply from other loads at 1-0073.

In some implementations, a fluid conduit allows fluid to pass from an outlet of the CC 1-0015 to an inlet of the CRC 1-0030. Another fluid conduit may define a passageway between the CRC 1-0030 and the cooling plant 1-0040, and from the cooling plant 1-0040 to the CC 1-0015. In the example shown in FIG. 1, the fluid conduit allows a chilled fluid supply 1-0045 to pass from the cooling plant 1-0040 to an inlet of the CC 1-0015 (and to other loads at 1-0090). As the fluid passes through the CC, the temperature of the fluid rises. The fluid may exit the CC 1-0015 through a fluid conduit 1-0051 via the outlet and into the inlet of the CRC 1-0030. As the fluid passes through the CRC 1-0030, the temperature of the fluid decreases, as the temperature of the air passing the CRC 1-0030 rises. The return fluid 1-0050 may exit the CRC 1-0030 via an outlet through a fluid conduit 1-0111 that leads to one or more other loads 1-0085 and/or the cooling plant 1-0040. The fluid conduit connecting the CRC 1-0030 with the cooling plant 1-0040 may include one or more control valves 1-0055, as noted above, to control the flow rate of the fluid passing through the fluid conduit.

In some implementations, the system includes a humidification system 1-0028. The humidification system 1-0028 may include a re-heat coil 1-0027, one or more filters 1-0031, and a post-filtration system 1-010. In some implementations, a fluid conduit may provide a fluid passageway for fluid to flow between the heating source 1-0036 and the RHC 1-0027. As shown, the heating fluid supply 1-0071 flows from the heating source 1-0036 to an inlet of the RHC 1-0027 and through an outlet of the RHC back to the heating source 1-0036 as heating fluid return 1-0076. As the fluid passes through the RHC, the temperature of the air passing through the RHC increases, while the temperature of the fluid passing through the RHC decreases. In some implementations, the fluid conduit includes a RHC control valve 1-0083 that controls the flow rate of the fluid flowing through the RHC and/or from the outlet of the RHC to the heating source 1-0036. The fluid conduit may also provide a heating fluid supply to other loads at 1-0072 and return the heating fluid from other loads at 1-0077. After passing through the RHC 1-0027, the air may pass through one or more UVGI systems 1-0031, PCO systems 1-0032 and/or a post-filtration system 1-0101 to further filter the air. The air may exit the system through an outlet at 1-0020 to a conditioned space/process load at 1-0171.

Figure 2:
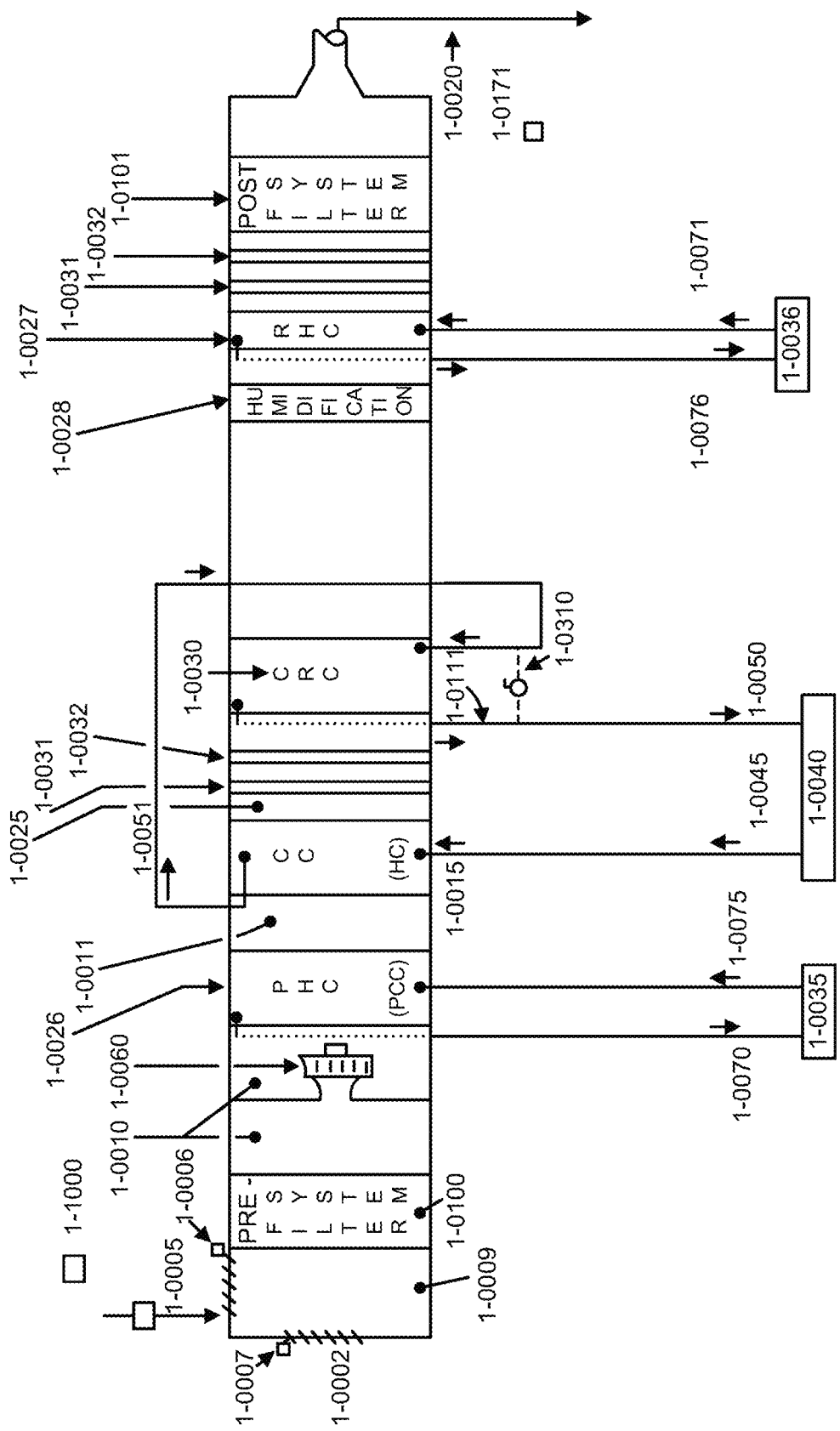
FIG. 2 illustrates a system that is similar to the system illustrated in FIG. 1 with failsafe operation, but does not use any form of a control valve to modulate capacity.

FIG. 2 illustrates a system that is similar to the system illustrated in FIG. 1 (and includes many of the same components as illustrated in FIGS. 1 and 2) with failsafe operation, but does not use any form of a control valve to modulate capacity, and accordingly, it is an ultimate in failsafe designs. Instead, the cooling and/or dehumidification system may include a control mechanism, such as a CRC bypass valve, a manual valve, a modulating control valve, two position control valve, a differential pressure control valve, a resettable differential pressure control valve, a flow control valve, an automatic flow control valve, and a resettable automatic flow control valves, and the like 1-0310. For example, the bypass valve 1-0310 may include various valves of different types, configurations and operating characteristics. The bypass valve 1-0310 may divert all or a portion of the fluid passing through a first conduit (connecting the outlet of the CC to the inlet of the CRC) to a second conduit (connecting the outlet of the CRC with the cooling plant 1-0040) to relieve pressure build-up in the first fluid conduit. Capacity control, energy draw and sensible, latent and energy recovery capacity modulation is accomplished via changing various system setpoints, such as by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. The system can be applied to a single unit, or a multiplicity of units that are piped in a design that is hydraulically self-balancing, or the differential pressures at the individual units is relatively consistent between the individual units. The system can be piped for reverse return, and designed with coil and piping pressure drops that promote relatively even flow throughout all areas of the facility.

Figure 3:
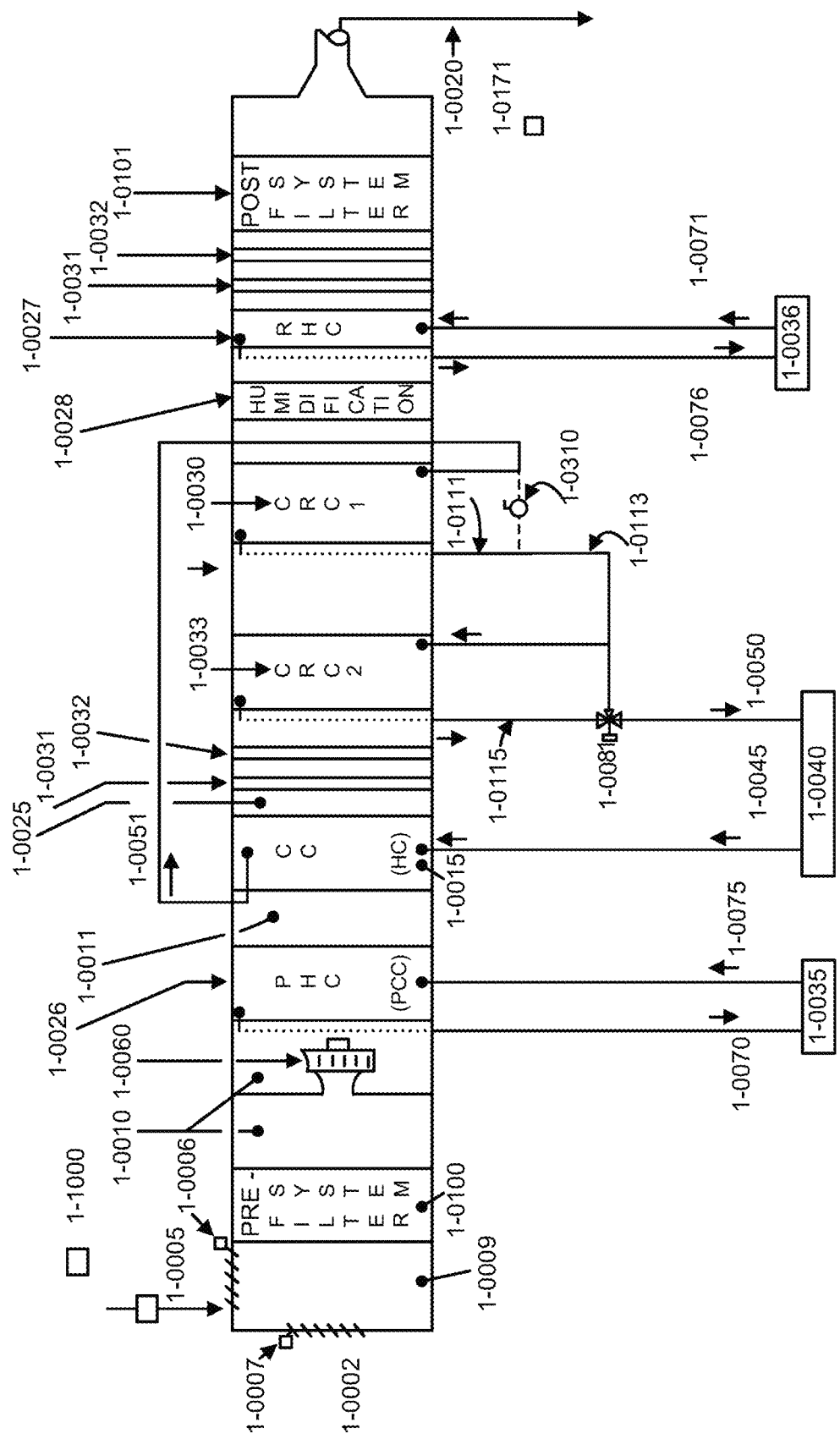
FIG. 3 is similar to the system illustrated in FIG. 2 with failsafe operation, but with added functionality.

FIG. 3 is similar to the system illustrated in FIG. 2 with failsafe operation (and includes many of the same or similar components, as illustrated in FIGS. 2 and 3), but with added functionality. For example, the system may include a first CRC 1-0030 (e.g., CRC1) and a second CRC 1-0033 (e.g., CRC2). The CHW flow flows from the CC 1-0015 to the first CRC 1-0030, with 100% of the flow (or the desired fraction of the flow) passing directly from the CC 1-0015 into the first CRC 1-0030. The fluid that then leaves the first CRC 1-0030 can either pass through a second CRC (CRC2) 1-0033 that may use some form of flow control to modulate the capacity of CRC2 1-0033, or the fluid can bypass the CRC2 1-0033 and be fed into the return line 1-0113 (such as via a bypass valve, for example). In this case, the failsafe operation of the CC 1-0015 and the first CRC 1-0030 are augmented by CRC2 1-0033 and a control methodology that allows more precise temperature and RH control in the spaces/process loads being served and greater control over the energy consumption and demand profile of the system. If CRC2 1-0033 or the associated control system has issues of some sort, the CC 1-0015 and CRC 1-0033 are still able to provide cooling, dehumidification and reheat.

Failsafe reheat may use cooling recovery coil (CRC) 1-0030 with second CRC (CRC2) 1-0033 to provide more accurate temperature and RH control. The first cooling recovery coil (CRC) 1-0030 is in direct communication with the cooling coil (CC) 1-0015, such that all of the water that leaves the CC 1-0015 goes through the first CRC 1-0030. A manual or automatic bypass valve 1-0310 and the associated piping (or fluid conduits) to allow some of the chilled water that leaves the CC 1-0015 to bypass the CRC 1-0030 may also be included. Alternatively, some combination of fixed or adjustable, differential pressure control valves or automatic control valves, modulating control valves, and manual control valves can be utilized to control the flow through the coil systems. A single control valve can be used as one part of the capacity variation control algorithm. To provide more precise control of the leaving air conditions, the second CRC (CRC2) 1-0033 can be equipped with a control valve 1-0081 that either sends water through the CRC2 1-0033 for added reheat and energy recovery capacity, or bypasses the CRC2 coil 1-0033, if less amounts of reheat and energy recovery are required.

In some implementations, 100% of the fluid flow that passes through the cooling coil (CC) 1-0015, passes through the cooling recovery coil (CRC) 1-0030. With this configuration, even if there is some form of an equipment or control system failure, the cooled and dehumidified air leaving the CC 1-0015 gets reheated by the CRC 1-0030 so that it does not leave the air handling unit (AHU) with saturated or nearly saturated air conditions. In other implementations, rather than 100% of the CHW flow passing from the CC 1-0015 into the CRC 1-0030, a desired fraction of the water can pass from the CC 1-0015 into the CRC 1-0030, with the remainder bypassing the CRC 1-0030.

The addition of CRC2 1-0033 and its capacity control/modulation system increases the usefulness of the invention, while still providing some level of failsafe operation. This lower relative Humidity (RH) air reduces the potential for condensation to occur, and for relative humidity levels to rise above the desired levels.

Overall capacity and energy draw, sensible, latent and energy recovery capacity can be varied by varying fan speed setpoints and speeds, CFM setpoints and CFM's, AHU static pressure setpoints, chilled water flow through the coil systems, chilled water pump speed setpoints and speeds, chilled water system differential pressure setpoints and differential pressures, chilled water supply temperature setpoints and chilled water supply temperatures, heated fluid flow through the coil systems, heated fluid pump speed setpoints and speeds, heated fluid system differential pressure setpoints and differential pressures, heated fluid supply temperature setpoints and heated fluid supply temperatures. All of the logic sequence descriptions included for FIG. 1 are valid with respect to FIG. 3, with the added functionality that the final dry bulb temperature can be increased and the final RH can be decreased by use of the CRC2 1-0033 and its capacity control system.

Figure 4:
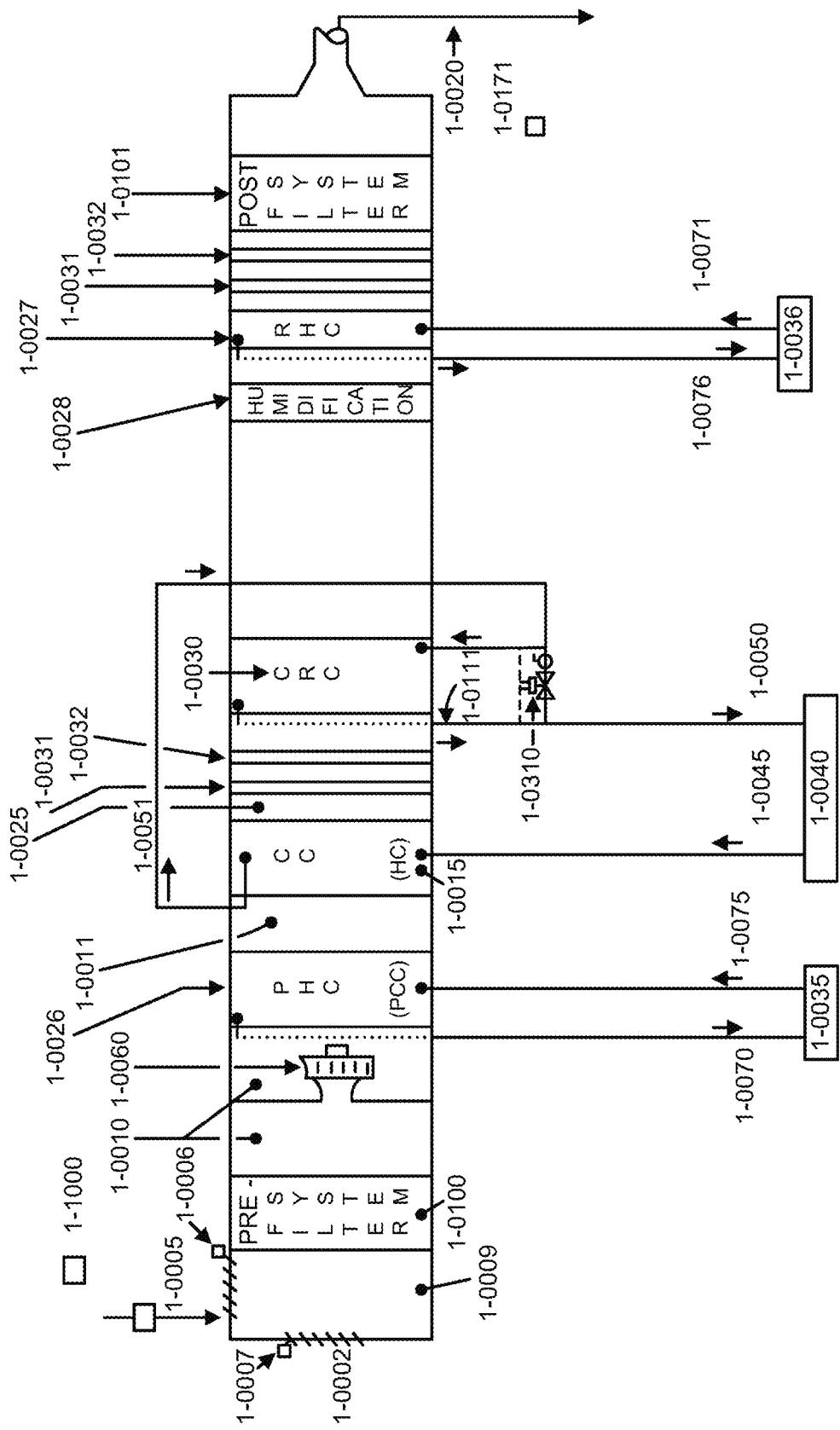
FIG. 4 is similar to the system illustrated in FIG. 1 with failsafe operation, but with added functionality.

FIG. 4 is similar to the system illustrated in FIG. 1 with failsafe operation ((and includes many of the same or similar components, as illustrated in FIGS. 1 and 4), with at least two exceptions: 1) that this version is configured to condition a single unit, or a multiplicity of units that are piped in a design that is hydraulically self-balancing, or nearly hydraulically self-balancing, or the differential pressures at the individual units is relatively consistent between the individual units, and 2) in lieu of using a control valve in series with the CC 1-0015 and CRC 1-0030 to assist with capacity control, this variation uses a fixed or variable setpoint differential pressure control valve 1-0310 (or other types of valves) to bypass fluid around the CRC 1-0030 when the flow rates climb.

With this design, under low chilled water flow rates, a significant portion, up to 100%, of the CHW flow that leaves the CC 1-0015 enters the CRC 1-0030 to provide a greater level of reheat under low loads to provide lower RH air leaving the AHU. As the chilled water flow increases, indicating that there is a greater load that needs to be met, there is a greater amount of CHW flow that bypasses the CRC 1-0030, so the AHU leaving air temperature is not increased to the extent it would be if all of the CHW that leaves the CC 1-0015 enters the CRC 1-0030.

Due to the chilled water pressure drop across the differential pressure control valve 1-0310, even when it is 100% open to flow, there will always be some CHW flow that is circulated through the CRC 1-0030, providing reheat and reducing the RH of the supply air even if the bypass valve is 100% open. Additionally, a manual valve 1-0310 can be inserted in that line to induce more flow through the CRC as desired or needed.

Figure 5:
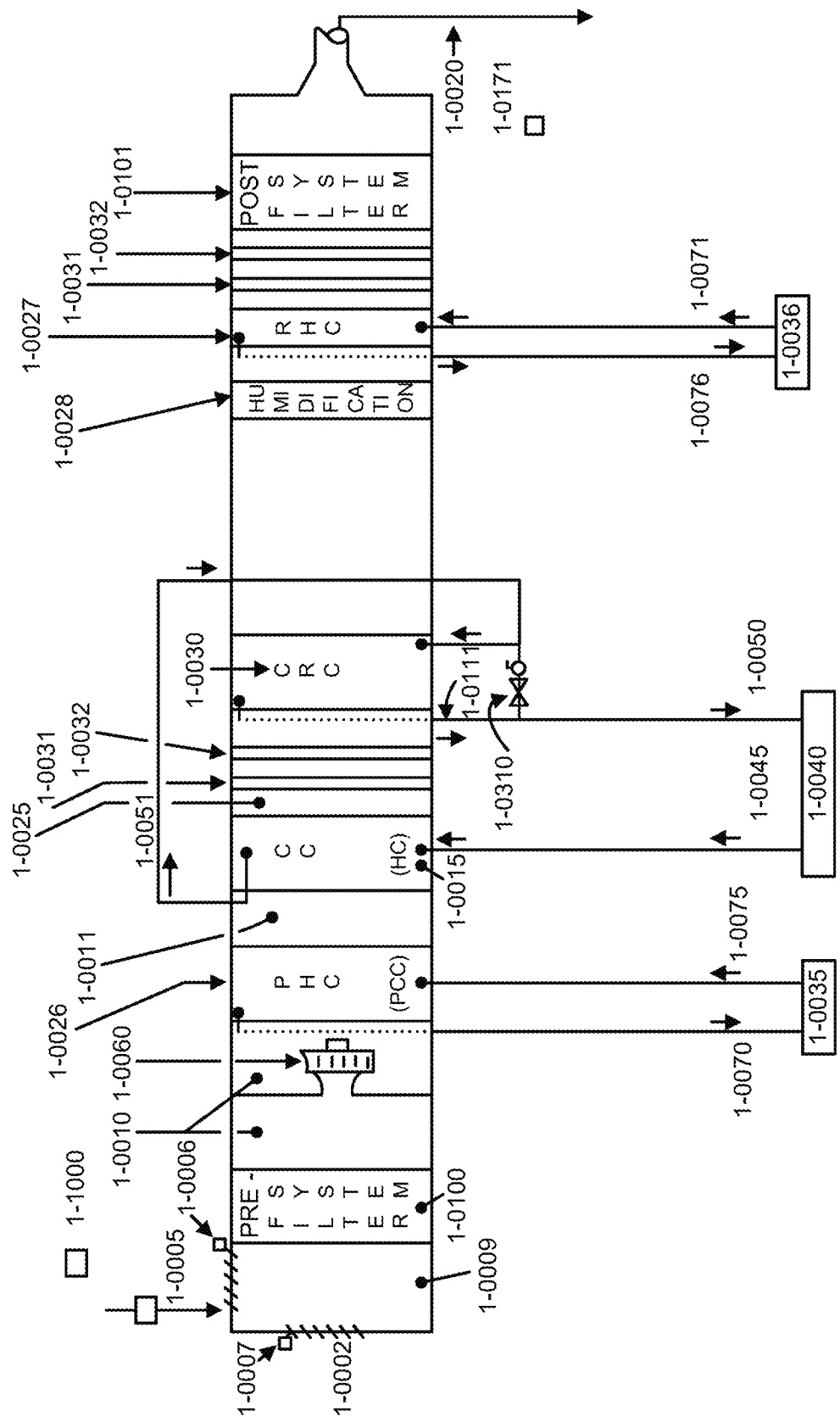
FIG. 5 is similar to the system illustrated in FIG. 4 with failsafe operation, but including a fixed or adjustable automatic flow control valve (AFCV)

FIG. 5 is similar to the system illustrated in FIG. 4 with failsafe operation (and includes many of the same or similar components, as illustrated in FIGS. 4 and 5), but in lieu of a differential pressure control valve 1-0310 in the bypass leg/fluid conduit around the CRC 1-0030, there may be a fixed or adjustable automatic flow control valve (AFCV) 1-0310, among other control valves. With this configuration, a greater amount of water from the CC 1-0015 bypasses the CRC 1-0030 under low flow rates, so less reheat is accomplished under low loads. As the chilled water flow rate increases, the AFCV limits the amount of flow that can go around the CRC 1-0030, so a higher % of water from the CC 1-0015 passes through the CRC 1-0030, providing a greater amount of reheat energy at higher loads.

Due to the chilled water pressure drop across the fixed or adjustable automatic flow control valve, even when it is 100% open to flow, there may always be some CHW flow that is circulated through the CRC 1-0030, providing reheat and reducing the RH of the supply air even if the fixed or adjustable automatic flow control valve is 100% open. Additionally, a manual valve 1-0310 can be inserted in that line to induce more flow through the CRC as desired or needed.

Figure 6:
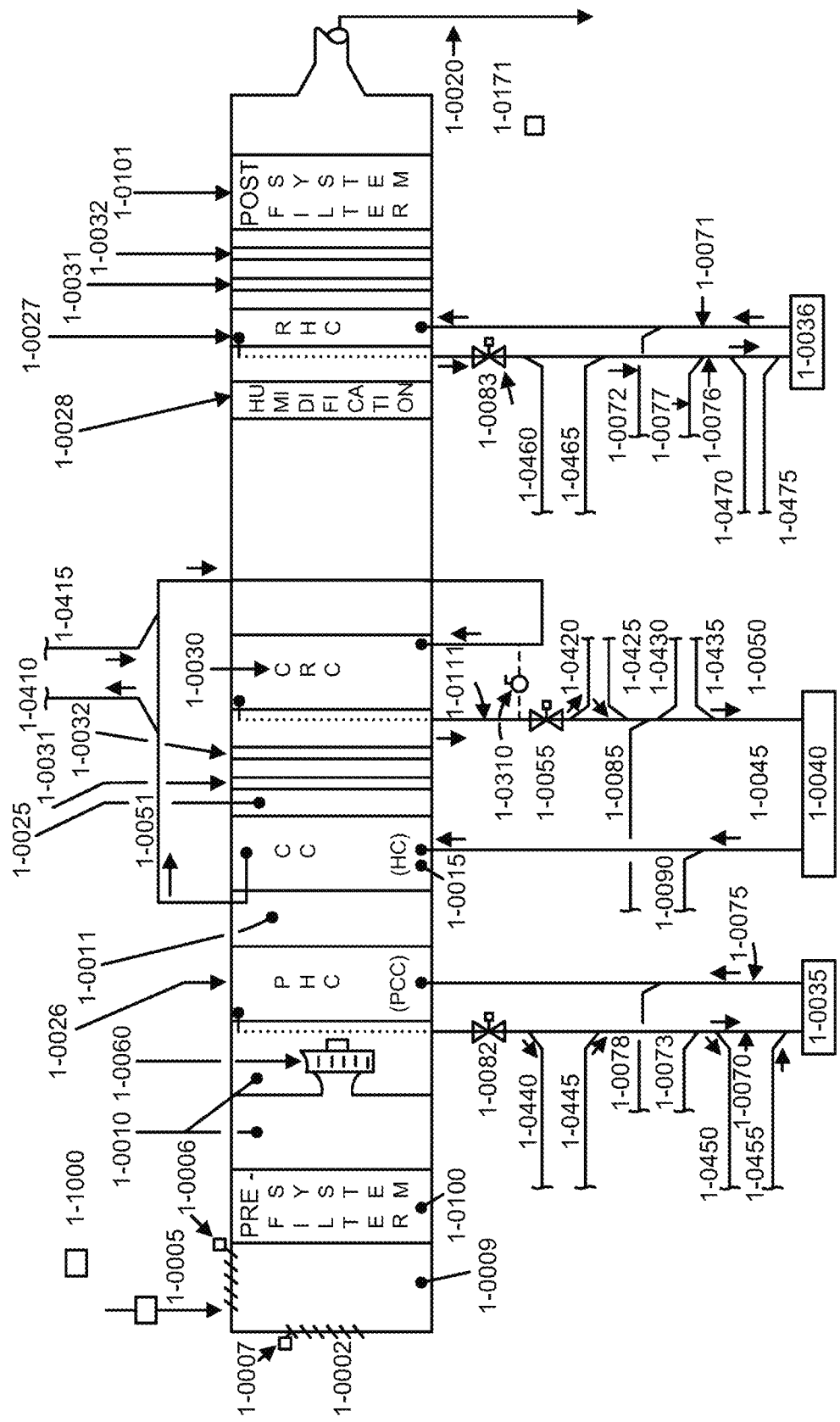
FIG. 6 is similar to the system illustrated in FIG. 1 with failsafe operation, but with added functionality.

FIG. 6 is similar to the system illustrated in FIG. 1 with failsafe operation (and includes many of the same or similar components, as illustrated in FIGS. 1 and 6), but with added functionality. For example, energy recovered from the CC 1-0015 upstream or downstream from the CRC 1-0030 can be used in an energy efficient manner for alternate uses such as radiant cooling systems, outside air (fresh air) pre-cooling or preheating, passive or active chilled beams, induction units or other loads that need tempered fluid that is close to or above the dewpoint temperature during the dehumidification season, to avoid condensation issues. Flow and temperature to the various loads can be controlled by modulating control valves in the bypass legs of the piping (fluid conduit) connections, mixing valves, pumps or other means.

For example, as shown in FIG. 6, at 1-0410, during some situations, such as during cooling season, fluid leaving the CC 1-0015 may be supplied (such as via a fluid conduit) to other cooling systems (e.g., OSA pre-cool coils, radiant cooling, induction units, active or passive chilled beams, under-floor air handling units and other systems). During other situations, such as heating season, during which the CC 1-0015 may act as a heating coil, fluid may be supplied (such as via a fluid conduit) to other heating systems (e.g., OSA pre-heat coils, radiant heating, induction units, active or passive chilled beams (which also provide heating), under-floor air handling units and other systems). At 1-0415, fluid from the other cooling and/or heating systems may be returned to the cooling and dehumidification system.

Additionally, as shown in FIG. 6, at 1-0420, in certain situations, such as during a cooling season, fluid leaving the CRC 1-0030 may be supplied to other cooling systems, (e.g., OSA pre-cool coils, radiant cooling, induction units, active or passive chilled beams, under-floor air handling units and the like). In other situations, such as during heating season, the CC 1-0015 may act as a heating coil, thereby causing fluid leaving the outlet of the CC 1-0015 and/or the CRC 1-0030 may be supplied to other heating systems at 1-0420 (e.g., OSA pre-heat coils, radiant heating, induction units, active or passive chilled beams (which also provide heating), under-floor air handling units and the like). At 1-0425, the fluid may return from the other cooling and/or heating systems to the fluid conduit between the CRC 1-0030 and the cooling plant 1-0040.

As noted above, the return fluid 1-0050 may exit the CRC 1-0030 via an outlet through a fluid conduit 1-0111 that leads to one or more other loads 1-0085 and/or the cooling plant 1-0040. At 1-0430, during some situations, such as during cooling season, fluid leaving main chilled fluid piping (e.g., conduit) system may be supplied to other cooling systems (e.g., OSA pre-cool coils, radiant cooling, induction units, active or passive chilled beams, under-floor air handling units and the like). In other situations, such as during heating season, the CC 1-0015 may act as a heating coil, thereby causing fluid leaving main fluid piping (e.g., conduit) system to be supplied to other heating systems (e.g., OSA pre-heat coils, radiant heating, induction units, active or passive chilled beams (which also provide heating), under-floor air handling units and other systems).

As shown in FIG. 6, in some implementations, fluid passing via a fluid conduit between the heating source 1-0035 and the PHC 1-0026 may also flow to and/or otherwise be supplied to other heating systems at 1-0440

(e.g., OSA pre-heat coils, radiant heating, induction units, active or passive chilled beams (which also provide heating), under-floor air handling units and other systems). Fluid from the other heating systems may return to the fluid conduit at 1-0445. As noted above, the fluid conduit may also provide a heating fluid supply to other loads at 1-0078 and return the heating fluid supply from other loads at 1-0073. In addition or alternatively, at 1-0450, fluid may exit the main fluid conduit and be supplied to other heating systems (e.g., OSA pre-heat coils, radiant heating, induction units, active or passive chilled beams (which also provide heating), under-floor air handling units and other systems). Fluid from the other heating systems may return to the fluid conduit at 1-0455 to flow to the heating source 1-0035.

In some implementations, fluid passing via a fluid conduit between the heating source 1-0036 and the RHC 1-0027 may also flow to and/or otherwise be supplied to other heating systems at 1-0460 (e.g., OSA pre-heat coils, radiant heating, induction units, active or passive chilled beams (which also provide heating), under-floor air handling units and other systems). Fluid from the other heating systems may return to the fluid conduit at 1-0465. As noted above, the fluid conduit may also provide a heating fluid supply to other loads at 1-0072 and return the heating fluid supply from other loads at 1-0077. In addition or alternatively, at 1-0470, fluid may exit the main fluid conduit and be supplied to other heating systems (e.g., OSA pre-heat coils, radiant heating, induction units, active or passive chilled beams (which also provide heating), under-floor air handling units and other systems). Fluid from the other heating systems may return to the fluid conduit at 1-0475 to flow to the heating source 1-0036.

The ability to use the recovered cooling and/or heating energy from the chilled fluid loop to serve these loads is unique to the designs described herein. Typical HVAC system designs for humid locations may provide a design chilled fluid return temperature that may be 52° F. to 60° F. These temperatures may typically be well below the dewpoint temperatures of the spaces being served, so if this fluid was used directly in the equipment or radiant cooling or heating system, condensation would occur in the equipment or spaces, or on the walls, floors and ceilings of radiantly cooled facilities, unless the water temperature being supplied to the equipment is raised in some manner.

In some cases, completely separate cooling plants and fluid distribution systems are installed to provide the tempered fluid that is several degrees above the dewpoint temperature. These separate systems can be very energy intensive, as the cooling equipment (such as from the cooling plant 1-0040) typically operates at a 3° F. to 5° F. chilled water system temperature differential, which can be very costly in terms of pipe, pump and variable speed drive costs and energy intensive due to the high chilled fluid flow rates. With a HEDS implementation (such as the systems described herein), the chilled fluid temperatures can be used directly, with a mixing valve and a pump, to provide the needed capacities and chilled fluid temperatures.

Energy recovery is also shown to be available from the preheat coil system and the reheat coil system.

Other implementations can utilize similar energy recovery strategies.

Figure 7:
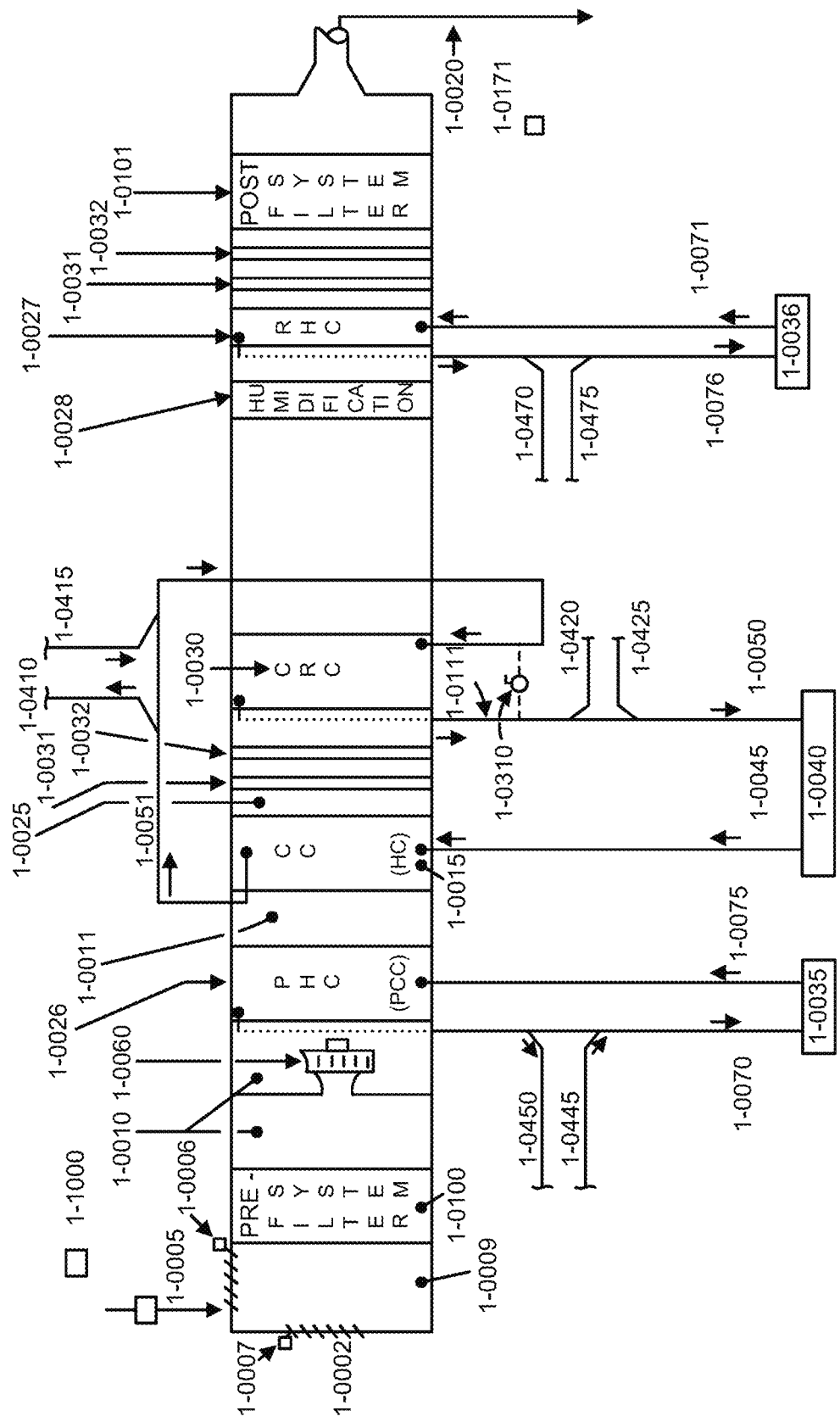
FIG. 7 illustrates a system that is similar to the system illustrated in FIG. 6 with failsafe operation, but does not use any form of a control valve to modulate capacity.

FIG. 7 illustrates a system that is similar to the system illustrated in FIG. 6 with failsafe operation (and includes many of the same or similar components, as illustrated in FIGS. 6 and 7), but does not include a control valve (e.g., control valve 1-0055) to modulate capacity, and accordingly, it is an ultimate in failsafe designs. Capacity control, energy draw and sensible, latent and energy recovery capacity modulation is accomplished via changing various system setpoints, such as by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. The system can be applied to a single unit, or a multiplicity of units that are piped in a design that is hydraulically self-balancing, or the differential pressures at the individual units is relatively consistent between the individual units. The system can be piped for reverse return, and designed with coil and piping pressure drops that promote relatively even flow throughout all areas of the facility.

Figure 8:
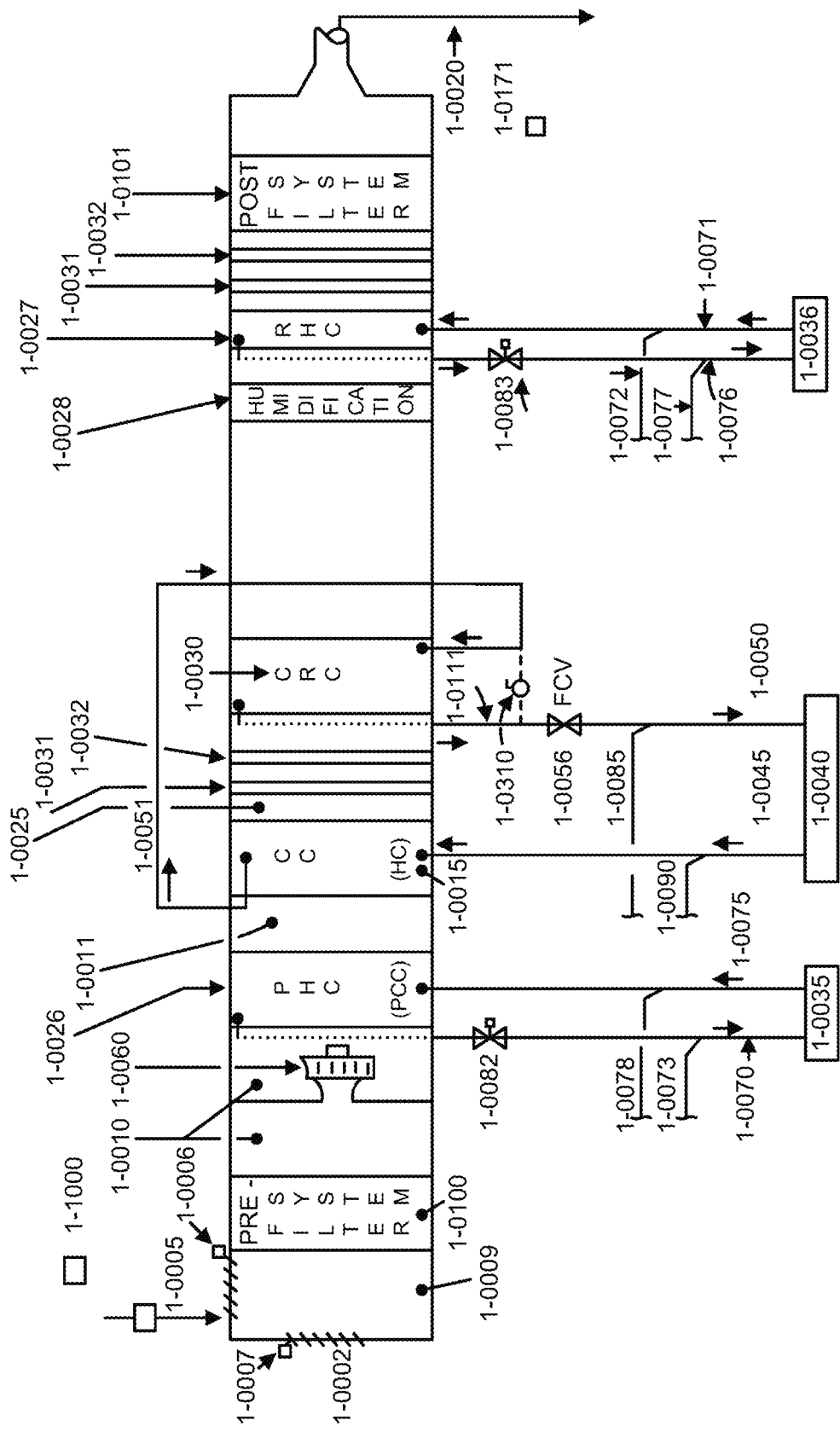
FIG. 8 illustrates a failsafe cooling coil and cooling recovery coil system for a single unit structure.

FIG. 8 illustrates a system that is similar to the system shown in FIG. 1 (and includes many of the same or similar components, as illustrated in FIGS. 1 and 8) with failsafe operation, except in the illustrated variation, a fixed or variable setpoint automatic flow control valve (FCV or AFCV) 1-0056 may be used instead of a modulating control valve 1-0055. AFCV's are sometimes referred to as automatic flow limiting valves, or automatic balancing valves. The FCV (AFCV) 1-0056 is only depicted to be used in line with the CC 1-0015/CRC 1-0030 equipment, but it can be applied to the PHC 1-0026 and RHC 1-0027 as the design warrants.

In some implementations consistent with the system shown in FIG. 8, failsafe reheat uses a CRC, such as the CRC 1-0030. The cooling recovery coil (CRC) 1-0030 is in direct communication with cooling coil (CC) 1-0015—all of the water that leaves the CC 1-0015 goes through the CRC 1-0030. A fixed or variable setpoint automatic flow control valve 1-0056 is used as one part of the capacity variation control. A manual bypass valve 1-0310 and the associated piping (e.g., fluid conduit) to allow some of the chilled fluid that leaves the CC 1-0015 to bypass the CRC 1-0030 may also be included. Additionally or alternately, some combination of fixed or adjustable, differential pressure control valves or automatic control valves, modulating control valves, and manual control valves can be utilized to control the flow through or around the coil systems.

In one implementation, 100% of the fluid flow that passes through the cooling coil (CC) 1-0015, passes through the cooling recovery coil (CRC) 1-0030. With this configuration, even if there is some form of an equipment or control system failure, the cooled and dehumidified air gets reheated by the CRC 1-0030 so that it does not leave the air handling unit (AHU) with saturated or nearly saturated air conditions. The use of a fixed or variable setpoint automatic control valve 1-0056 provides even greater failsafe operation, as the valve will never be 100% closed to flow through the coils, so dehumidification and reheat will occur even if the control system has failed.

The automatic flow control valve 1-0056 may limit the maximum flow through the coil systems to comply with the fixed or adjustable flow setpoint of the valve.

The lower relative Humidity (RH) air available from the CRC(s) 1-0030 reduces the potential for condensation to occur, and for relative humidity levels to rise above the desired levels.

Overall capacity and energy draw, sensible, latent and energy recovery capacity can be varied by varying fan speed setpoints and speeds, CFM setpoints and CFM's, AHU static pressure setpoints, chilled fluid flow through the coil systems (within the limits of the flow being set by the AFCV), chilled fluid pump speed setpoints and speeds, chilled fluid system differential pressure setpoints and differential pressures, chilled fluid supply temperature setpoints and chilled fluid supply temperatures.

For a given load, the control system will vary the dehumidification (moisture removal) capacity by changing some or all of the following variables and setpoints. To lower the dewpoint temperature of the air leaving the CC 1-0015, fan speed setpoints and speeds, CFM setpoints and CFM's, AHU static pressure setpoints, chilled fluid supply temperature setpoints and chilled fluid supply temperatures can be reduced to lower the dewpoint temperature of the air leaving the cooling coil. Chilled fluid flow through the coil systems (within the limits of the flow being set by the AFCV), chilled fluid pump speed setpoints and speeds, chilled fluid system differential pressure setpoints and differential pressures can be increased to lower the dewpoint temperature of the air leaving the cooling coil.

To raise the dewpoint temperature of the air leaving the cooling coil 1-0015, fan speed setpoints and speeds, CFM setpoints and CFM's, AHU static pressure setpoints, chilled fluid supply temperature setpoints and chilled fluid supply temperatures can be increased. Chilled fluid flow through the coil systems (within the limits of the flow being set by the AFCV 1-0056), chilled fluid pump speed setpoints and speeds, chilled fluid system differential pressure setpoints and differential pressures can be reduced to raise the dewpoint temperature of the air leaving the CC 1-0015.

For a given load, the control system will vary the sensible capacity of the CC 1-0015 by changing some or all of the following variables and setpoints. To lower the drybulb temperature of the air leaving the CC 1-0015, fan speed setpoints and speeds, CFM setpoints and CFM's, AHU static pressure setpoints, chilled fluid supply temperature setpoints and chilled fluid supply temperatures can be reduced. Chilled fluid flow through the coil systems (within the limits of the flow being set by the AFCV), chilled fluid pump speed setpoints and speeds, chilled fluid system differential pressure setpoints and differential pressures can be increased to lower the drybulb temperature of the air leaving the CC 1-0015.

To raise the drybulb temperature of the air leaving the CC 1-0015, fan speed setpoints and speeds, CFM setpoints and CFM's, AHU static pressure setpoints, chilled fluid supply temperature setpoints and chilled fluid supply temperatures can be increased. Chilled fluid flow through the coil systems (within the limits of the flow being set by the AFCV), chilled fluid pump speed setpoints and speeds, chilled fluid system differential pressure setpoints and differential pressures can be reduced to raise the drybulb temperature of the air leaving the CC 1-0015.

For a given load, the control system will vary the sensible reheat capacity of the CRC 1-0030 by changing some or all of the following variables and setpoints. To lower the drybulb temperature of the air leaving the CRC 1-0030, fan speed setpoints and speeds, CFM setpoints and CFM's, AHU static pressure setpoints, chilled fluid supply temperature setpoints and chilled fluid supply temperatures can be increased. Chilled fluid flow through the coil systems (within the limits of the flow being set by the AFCV), chilled fluid pump speed setpoints and speeds, chilled fluid system differential pressure setpoints and differential pressures can be increased to lower the drybulb temperature of the air leaving the CRC 1-0030.

To raise the drybulb temperature of the air leaving the CRC 1-0030, fan speed setpoints and speeds, CFM setpoints and CFM's, AHU static pressure setpoints, chilled fluid supply temperature setpoints and chilled fluid supply temperatures can be decreased. Chilled fluid flow through the coil systems (within the limits of the flow being set by the AFCV), chilled fluid pump speed setpoints and speeds, chilled fluid system differential pressure setpoints and differential pressures can be decreased to raise the drybulb temperature of the air leaving the CRC 1-0030.

For a given load the control system will vary the energy recovery capacity by changing some or all of the following variables and setpoints. Fan speed setpoints and speeds, CFM setpoints and CFM's, AHU static pressure setpoints, chilled fluid supply temperature setpoints and chilled fluid supply temperatures can be controlled to vary the energy recovery capacity of the unit. In addition, chilled fluid flow through the coil systems, chilled fluid pump speed setpoints and speeds, chilled fluid system differential pressure setpoints and differential pressures can be controlled to vary the energy recovery capacity of the unit. Dry bulb and dewpoint supply air temperature setpoints for the unit can be controlled to vary the energy recovery capacity of the unit.

To augment the above control system sequences, to meet the desired system setpoints, these variables may also be controlled: heated fluid flow through the coil systems, heated fluid pump speed setpoints and speeds, heated fluid system differential pressure setpoints and differential pressures, heated fluid supply temperature setpoints and heated fluid supply temperatures.

Figure 9:
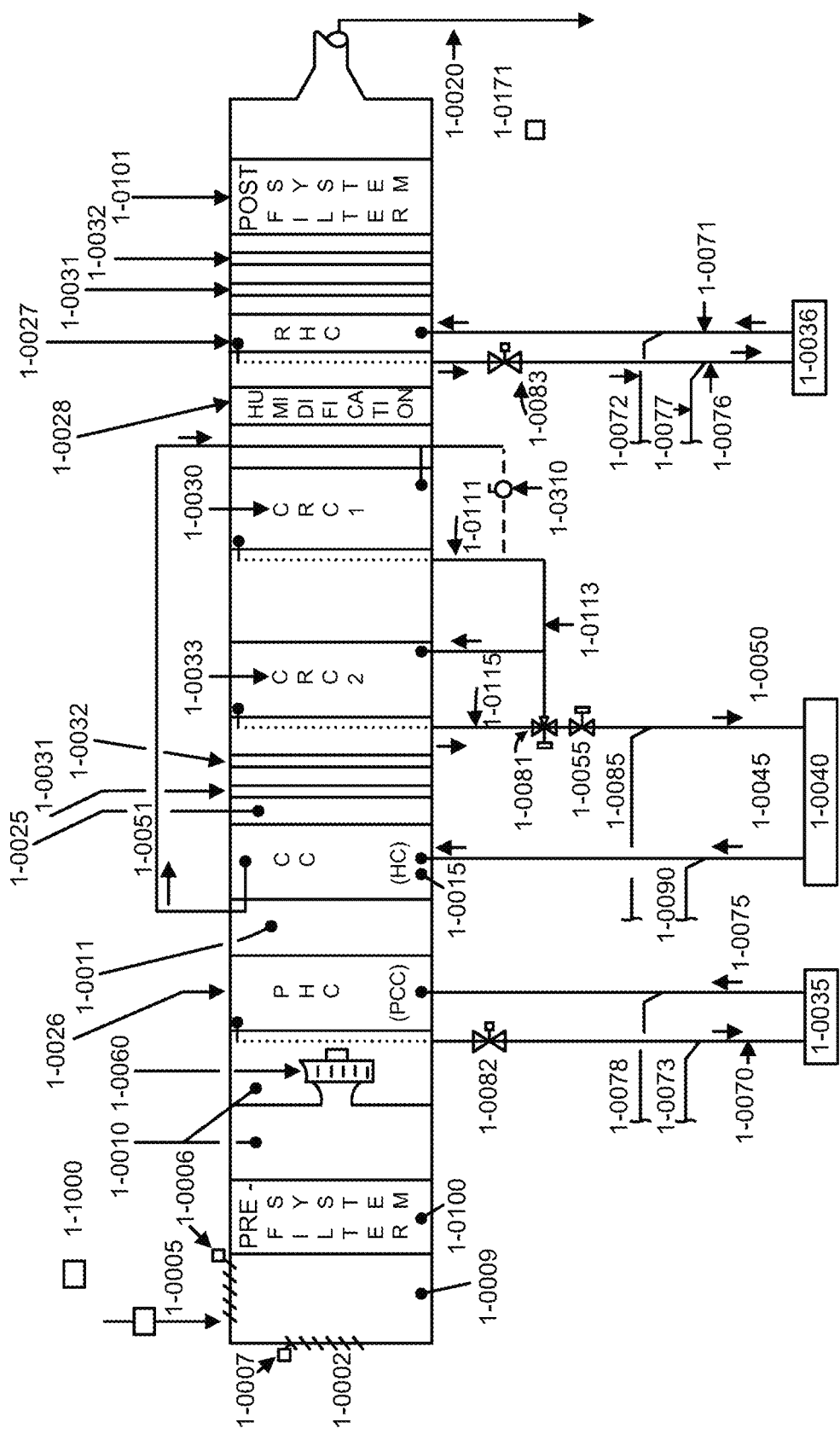
FIG. 9 is similar to the system illustrated in FIG. 1 with failsafe operation, but with added functionality.

FIG. 9 is similar to the system illustrated in FIG. 1 (and includes many of the same or similar components, as illustrated in FIGS. 1 and 9) with failsafe operation, but with added functionality. The CHW flow flows from the CC 1-0015 to the first CRC 1-0030, with 100% of the flow (or the desired fraction of the flow) passing directly from the CC 1-0015 into the first CRC 1-0030. The water that then leaves the first CRC 1-0030 can either pass through a second CRC 1-0033 (CRC2) that uses some form of flow control to modulate the capacity of CRC2 1-0033, or it can bypass the CRC2 1-0033 and be fed into the return line. In this case, the failsafe operation of the CC 1-0015 and the first CRC 1-0030 are augmented by CRC2 1-0033 and a control methodology that allows more precise temperature and RH control in the spaces/process loads being served and greater control over the energy consumption and demand profile of the system. If CRC2 1-0033 or the associated control system has issues of some sort, the CC 1-0015 and CRC 1-0030 are still able to provide cooling, dehumidification and reheat.

Failsafe reheat uses cooling recovery coil (CRC) 1-0030 with second CRC 1-0033 (CRC2) to provide more accurate temperature and RH control. The first cooling recovery coil (CRC) 1-0030 is in direct communication with cooling coil (CC) 1-0015, such that all of the water that leaves the CC 1-0015 goes through the first CRC 1-0030. A manual bypass valve 1-0310 and the associated piping to allow some of the chilled fluid that leaves the CC 1-0015 to bypass the CRC 1-0030 may also be included. Alternately, some combination of fixed or adjustable, differential pressure control valves or automatic control valves, modulating control valves, and manual control valves 1-0081, 1-0055 can be utilized to control the flow through the coil systems. A control valve 1-0081, 1-0055 can be used as one part of the capacity variation control. To provide more precise control of the leaving air conditions, the second CRC 1-0033 (CRC2) can be equipped with a control valve 1-0081 that either sends water through the CRC2 coil 1-0033 for added reheat and energy recovery capacity, or bypasses the CRC2 coil 1-0033, if less amounts of reheat and energy recovery are required.

In some implementations, 100% of the fluid flow that passes through the cooling coil (CC) 1-0015, passes through the cooling recovery coil (CRC) 1-0030. With this configuration, even if there is some form of an equipment or control system failure, the cooled and dehumidified air gets reheated by the CRC 1-0030 so that it does not leave the air handling unit (AHU) with saturated or nearly saturated air conditions. In other implementations, rather than 100% of the CHW flow passing from the CC 1-0015 into the CRC 1-0030, a desired fraction of the water can pass from the CC 1-0015 into the CRC 1-0030, with the remainder bypassing the CRC 1-0030.

The addition of CRC2 1-0033 and its capacity control/modulation system increases the usefulness of the system, while still providing some level of failsafe operation. This lower relative Humidity (RH) air reduces the potential for condensation to occur, and for relative humidity levels to rise above the desired levels.

Overall capacity and energy draw, sensible, latent and energy recovery capacity can be varied by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. All of the logic sequence descriptions included for FIG. 1 are valid with respect to FIG. 9 (and the designs shown in the other figures described herein), with the added functionality that the final dry bulb temperature can be increased and the final RH can be decreased by use of the CRC2 1-0033 and its capacity control system.

Figure 10:
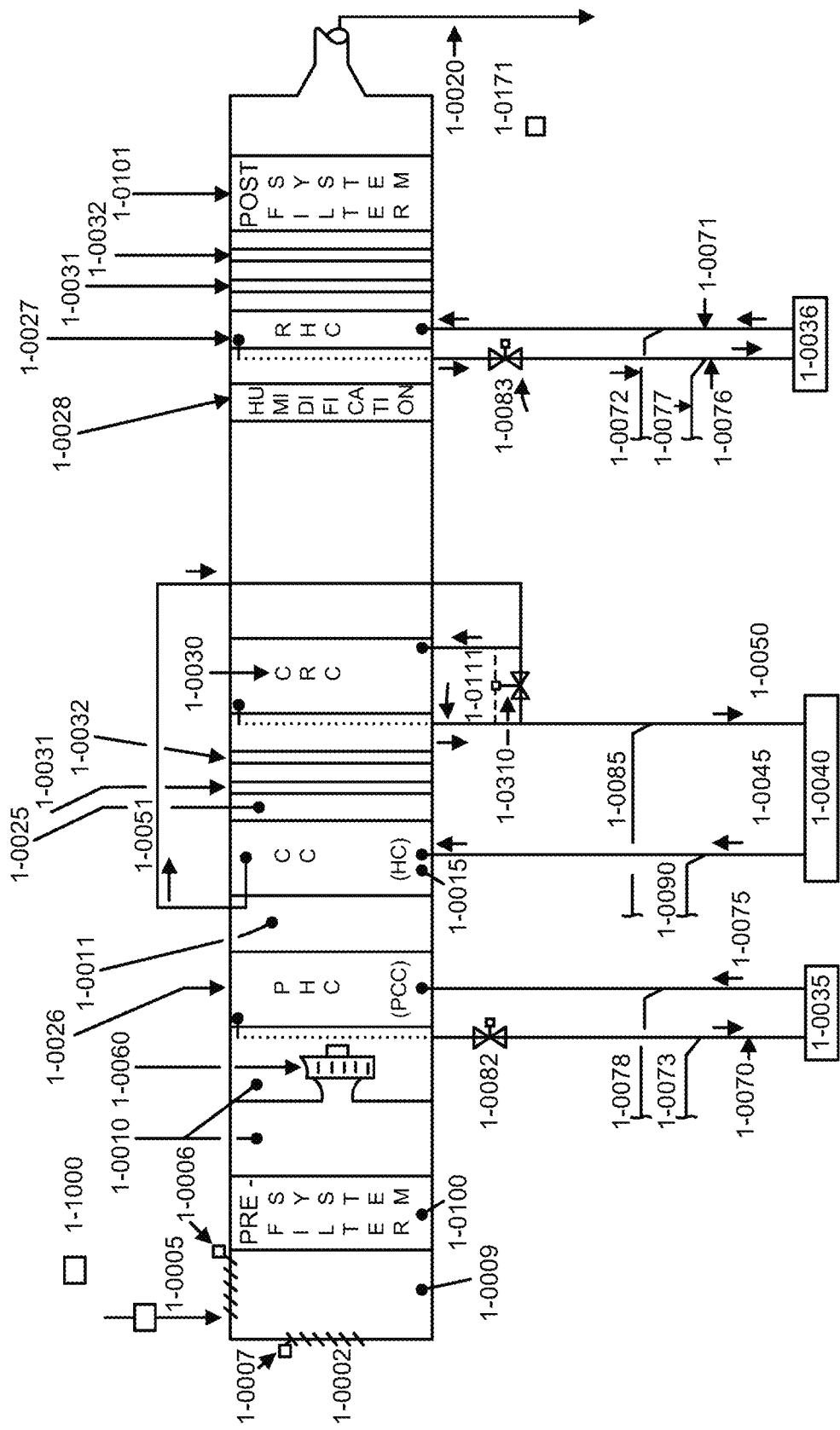
FIG. 10 is similar to the system illustrated in FIG. 1 with failsafe operation, but using a fixed or variable setpoint differential pressure control valve to bypass water around the CRC when the flow rates climb.

FIG. 10 is similar to the system illustrated in FIG. 1 (and includes many of the same or similar components, as illustrated in FIGS. 1 and 10) with failsafe operation, but in lieu of using a control valve in series with the CC 1-0015 and CRC to assist with capacity control, this implementation uses a fixed or variable setpoint differential pressure control valve 1-0310 to bypass water around the CRC 1-0030 when the flow rates climb. With this design, under low chilled fluid flow rates, a significant portion, up to 100%, of the CHW flow that leaves the CC 1-0015 enters the CRC 1-0030 to provide a greater level of reheat under low loads to provide warmed and lower RH air leaving the AHU. As the chilled fluid flow increases, indicating that there is a greater load that needs to be met, there will be a greater amount of CHW flow that bypasses the CRC 1-0030, so the AHU leaving air temperature is not increased to the extent it would be if all of the CHW that leaves the CC 1-0015 enters the CRC 1-0030.

Due to the chilled fluid pressure drop across the differential pressure control valve, there will always be some CHW flow that is circulated through the CRC 1-0030, providing reheat and reducing the RH of the supply air even if the bypass valve is 100% open. Additionally, a manual valve 1-0310 can be inserted in that line to induce more flow through the CRC 1-0030 as desired or needed.

Figure 11:
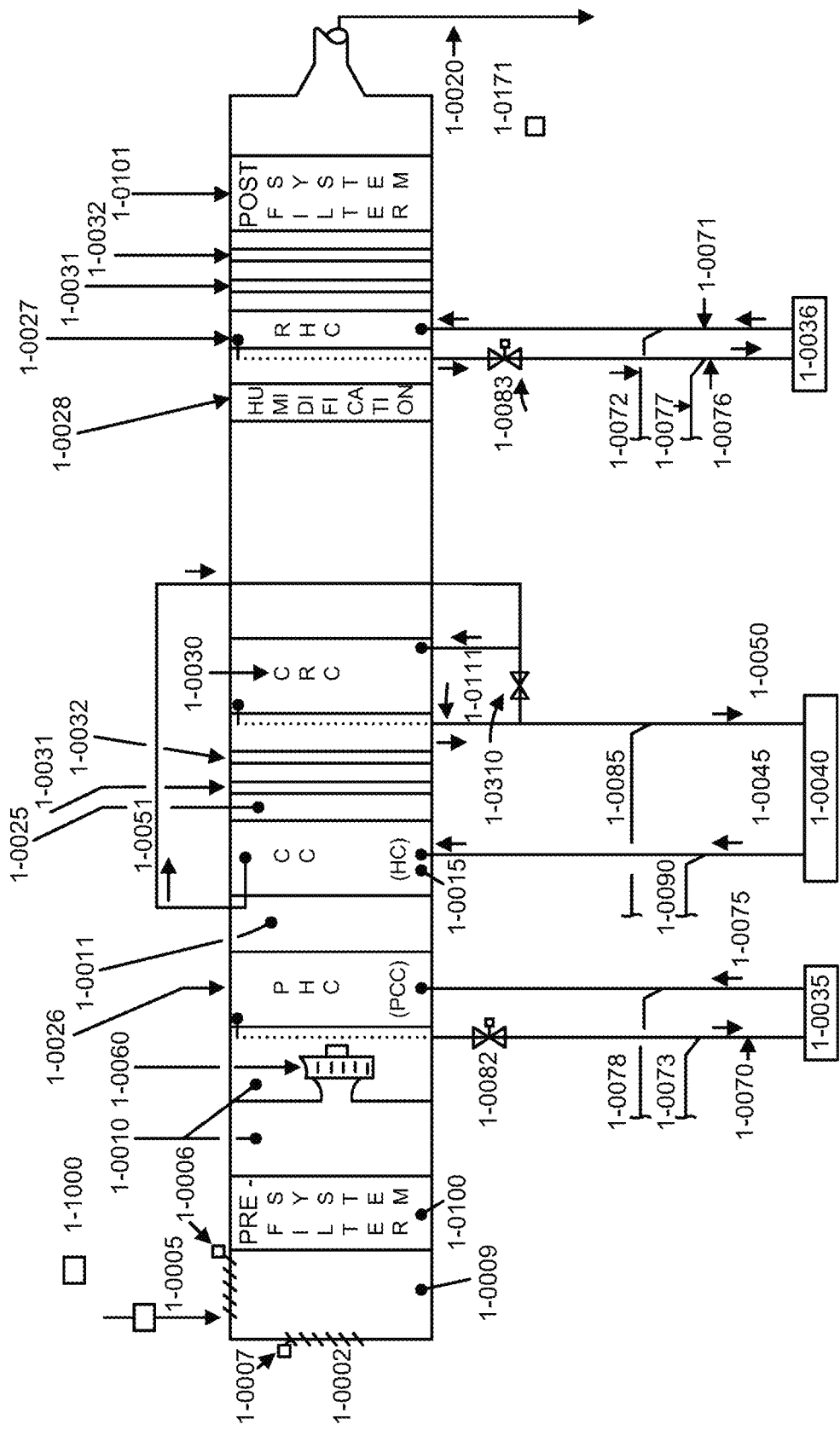
FIG. 11 is similar to the system illustrated in FIG. 10 with failsafe operation, but having a fixed or adjustable automatic flow control valve (FCV or AFCV)

FIG. 11 is similar to the system illustrated in FIG. 10 (and includes many of the same or similar components, as illustrated in FIGS. 10 and 11) with failsafe operation, but in lieu of a differential pressure control valve in the bypass leg around the CRC 1-0030, there is a fixed or adjustable automatic flow control valve (FCV or AFCV) 1-0310. With this configuration, a greater amount of water from the CC 1-0015 bypasses the CRC 1-0030 under low flow rates, so less reheat is accomplished under low loads. As the chilled fluid flow rate increases, the AFCV 1-0310 limits the amount of flow that can go around the CRC 1-0030, so a higher % of water from the CC 1-0015 passes through the CRC 1-0030, providing a greater amount of reheat energy at higher flow rates.

Due to the chilled fluid pressure drop across the fixed or adjustable automatic flow control valve 1-0310, there will always be some CHW flow that is circulated through the CRC 1-0030, providing reheat and reducing the RH of the supply air even if the fixed or adjustable automatic flow control valve is 100% open. Additionally, a manual valve can be inserted in that line to induce more flow through the CRC 1-0030 as desired or needed.

Figure 12:
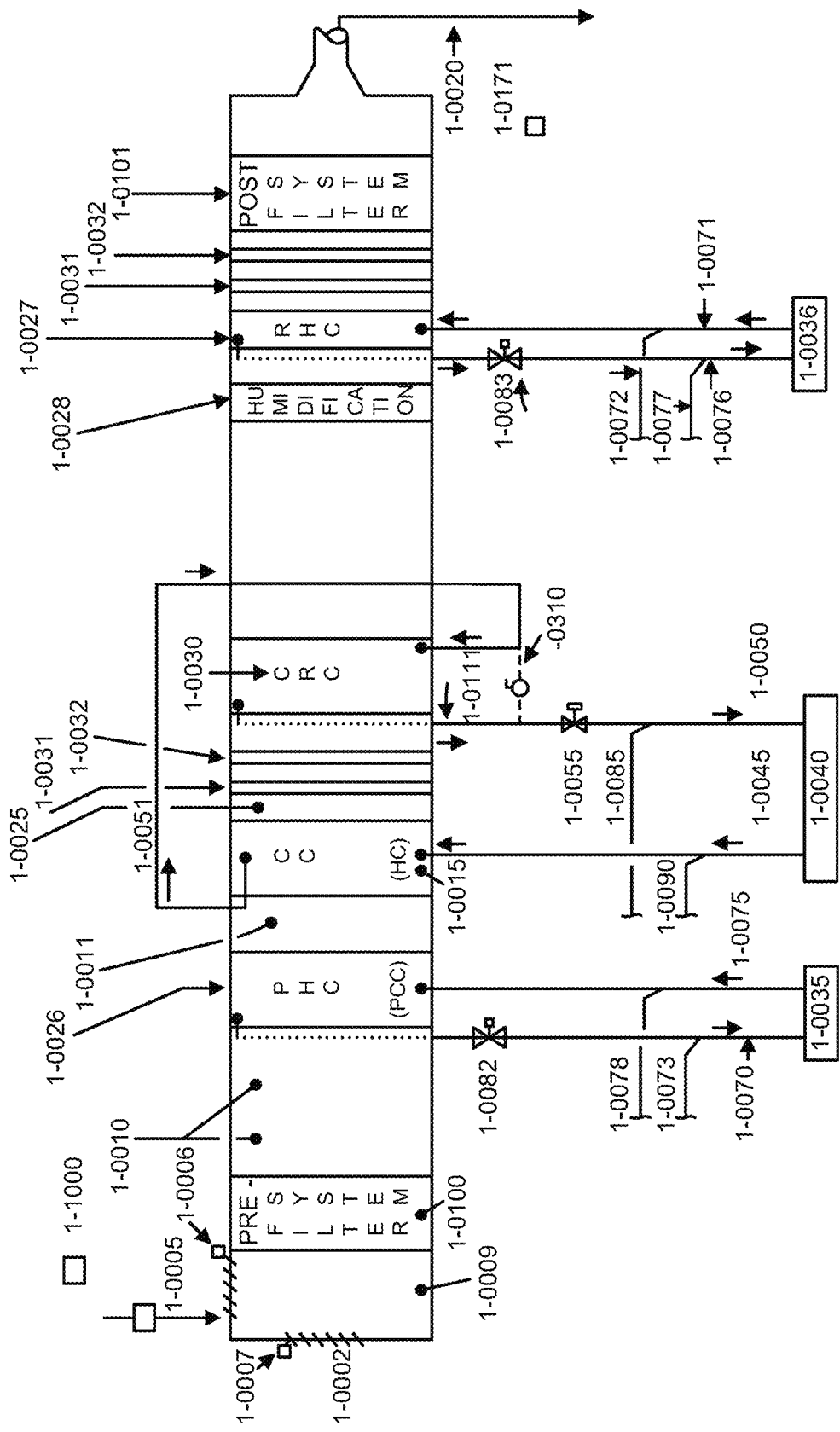
FIG. 12 is similar to the system illustrated in FIG. 1 with failsafe operation.

FIG. 12 is similar to the system illustrated in FIG. 1 (and includes many of the same or similar components, as illustrated in FIGS. 1 and 12) with failsafe operation. FIG. 12 is shown without a fan installed inside the unit, as a section that has air flow movement provided by other systems. It could be equipped with its own fans, and similarly, other implementations can be built without fans, relying on other systems to provide air movement.

FIGS. 13-23 depict various forms of high resiliency, failsafe reheat energy HEDS designs that can be coupled to a multitude of different heating plant and cooling plant systems. The systems shown in FIGS. 13-23 may include many of the same or similar components, as illustrated and described herein with respect to FIGS. 1-12). The ground sourced heat pump options can enhance the capacity of the earth-coupled fields that they are attached to. These implementations are depicted utilizing ground coupled chillers and heat pump systems (e.g., see FIG. 21), but can also provide similar benefits to other system configurations.

These designs can be used to replace inefficient chilled water based and DX refrigeration-based cooling dehumidification and heating/reheating systems that do not provide proper temperature or relative humidity control or that have over-run the capacity of their heat rejection or heat reclamation systems and are not functioning properly, or have failed. Commonly designed DX systems, can exhibit significant reliability and performance problems.

These implementations of the invention are unique designs in that they couple all of the energy recovery benefits of the Cooling Recovery Coils (CRC's) 1-0030, 1-0033 in addition to utilizing rejected heat from the condenser to false load the compressor to keep it from cycling on and off frequently.

As described elsewhere, compressor cycling can cause the condensate in the coil fin pack and drain pans to be re-evaporated when the compressor is cycled off, which causes a multitude of problems, so reducing or eliminating compressor cycling while maintaining the desired supply air dewpoint temperature, dry bulb temperature, wet bulb temperature, Relative Humidity and air volume is very important.

In some implementations, the condenser loop heat is reclaimed and used in a preheat coil (e.g., PHC 1-0026) when the compressor is running, as compared to other designs that may use reclaimed condenser heat as a reheat energy source, never to add load to a compressor upstream of the cooling coil via a pre-heat coil, or injecting it directly into the chilled fluid return line, to keep the compressor running for relative humidity control duties.

With existing designs, adding heat in a reheat position will typically not add load to a compressor fast enough, or with enough BTU's being added to the cooling load to keep a compressor from cycling off, so temperature and RH control will be lost.

With existing designs, in a Dedicated Outdoor Air System (DOAS) configuration, adding reclaimed heat in the reheat position will not add load to the compressor, as there is zero air recirculation through a DOAS, so other methods must be used to keep the compressors running, such as hot gas bypass, which may be problematic and self-defeating in nature as described elsewhere.

In other implementations of the current subject matter, energy recovered from the condenser side or various other sources of energy can be injected into the chilled fluid piping system return line(s) (e.g., at 1-0050) without the need to install a pre-heat coil to add heat to the load upstream of the CC 1-0015 to keep the compressor operating without cycling on and off.

Using the energy reclaimed from the condenser side in the PHC 1-0026 and RHC 1-0027 can significantly reduce the water temperature entering the condenser side of the cooling system. Lower water temperatures can reduce the condensing temperature and refrigerant pressure inside the cooling equipment. Reduced condenser side refrigerant pressures improve energy efficiency and also increase the cooling capacity of the equipment, within limits.

Figure 13:
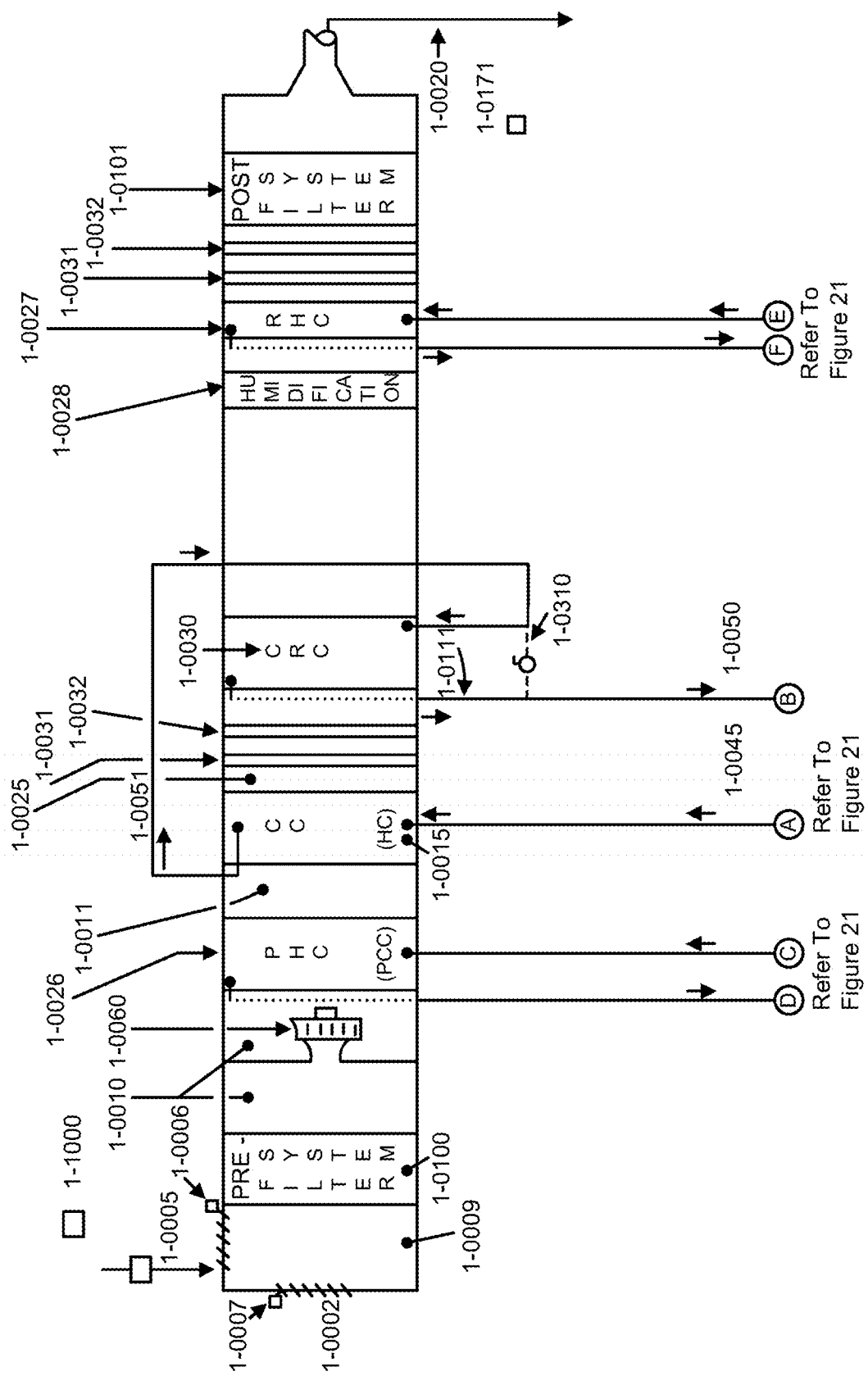
FIG. 13 depicts one form of a HEDS implementation that is similar to FIG. 1 with failsafe operation, but does not use any form of a control valve to modulate capacity.

FIG. 13 depicts one form of a HEDS implementation that is similar to FIG. 1 with failsafe operation (and includes many of the same or similar components, as illustrated in FIGS. 1 and 13, and otherwise described herein), but does not use any form of a control valve to modulate capacity, and accordingly, it is an ultimate in failsafe designs. Capacity control, energy draw and sensible, latent and energy recovery capacity modulation is accomplished via changing various system setpoints, such as by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. The system can be applied to a single unit, or a multiplicity of units that are piped in a design that is hydraulically self-balancing, or the differential pressures at the individual units is relatively consistent between the individual units. The system can be piped for reverse return, and designed with coil and piping pressure drops that promote relatively even flow throughout all areas of the facility. The system can be built as a package, and can be combined with the heat pump system shown in FIGS. 21-23, which uses a combination of ground-coupled heat rejection/heat reclamation and various levels of energy recovery and energy storage and energy storage augmentation for energy optimization.

This implementation is configured to condition a single unit, or a multiplicity of units that are piped in a design that is hydraulically self-balancing, or the differential pressures at the individual units is relatively consistent between the individual units.

The system is resilient due to its design, in that it will always provide some form of recovered energy reheat for relative humidity control and is capable of effectively operating at lower load conditions down to 0% cooling load, which still require dehumidification, e.g., when the conditions are cold and "clammy."

In contrast with these implementations of the current subject matter, typical systems cannot operate effectively, efficiently, reliably or with stability at these low loads. With the system designs described herein, the heat rejected by the cooling/dehumidification process can be rejected at both the PHC 1-0026 to false load the compressor in an energy efficient manner to keep it operational and keep the compressor from cycling on and off, as well as providing additional reheat energy via the reheat coil over and above that which may be available from the CRC 1-0030, or the CRC 1-0030 and CRC2 1-0033 as appropriate, to ensure that the RH of the air leaving the unit is sufficiently low to prevent the growth of mold. The RHC 1-0027 would typically not be used for RH control, as there would typically be enough low quality heat energy contained in the chilled fluid leaving the CC 1-0015 and entering the CRC 1-0030 (and or CRC2 1-0033) to adequately control the RH of the supply air and the conditioned spaces. With some operational modes, all of the energy that can be reclaimed, up to the full system capacity, would be used by incorporating the pre heat coil and reheat coils, to keep facilities dry, or to dry them out.

It has been proven that on/off compressor cycling, whenever the compressor cycles off, can create situations where condensation on the coils and in the drain pans can become re-evaporated into the airstream, ductwork and occupied spaces, increasing the potential for mold growth, so there is a need to keep compressors operational and providing consistent dehumidification by accurately maintaining CC 1-0015 leaving air temperatures. Additionally, chilled water based Constant Air Volume (CAV) systems must be continuously driven to supply the minimum design air temperature and then have that sub-cooled air reheated to provide proper RH control. Refer to Trane Engineers Newsletter Volume 33-2, FIGS. 2, 3, 4 and 5, and FIG. 1-1 excerpted from DOE/NETL Project No. DE-FC26-01NT41253 that depict these situations.

The design of the ground-coupled heat rejection/heat recovery system is such that heating energy that is rejected into the ground during the cooling mode or season can be recaptured and used for heating the facility when heat is required. With these implementations, similar pre-heat, anti-compressor cycling and reheat/energy recovery functionality can be achieved by utilizing refrigerant to air heat exchangers, or refrigerant to water to air heat exchangers for systems that utilize air cooled or evaporatively cooled heat rejection systems, or by using water to air heat exchangers for water cooled or fluid-cooler-cooled heat rejection systems.

During the heating season, typical heating systems utilize very small heat transfer coils and are designed to utilize 180° F.+ hot water supply temperatures, or even steam heating coils. Electric strip heaters can operate at several hundred degrees F.

A unique aspect of the systems described herein is that the size and design of the HEDS unit heat transfer systems allows very low quality heat energy to be used to provide reheat energy for RH control and to keep facilities warm.

For example, typical design temperatures for heating hot water is 180 F+ which is a very inefficient operating point for heating equipment. These temperatures cannot typically be provided by a heat pump system without a booster heating system, or a dedicated heating boiler plant, at very poor system efficiencies.

With HEDS implementations, heating water that is easily and efficiently available at 85° F. from a heat pump system in the heating mode, or from a condensing boiler at 95%+ efficiency can provide supply air temperatures of between 80° F. and 84° F. to heat the facilities, depending on the load and air volumes. At the start of the heating system, it is very likely that the heat quality stored in the earth can be used directly as the heat source for the loads, without running the compressor. These implementations are unique and are specifically designed to allow this energy saving feature to occur. Similarly, typical chiller systems are designed to reject heat from the cooling process at a temperature of approximately 95° F. for the water leaving the chiller. Fluid temperatures of approximately 95° F. can provide heating air temperatures of between 90° F. and 94° F. to heat the facilities, depending on the load and air volumes. Air cooled and evaporatively cooled equipment can provide heat at similar quality levels. Removing heat from the condenser side of the equipment and using it for pre-heating duties, reheating duties, or heating duties can reduce the refrigerant pressures in the condenser. Lower compressor refrigerant lift (the difference between the refrigerant pressure in the evaporator and the refrigerant pressure in the condenser) reduces the power required for cooling or heating, or increases the compressor cooling or heating capacity, or both, so the ability to provide relatively low heating hot water temperatures from the condenser side of the heat pump equipment to meet heating needs saves energy, and also reduces piping losses through the insulation systems, since the heating hot water temperatures that can be effectively used with these inventions can be 100° F. cooler than the typically designed heating systems equipment. HEDS, as described herein, allows system efficiencies and life cycle costs that cannot be matched by any other form of chilled fluid system based temperature and relative humidity control system.

Control strategies can be implemented that efficiently minimize the cooling load on the compressor, while reducing compressor on/off cycling and moisture re-evaporation off of the cooling coils and drain pans, while still keeping the building(s) positively pressurized with low relative humidity air as needed. This may be critical to keeping high moisture content, high vapor pressure air from migrating into the building or area being treated/conditioned.

Other control strategies can be implemented that utilize the recovered energy based pre-heat coils and reheat coils and lowering the chilled fluid leaving temperature setpoint to significantly load the compressor to maximize the moisture removal effect on the air, while adding significant amounts of reheat energy to lower the RH of the air in the unit, ductwork and facility. This can be used to dry the equipment, ductwork and facility out.

Sensors monitor the indoor and outdoor conditions and use the various components of the system as needed to maintain indoor dry bulb, dewpoint and RH % setpoints. There are setback setpoints programmed into the system, to allow wider tolerances when facilities are not occupied, while still maintaining the conditions needed to reduce/eliminate mold growth related to HVAC system design and operations.

Another unique aspect of these implementations of the current subject matter described herein is the use of energy reclaimed from the condenser side of the system to add load to the compressor via the Pre-Heat Coil (PHC) 1-0026 or chilled water loop to allow the compressor to stay online and providing stable, accurate and repeatable relative humidity control during low load conditions, all the way down to 0% cooling load.

This is being done instead of the typically problematic methods to add load to the compressor of injecting hot, high pressure, condenser side refrigerant gas into the evaporator or the refrigerant return line to the compressor. The older methods are typically referred to as "Hot Gas Bypass", or HGBP. The typical HGBP methods can cause operational and stability issues as the hot gas bypass valves are staged open and closed and then controlled.

In one HGBP strategy, hot refrigerant gas is injected into the suction line of the compressor to false load the compressor. This can also increase the superheat of the refrigerant gas that enters the compressor(s) causing thermal stress and premature equipment failures.

In many cases, the HGBP system is only enabled below 20% to 40% loads, but that does not help with the compressor cycling problem between that range and 100% load, where operation of these systems becomes more stable and repeatable. Even if the older systems were set up to run HGBP to keep the compressor loaded to 100%, the method of injecting the hot gas into the system to false-load the compressor may preclude the ability of the system to provide proper RH control, as the air temperature leaving the cooling coil may be increased well above the desired dewpoint temperature, causing RH control to fail.

Hot gas lines leading up to the HGBP solenoids and control valves may also be filled with condensed refrigerant in liquid form, so that when the hot gas lines are enabled and the HGBP solenoid and control valves are opened up, the evaporator or the compressor suction line can receive a slug of liquid refrigerant. Depending on the conditions, this slug of liquid refrigerant may not be completely evaporated and may make it back to the compressor. For many compressor types, liquid, even in the form of very fine droplets or a fine mist, entering the compressor can cause irreparable damage, creating the need for either a complete compressor rebuild, or a compressor replacement.

While the use of HGBP to add load to the compressor with existing designs will keep it running under light loads, there is no corresponding improvement in efficiency due to head pressure relief, e.g., reduced refrigerant pressures in the condenser as is the case with the various implementations of this invention. Removing heat from the heat rejection system via the preheat coil and/or reheat coil to false load the compressor reduces the refrigerant pressure in the condenser, improving energy efficiency and capacity.

Additionally, if HGBP it is installed in another typical manner, injecting the hot refrigerant gas into or upstream of the refrigerant distributor, or directly into the evaporator section, temperature and RH control can become very erratic, and the supply air temperatures can be affected to the degree that relative humidity control can be lost.

Eliminating loss of temperature and RH control are the main drivers for keeping the compressor running at light loads, rather than cycling it on and off as the loads are met and then overcooled.

For chillers with flooded evaporators, the hot refrigerant gas can be introduced at the bottom of the evaporator section, which is mostly filled with cold, low pressure liquid refrigerant. If hot gas is injected directly into the evaporator, significant and violent refrigerant boiling can occur that can send liquid refrigerant droplets or mist back into the compressor suction line, creating problems. The existing technologies can become self-defeating, in their inability to provide stable temperature and RH control, their excessive energy use, and their potential to cause equipment damage.

With existing designs, even with the use of HGBP to control compressor loading, temperature and RH control can be very poor. Using a variable air flow system design, such as the design utilized by HEDS in some implementations, can improve both temperature and RH control.

The unique use of HEDS as described herein and the energy recovery based preheat coil or chilled fluid loop line connections to create loads in the proposed inventions is significantly more stable, as the heating capacity can be modulated to maintain the compressor at a desired level of capacity, rather than being staged on and off, as is the case with most HGBP based systems. There may be no chance for liquid refrigerant slugs to make it back into the compressor suction lines, or the compressor, and the supply air temperatures are stable and maintained at setpoint down to 0% cooling loads.

The implementations of the current subject matter described herein are unique in that by using heat rejected from the compressor system to false load the compressor, the condenser cooling liquid temperature can be reduced in a meaningful manner. This allows the head pressure (condenser side refrigerant pressure) to be reduced with essentially zero energy expended, improving compressor and system capacity and efficiency.

In some implementations, a system in accordance with the disclosure herein includes control algorithms and methods for capacity control, head pressure control, pre-heat water volumes and temperatures, chilled water volumes and temperatures, cooling water volumes and temperatures, reheat water volumes and temperatures, pressures, and flow rates, reheat energy recovery and the control algorithms look at Relative Humidity, chiller and compressor loads, drybulb temperatures, dewpoint temperatures, building pressure, Grid loading, renewables and battery storage availability, and other input variables, etc. The control methods and sequences may be performed at least in part, by one or more controllers connected with each of the HEDS-based systems described herein, consistent with implementations of the current subject matter. Such control methods are described in more detail herein. The sequences shown and described herein are non-exhaustive and non-limiting. For example, each sequence shown and described may include one or more steps, each of which may not be required. Each step of each sequence may also be performed by the controller (e.g., control system 300) in a different order. In some implementations, each sequence may be combined with one or more other sequences.

Similar REDS-based pre-heat, compressor-load-additive, anti-compressor cycling logic and functionality can be achieved by utilizing refrigerant to air heat exchangers, or refrigerant to water heat exchangers, or refrigerant to water to air heat exchangers for air cooled or evaporatively cooled systems, or by utilizing liquid to air heat exchangers for water cooled, or fluid-cooler-cooled cooling systems. The term "water," or "fluid" as used herein, broadly describes a liquid-based heat rejection or heat transfer system.

Control and optimization strategies included with the systems described herein are designed to control air dry bulb temperatures, dewpoint temperatures, wet bulb temperatures and relative humidity, as well as air volumes to ensure that the desired comfort, relative humidity and temperature conditions are met at the lowest energy point during hours of normal activity, and that reduced air volumes, even down to zero CFM, can be used when the spaces are not occupied, or occupied in a manner that allows wider thermal comfort bounds to be utilized.

Other built in operational modes include a Continuous Dehumidification Mode, a Batch Dehumidification Mode, a Facility Dry-out Mode, a Constant Facility Pressurization Mode, these are briefly described next.

The Continuous Dehumidification Mode can be used, such as when a facility is unoccupied or occupied in a setback mode and the internal relative humidity and moisture content are above the desired setpoints. In this mode, cooling capacity is sent to the cooling coil (CC) (e.g., CC 1-0015) to reduce the dewpoint temperature of the air leaving the CC. 100% of the fluid leaving the CC 1-0015 is routed to the CRC 1-0030, or the CRC 1-0030 and the CRC2 1-0033, as may be the case.

The intent is to provide low dewpoint air at the warmest drybulb temperature possible using reclaimed energy to reduce the loads on the compressor and reduce cooling loads on the facility due to temperature differences between the ambient conditions and the conditions within the facility.

If the loads on the compressor are too low, reclaimed energy heating load from the condenser side of the system (or other systems) will be added to the least extent possible to keep the compressor from cycling off. The amount of heat sent to the preheat coil(s) or chilled fluid return line is controlled to minimally load the compressor to keep it operational. Variables will be monitored as needed to ensure that the least amount of energy is wasted to perform this function.

The ability to add heat to false load the compressor using the preheat coil strategy also provides significant reheat energy into the CRC 1-0030, which then reduces the loads on the compressor, improving system efficiency. Using reclaimed condenser loop heat injected directly into the chilled water return line will also false load the compressor to the extent required to keep the compressor loaded.

If it is desired to raise the temperature inside the building, additional reclaimed energy can be injected into the system via the preheat coil (e.g., PHC 1-0026), the reheat coil (e.g., RHC 1-0027) or the return fluid line (e.g., 1-0050) to the cooling plant (e.g., 1-0040). Up to 100% of the rejected heat can be used to increase the space temperature and lower the space RH. If greater heat quantities are required, load will need to be added to the compressor system via the preheat coil or the chilled fluid return line, and excess heat energy from the process can be used to heat the air up via the CRC(s) 1-0030, 1-0033 and the reheat coil 1-0027.

If it is desired to provide lower dewpoint air, the amount of heat being sent to the preheat coil 1-0026 can be modulated and the supply air temperature setpoint can be dropped, and those will false load the compressor to the desired level. The benefit is that the air will be lower dewpoint air, and lower overall RH air.

If the unit is a recirculating air unit, using condenser loop heat rejected solely into the reheat coil will false load the compressor over time, not instantaneously—as warmed up air is sent to the space, the added loads will eventually return back to the compressor and the supply air temperatures will continue to increase and the supply air RH will continue to decrease over time until the unit is at or near full capacity.

If the unit is a non-HEDS 100% fresh air, DOAS-style unit, the ability to false load the compressor using solely the condenser loop heat rejected into the reheat coil 1-0027 does not exist, as heat injected downstream from the CC 1-0015 will not false load the compressor. When fresh air loads are high, existing systems can provide low dewpoint, low RH, warm air to dry the facility out. This is due to existing designs not being able to add load to the compressor in an effective manner. With existing designs, under low load, this functionality does not exist.

With a HEDS based system such as the implementations of the current subject matter described herein, the supply air temperature setpoint can be dropped, the chilled fluid setpoint can be dropped, and the chilled fluid pump speed and the AHU fan speed (if appropriate) can be increased and that will false load the compressor. If there is a PHC upstream from the CC, or a connection into the CHW loop return line, the compressor can be fully loaded. The added benefit is that the air will be lower dewpoint air, and perhaps lower overall RH air.

Depending on the system configuration, a combination of fresh air for pressure control and recirculated air for temperature and RH control, can be utilized, all the way up to 100% fresh air intake as needed for pressure control, with the exhaust systems shut down, or modulated as needed.

The Batch Dehumidification Mode may be similar to the Continuous Dehumidification Mode, but the system may not run continuously, at the system runs as a Batch process.

As with the other modes, instrumentation is utilized that monitors indoor and outdoor dry bulb, dewpoint and wet bulb temperature, and relative humidity conditions, including wind speeds and pressure differentials between the indoor and outdoor conditions, and weather forecasts. Control methods determine how often the system will run in this mode and how long the off cycles will be. The Constant Facility Pressurization Mode is a variation on the Continuous Dehumidification Mode, but facility pressurization takes more control. The main HVAC system equipment may be operational, but it may just be a HEDS DOAS unit that is operational, bringing in the correct levels of fresh air to maintain the building in a slightly positive air pressure relationship to the outdoors. Typical operation may be to provide fresh air quantities of 10% to 25% of the design circulated airflow into the building, with minimal use of the exhaust systems.

The systems and methods described herein are provided to have positive air pressure to reduce vapor migration into a building. While many buildings are well-built, many more have "leaky" facades that allow vapor migration into the building which can then lead to a myriad of problems. This can be as simple as a building with operable windows that do not seal well when closed to facilities that were not constructed well, or not designed for air-tightness.

A Vapor Battery™ mode is designed to allow the HEDS design described herein to operate as a Distributed Energy Resource (DER) to increase and decrease the loads on the electrical grid as directed by any number of owner or utility signals or commands, be they fully automated or manual in nature.

When the HEDS implementations described herein may increase demand on the grid, the variables can be controlled to increase the electrical demand up to 100% of the capacity of the system. Such configurations may prevent significant load and capacity imbalances that can occur on the grid, helping to promote grid health.

Additionally, the HEDS user may actually be paid to increase the demand on the grid, so this can be a financially lucrative operational mode, if not an energy efficient one. Conversely, the load on the grid can be diminished by allowing the dry bulb and dewpoint temperatures and the RH setpoints to be relaxed. Temperature and RH limits can be exceeded for several hours without fear of biological growth. For extended outages or grid problems, the Vapor Battery and Batch Dehumidification Modes would be operated in sync with one another, and wider thermal setback ranges could be incorporated.

Facility Dry Out Mode uses condenser loop heat reclaim to false load the compressor via the preheat and reheat coils and airside system setpoint changes, The Facility Dry-Out Mode can be used in some situations, such as when a facility is occupied or unoccupied and the internal relative humidity and moisture content are above the desired setpoints. In this mode, the amount of heat sent to the preheat coil(s) or chilled fluid return line is controlled to fully load the compressor, or load the compressor as needed to provide a high enough volume of low RH, low dewpoint, warm to hot supply air into the facility. The ability to add heat to false load the compressor using the preheat coil strategy also provides significant reheat energy into the CRC 1-0030, which then reduces the loads on the compressor, improving system efficiency. Using reclaimed condenser loop heat injected directly into the chilled water return line will false load the compressor and allow significant heat to be injected into the airstream downstream from the CC 1-0015 and CRC 1-0030, which will raise the unit supply air temperature and lower the unit supply air RH. If it is desired to provide lower dewpoint air and the compressor is fully loaded, the amount of heat being sent to the preheat coil can be reduced and the supply air temperature setpoint can be dropped, and that will false load the compressor to the desired level. The added benefit is that the air may be lower dewpoint air, and may be lower overall RH air.

If the unit is a recirculating air unit, using condenser loop heat rejected solely into the reheat coil will false load the compressor over time, not instantaneously—as warmed up air is sent to the space, the added loads will return back to the compressor and the supply air temperatures will continue to increase and the supply air RH will continue to decrease over time until the unit is at or near full capacity.

If the unit is a non-HEDS 100% fresh air, DOAS-style unit, the ability to false load the compressor using solely the condenser loop heat rejected into the reheat coil does not exist, as heat injected downstream from the CC 1-0015 will not false load the compressor. When fresh air loads are high, existing systems can provide low dewpoint, low RH, warm air to dry the facility out, albeit in a slightly slower manner than the other implementations. This is due to existing designs not being able to add load to the compressor in an effective manner. With existing designs, under low load, this functionality does not exist.

With a HEDS based system such as implementations of the current subject matter described herein, the supply air temperature setpoint can be dropped, the chilled fluid setpoint can be dropped, and the chilled fluid pump speed and the AHU fan speed (if appropriate) can be increased and that will false load the compressor. The added benefit is that the air will be lower dewpoint air, and perhaps lower overall RH air.

None of these unique operating strategies can be effectively, efficiently and reliably used without some form of energy recovery from the chilled water loop as described by the various implementations of the current subject matter described herein.

Figure 14:
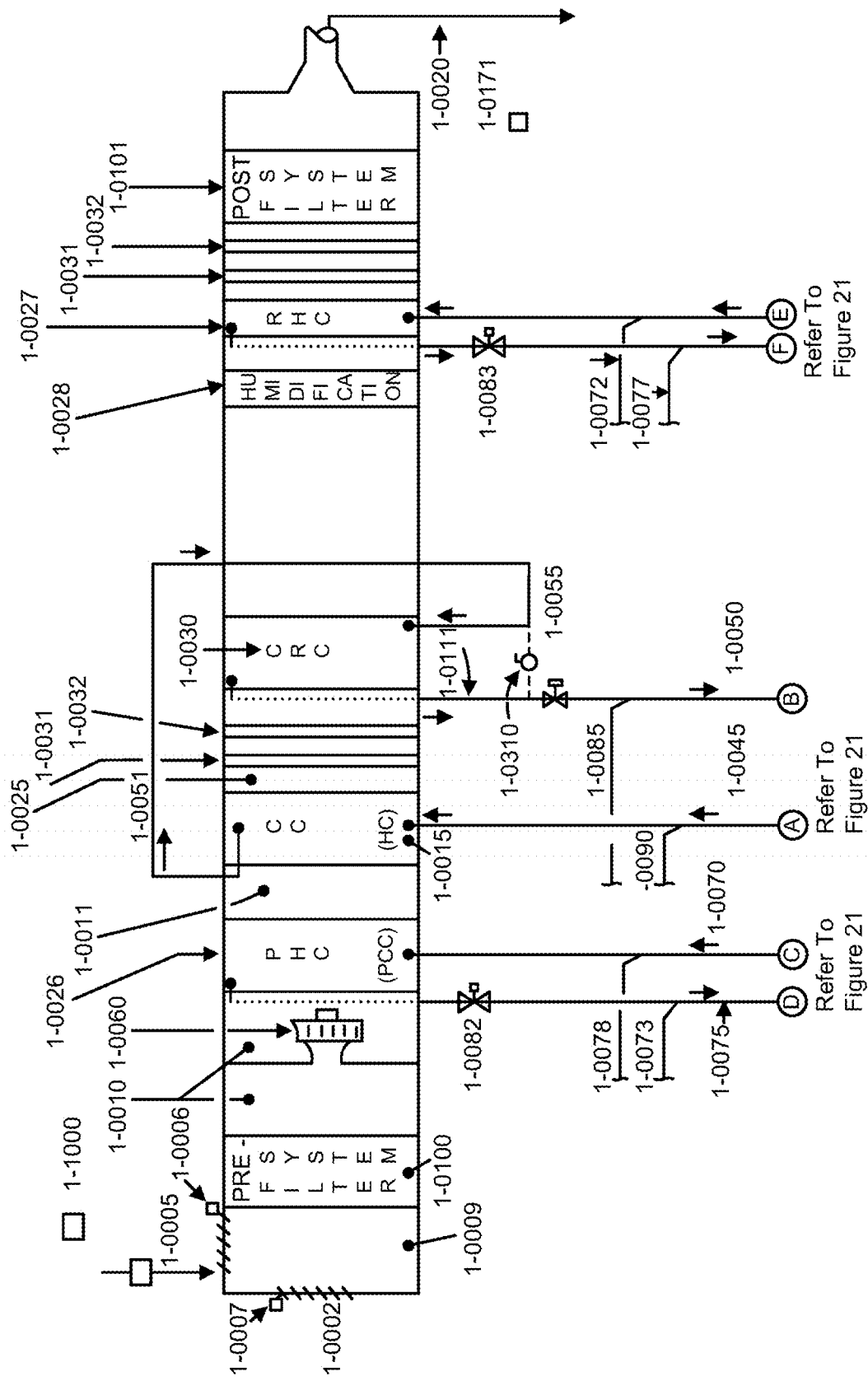
FIG. 14 depicts a system that is similar to FIG. 13 with failsafe operation, but is depicted providing HVAC services for multiple AHUs.

FIG. 14 depicts a system that is similar to FIG. 13 with failsafe operation (and includes many of the same or similar components, as illustrated in FIGS. 13 and 14, and otherwise described herein), but is depicted providing HVAC services for multiple AHUs vs. a single AHU as described and shown in FIG. 13.

Figure 15:
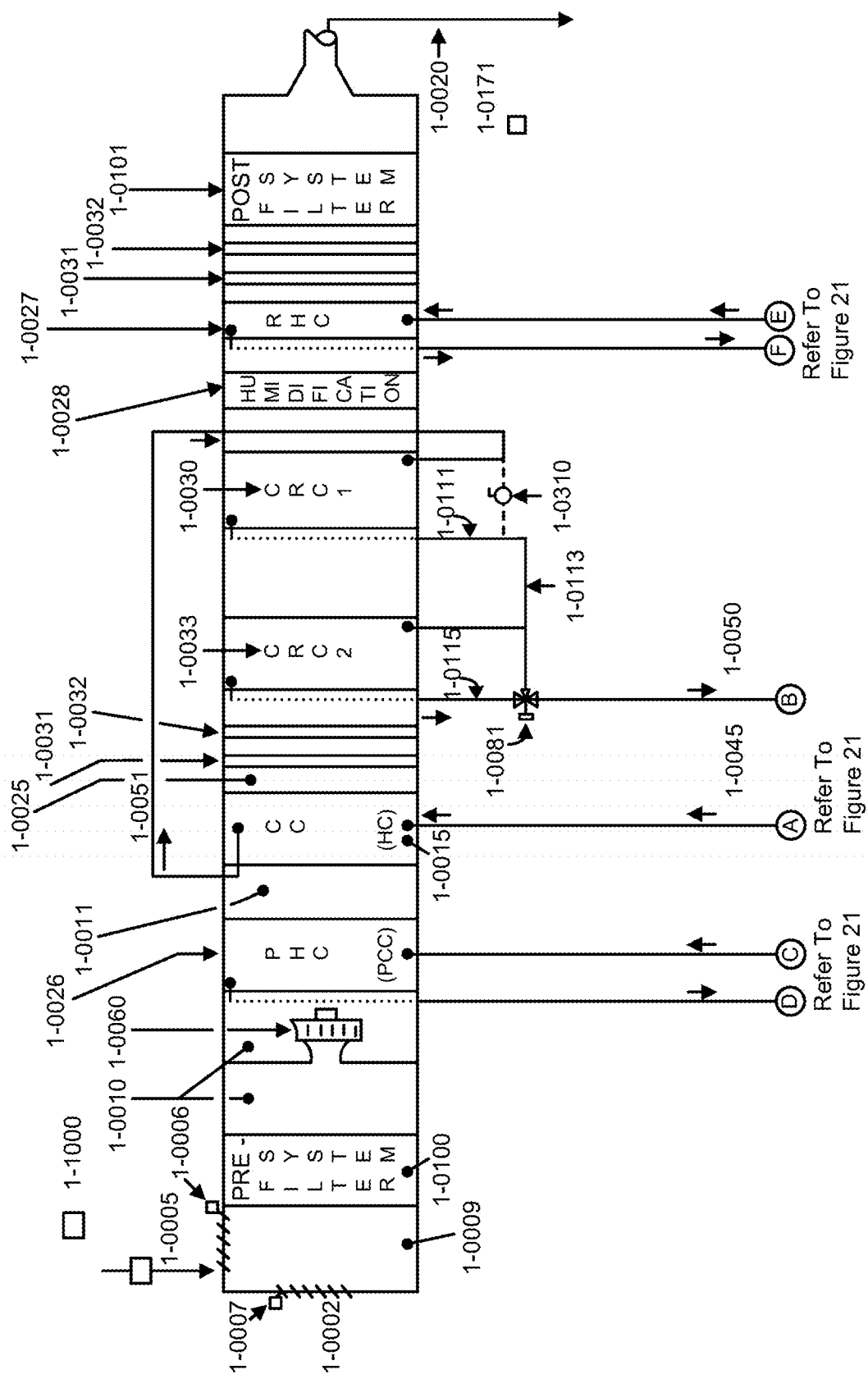
FIG. 15 depicts a system that is similar to FIG. 13, with failsafe operation, but with added functionality.

FIG. 15 depicts a system that is similar to FIG. 13 (and includes many of the same or similar components, as illustrated in FIGS. 13 and 15, and otherwise described herein), with failsafe operation, but with added functionality available with the addition of CRC2 1-0033 and the associated equipment, controls and logic, that can be controlled in a manner that provides more accurate temperature and relative humidity control for the supply air leaving the unit and the space(s) being conditioned. This implementation is described in more detail in the discussion for FIG. 19 below.

Figure 16:
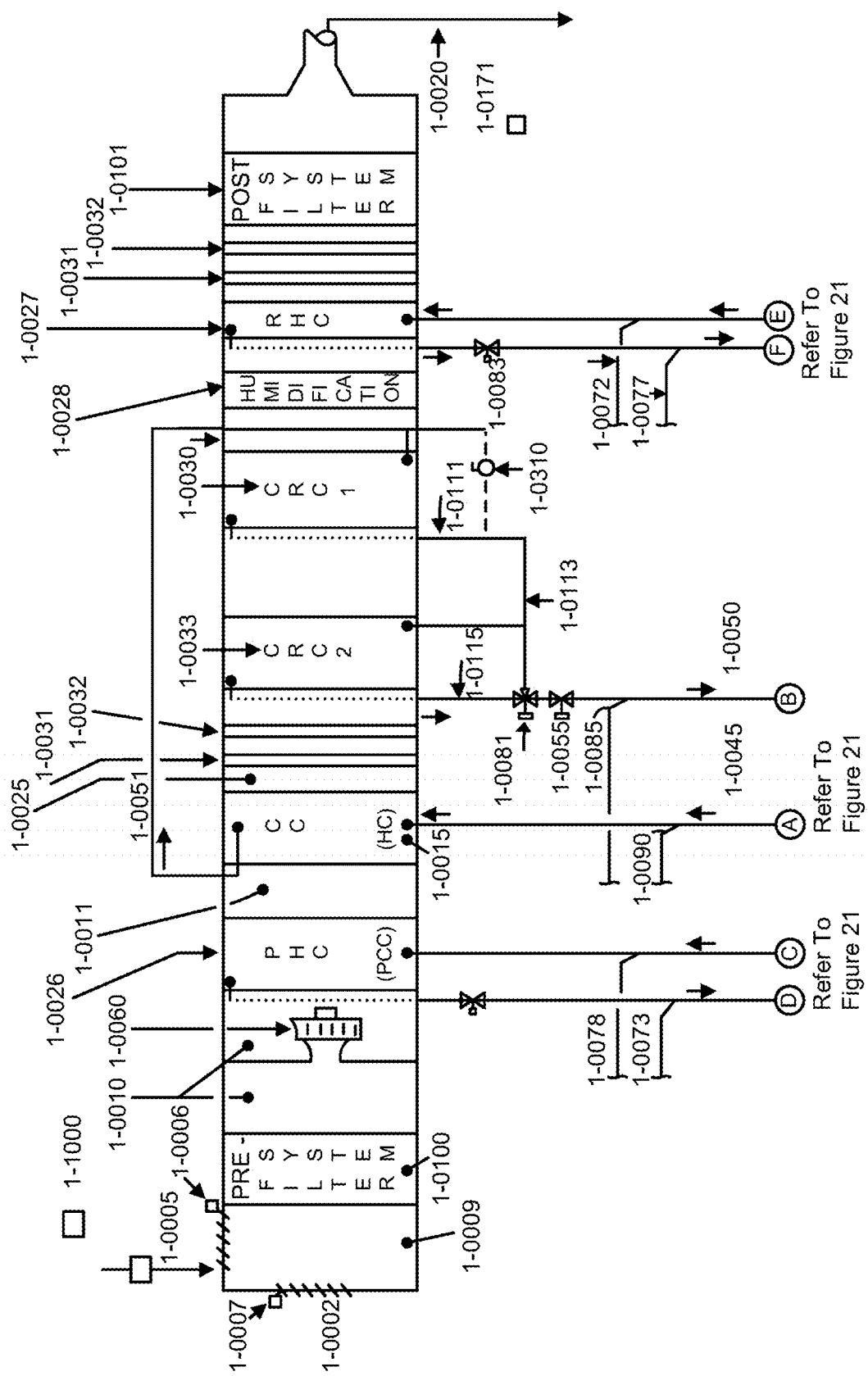
FIG. 16 depicts a system that is similar to FIG. 15 with failsafe operation, but is depicted providing HVAC services for multiple AHUs.

FIG. 16 depicts a system that is similar to FIG. 15 with failsafe operation (and includes many of the same or similar components, as illustrated in FIGS. 15 and 16, and otherwise described herein), but is depicted providing HVAC services for multiple AHUs vs. a single AHU as shown in FIG. 15 and elsewhere. CRC2 1-0033 functionality is described in further detail below with respect to FIG. 19.

Figure 17:
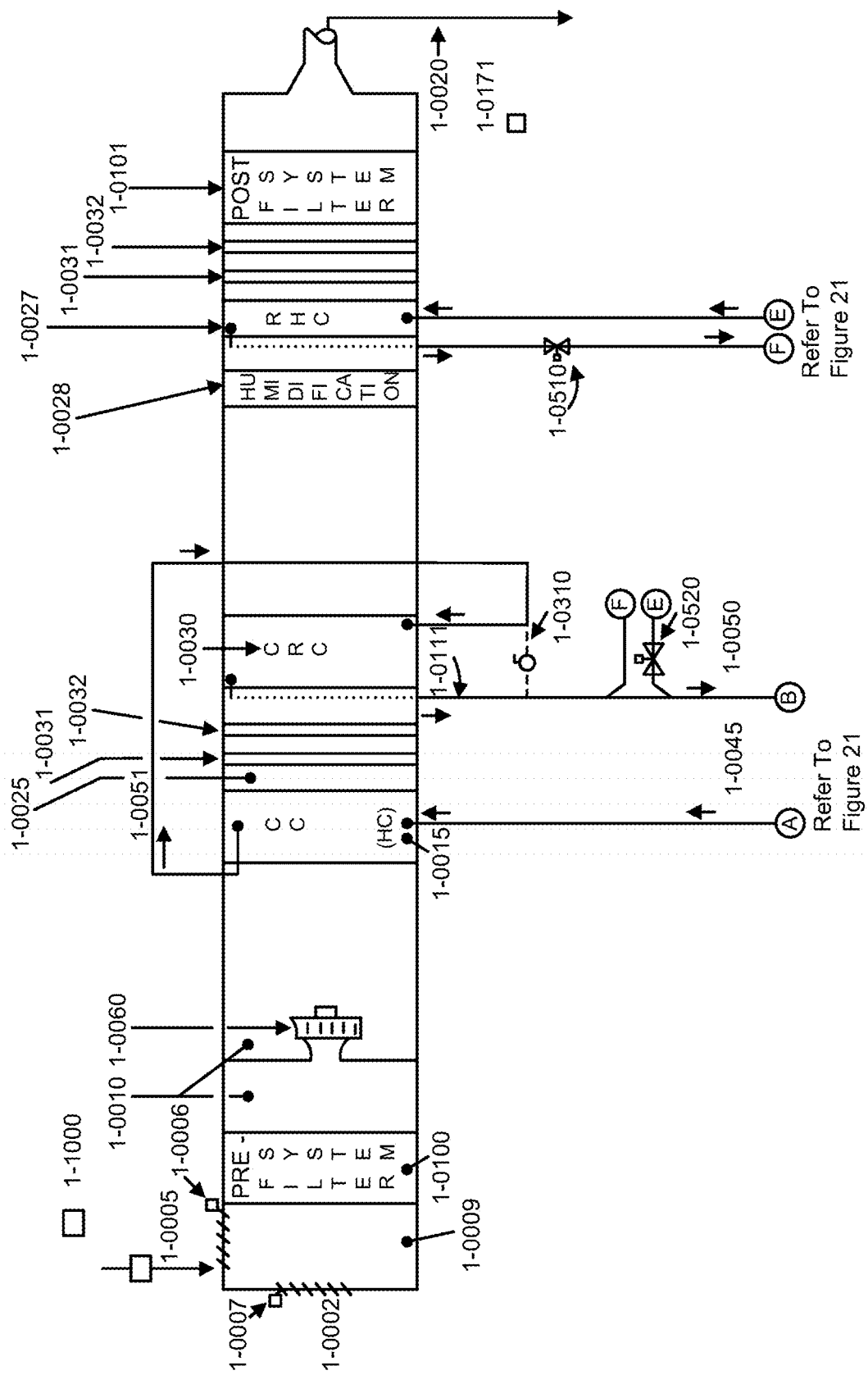
FIG. 17 is similar to the system illustrated in FIG. 13 with failsafe operation, but does not use any form of a control valve to modulate capacity.

FIG. 17 is similar to the system illustrated in FIG. 13 with failsafe operation (and includes many of the same or similar components, as illustrated in FIGS. 13 and 17, and otherwise described herein), but does not use any form of a control valve to modulate capacity, and accordingly, it is an ultimate in failsafe designs. Capacity control, energy draw and sensible, latent and energy recovery capacity modulation is accomplished via changing various system setpoints, such as by varying fan speed setpoints and speeds, CFM setpoints and CFM's, AHU static pressure setpoints, chilled fluid flow through the coil systems, chilled fluid pump speed setpoints and speeds, chilled fluid system differential pressure setpoints and differential pressures, chilled fluid supply temperature setpoints and chilled fluid supply temperatures, heated fluid flow through the coil systems, heated fluid pump speed setpoints and speeds, heated fluid system differential pressure setpoints and differential pressures, heated fluid supply temperature setpoints and heated fluid supply temperatures. The system can be applied to a single unit, or a multiplicity of units that are piped in a design that is hydraulically self-balancing, or the differential pressures at the individual units is relatively consistent between the individual units. The system can be piped for reverse return, and designed with coil and piping pressure drops that promote relatively even flow throughout all areas of the facility.

The system shown in FIG. 17 utilizes heating energy reclaimed from the condenser system directly injected into the chilled water return line 1-0050 as it returns to the cooling plant 1-0040 to false load the compressor. This allows stable and efficient unloading down to 0% load, which is unavailable with other technologies. The direct injection of reclaimed heat to false load the compressor is utilized in lieu of a preheat coil, for locations that do not need a pre-heat coil.

Figure 18:
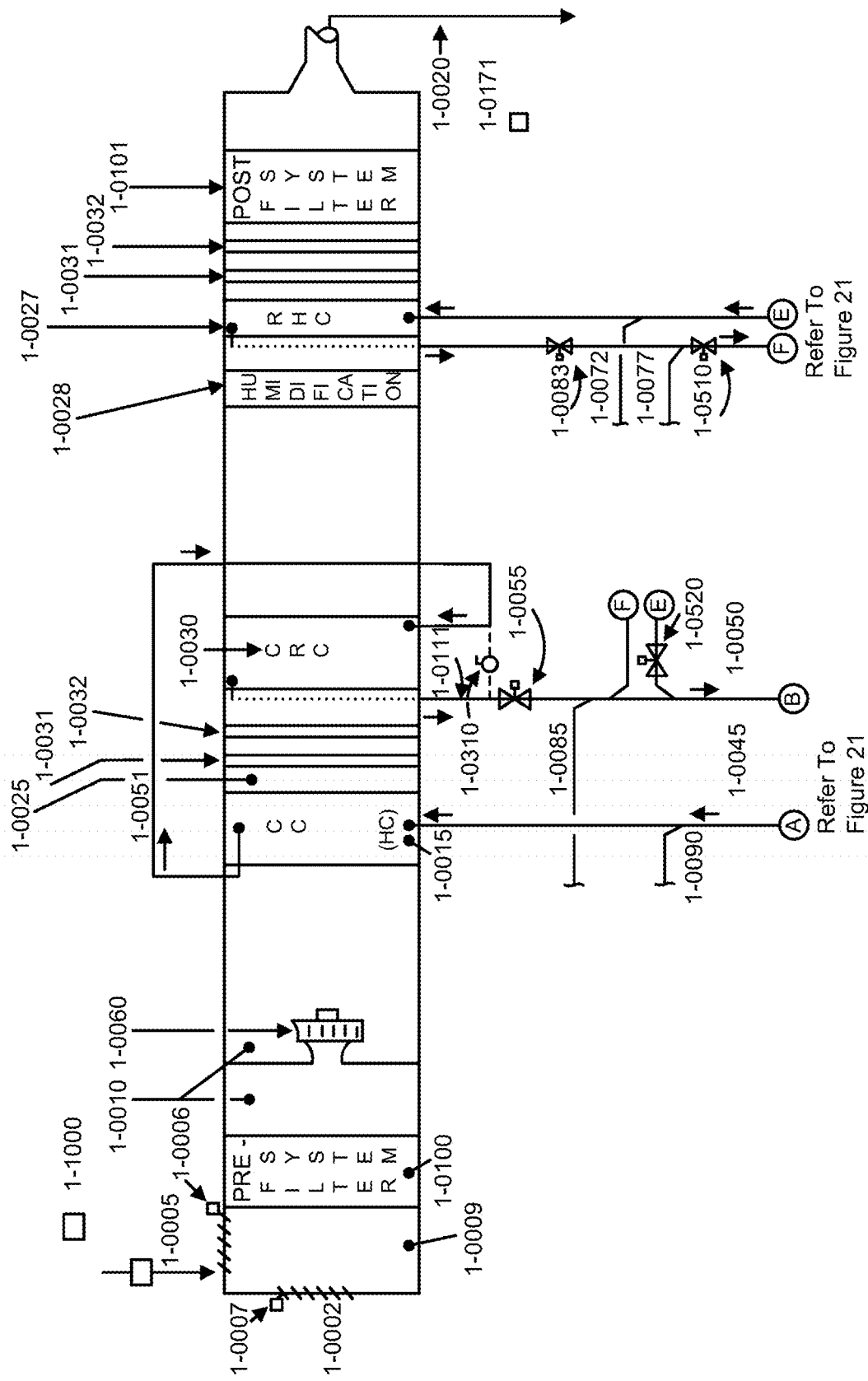
FIG. 18 is similar to the system illustrated in FIG. 17 with failsafe operation, but is depicted providing HVAC services for multiple AHUs.

FIG. 18 is similar to the system illustrated in FIG. 17 with failsafe operation (and includes many of the same or similar components, as illustrated in FIGS. 17 and 18, and otherwise described herein), but is depicted providing HVAC services for multiple AHUs vs. a single AHU as shown in FIG. 17. In addition, the system illustrated in FIG. 18 may include one or more control valves 1-0055, energy recovery system control valves 1-0520 (and associated controls, operational and optimization logic) for chiller low load, non-cycling systems, energy recovery system control valves 1-0510 (and associated controls, operational and optimization logic) for reheat coil systems, and the like for modulating flow capacity.

Figure 19:
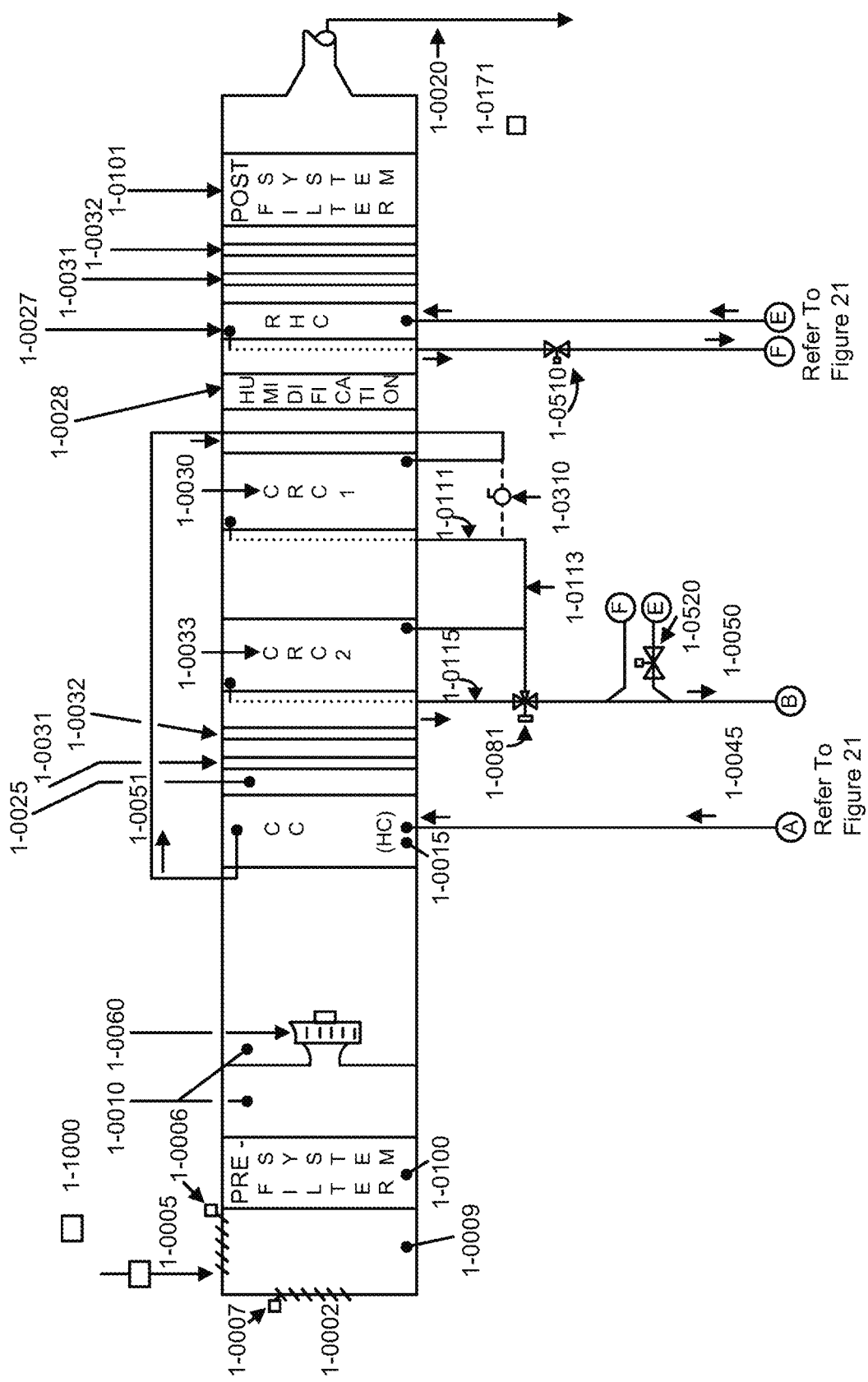
FIG. 19 is similar to the system illustrated in FIG. 17 with failsafe operation, but with added functionality.

FIG. 19 is similar to the system illustrated in FIG. 17 with failsafe operation (and includes many of the same or similar components, as illustrated in FIGS. 17 and 19, and otherwise described herein), but with added functionality. The CHW flow flows via a fluid conduit from the CC 1-0015 to the first CRC 1-0030, with 100% of the flow (or the desired fraction of the flow) passing directly from the CC 1-0015 into the first CRC 1-0030. The water that then leaves the first CRC 1-0030 can either pass through a second CRC 1-0033 (CRC2) that uses some form of flow control (e.g., 1-0081) to modulate the capacity of CRC2 1-0033, or it can bypass the CRC2 1-0033 and be fed into the return line. In this case, the failsafe operation of the CC 1-0015 and the first CRC 1-0030 are augmented by CRC2 1-0033 and a control methodology that allows more precise temperature and RH control in the spaces/process loads being served and greater control over the energy consumption and demand profile of the system. If CRC2 1-0033 or the associated control system has issues of some sort, the CC 1-0015 and CRC 1-0030 are still able to provide cooling, dehumidification and reheat.

Failsafe reheat uses cooling recovery coil (CRC) 1-0030 with second CRC 1-0033 (CRC2) to provide more accurate temperature and RH control. The first cooling recovery coil (CRC) 1-0030 is in direct communication with cooling coil (CC) 1-0015, such that all of the fluid that leaves the CC 1-0015 goes through the first CRC 1-0030. A manual bypass valve and the associated piping to allow some of the chilled water that leaves the CC 1-0015 to bypass the CRC 1-0030 may also be included. Alternately, some combination of fixed or adjustable, differential pressure control valves or automatic control valves, modulating control valves, and manual control valves (e.g., valve 1-0081, 1-0310, 1-0520) can be utilized to control the flow through the coil systems. A single control valve can be used as one part of the capacity variation control. To provide more precise control of the leaving air conditions, the second CRC 1-0033 (CRC2) can be equipped with a control valve 1-0081 that either sends fluid through the CRC2 1-0033 coil for added reheat and energy recovery capacity, or bypasses the CRC2 1-0033 coil, if less amounts of reheat and energy recovery are required.

In some implementations, 100% of the fluid flow that passes through the cooling coil (CC) 1-0015, passes through the cooling recovery coil (CRC) 1-0030. With this configuration, even if there is some form of an equipment or control system failure, the cooled and dehumidified air is reheated by the CRC 1-0030 so that it does not leave the air handling unit (AHU) with saturated or nearly saturated air conditions. In other implementations, rather than 100% of the CHW flow passing from the CC 1-0015 into the CRC 1-0030, a desired fraction of the fluid can pass from the CC 1-0015 into the CRC 1-0030, with the remainder bypassing the CRC 1-0030.

The addition of CRC2 1-0033 and its capacity control/modulation system increases the usefulness of the invention, while still providing some level of failsafe operation. This lower relative Humidity (RH) air available from the use of CRC2 1-0033 reduces the potential for condensation to occur, and for relative humidity levels to rise above the desired levels.

Overall capacity and energy draw, sensible, latent and energy recovery capacity can be varied by varying fan speed setpoints and speeds, CFM setpoints and CFM's, AHU static pressure setpoints, chilled water flow through the coil systems, chilled water pump speed setpoints and speeds, chilled water system differential pressure setpoints and differential pressures, chilled water supply temperature setpoints and chilled water supply temperatures. All of the logic sequence descriptions included for the various implementations described herein are applicable to the implementations described with respect to FIG. 19, with the added functionality that the final dry bulb temperature can be increased and the final RH can be decreased by use of the CRC2 1-0033 and its capacity control system.

Figure 20:
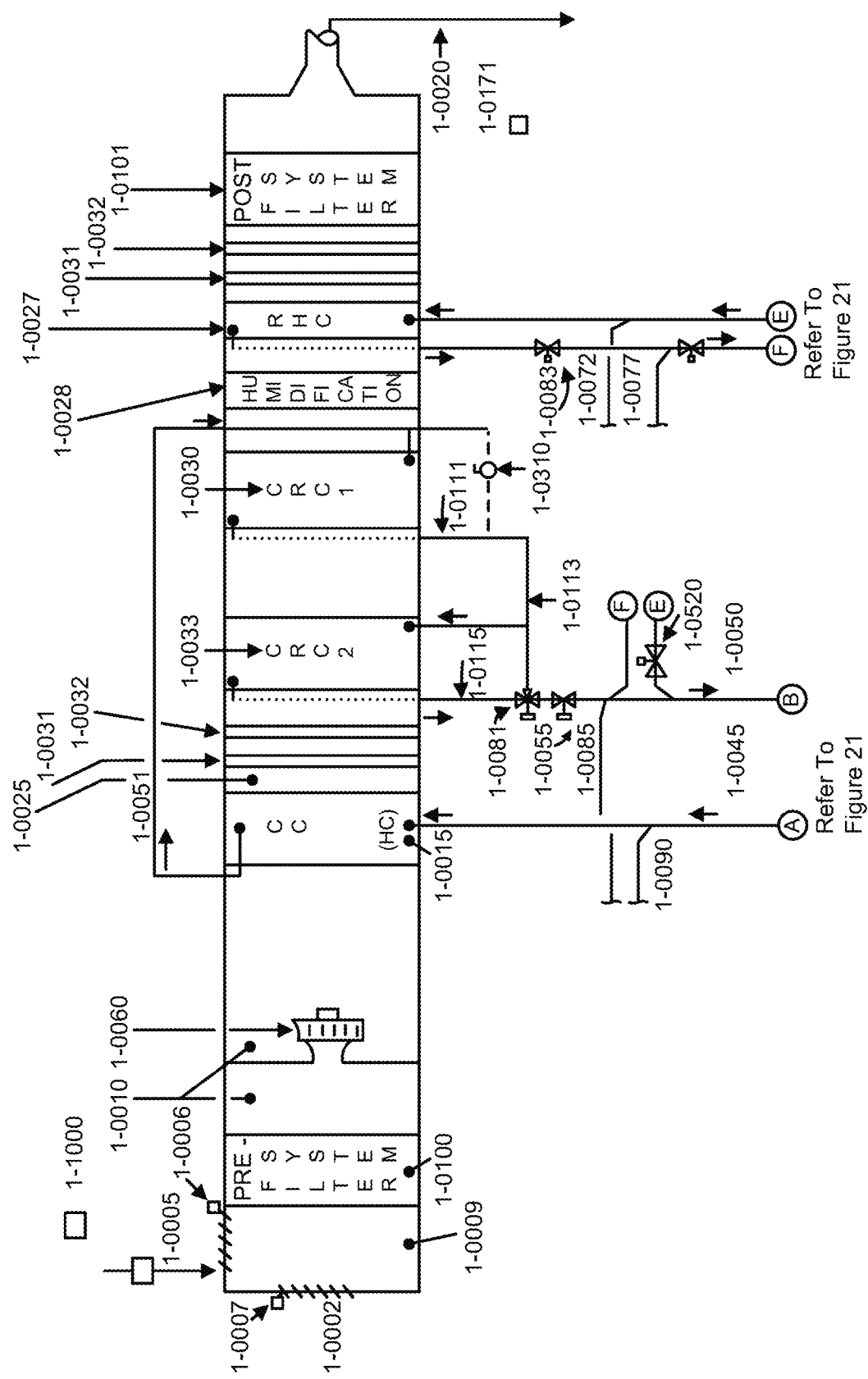
FIG. 20 is similar to the system illustrated in FIG. 18 with failsafe operation, but with added functionality.

FIG. 20 is similar to the system illustrated in FIG. 18 with failsafe operation (and includes many of the same or similar components, as illustrated in FIGS. 18 and 20, and otherwise described herein), but with added functionality available with the addition of CRC2 1-0033 and the associated equipment, controls and logic, as described above with reference to at least FIG. 15. CRC2 1-0033 functionality is described in further detail above with respect to FIG. 19.

HEDS Based Ground Source Heat Pump Earth Field Capacity Enhancement System

Figure 21:
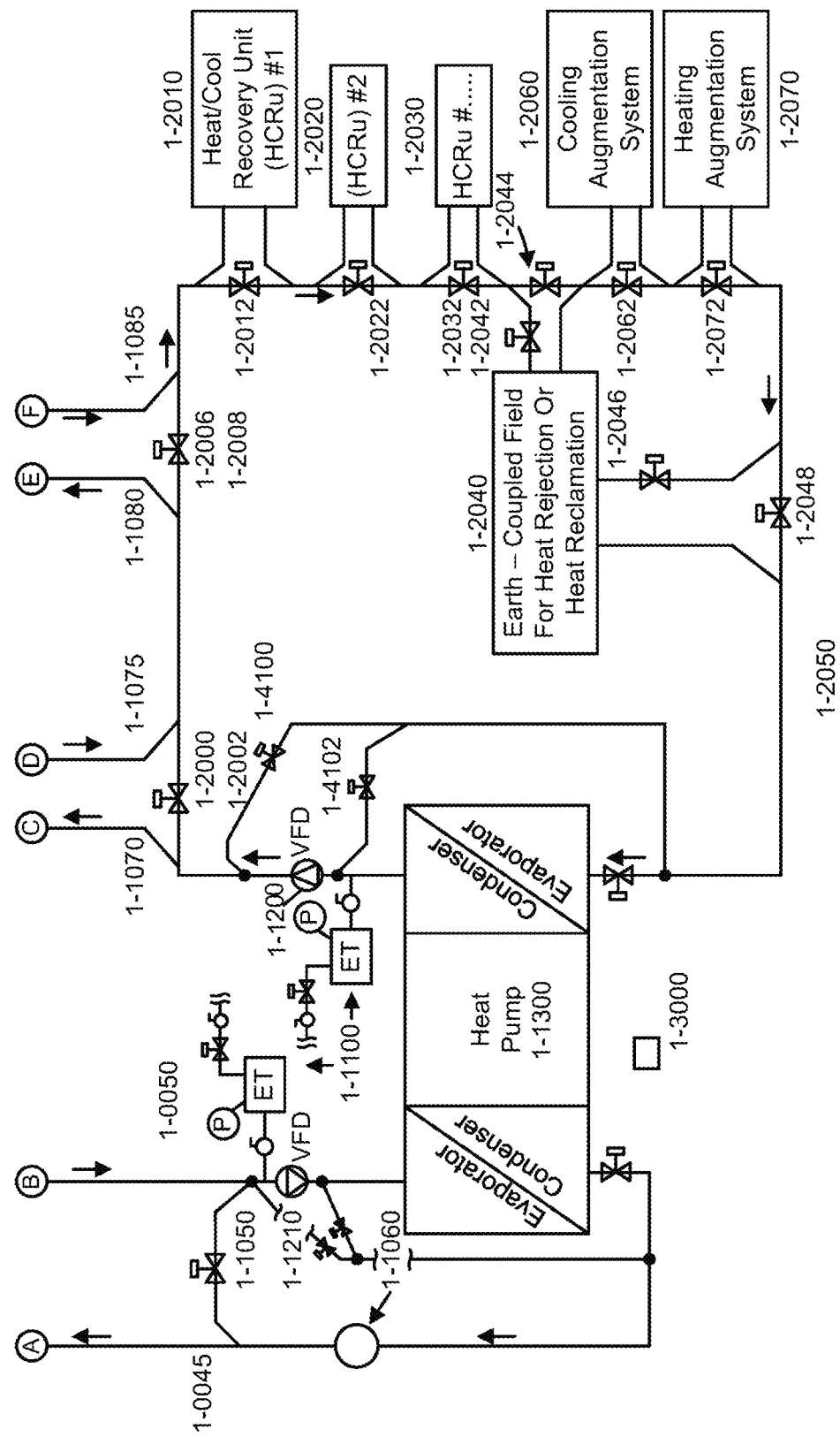
FIGS. 21-23 depict a cooling/heating plant based on a modified heat pump design (or standard chiller-based design) that is built to provide relative humidity control, even down to 0% cooling loads, while enhancing the capacity of the earth-coupled field to which it is attached.
Figure 22:
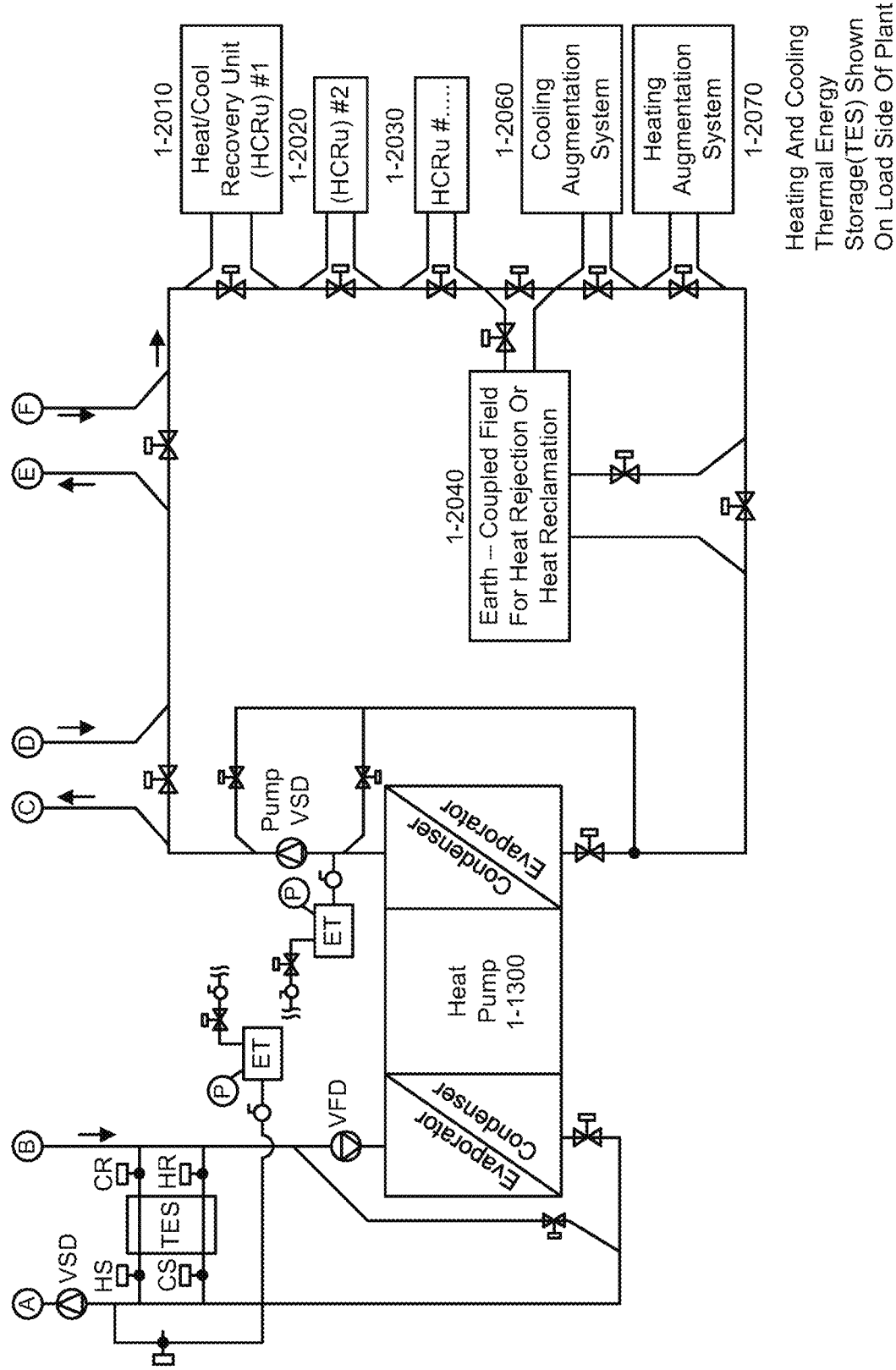
Figure 23:
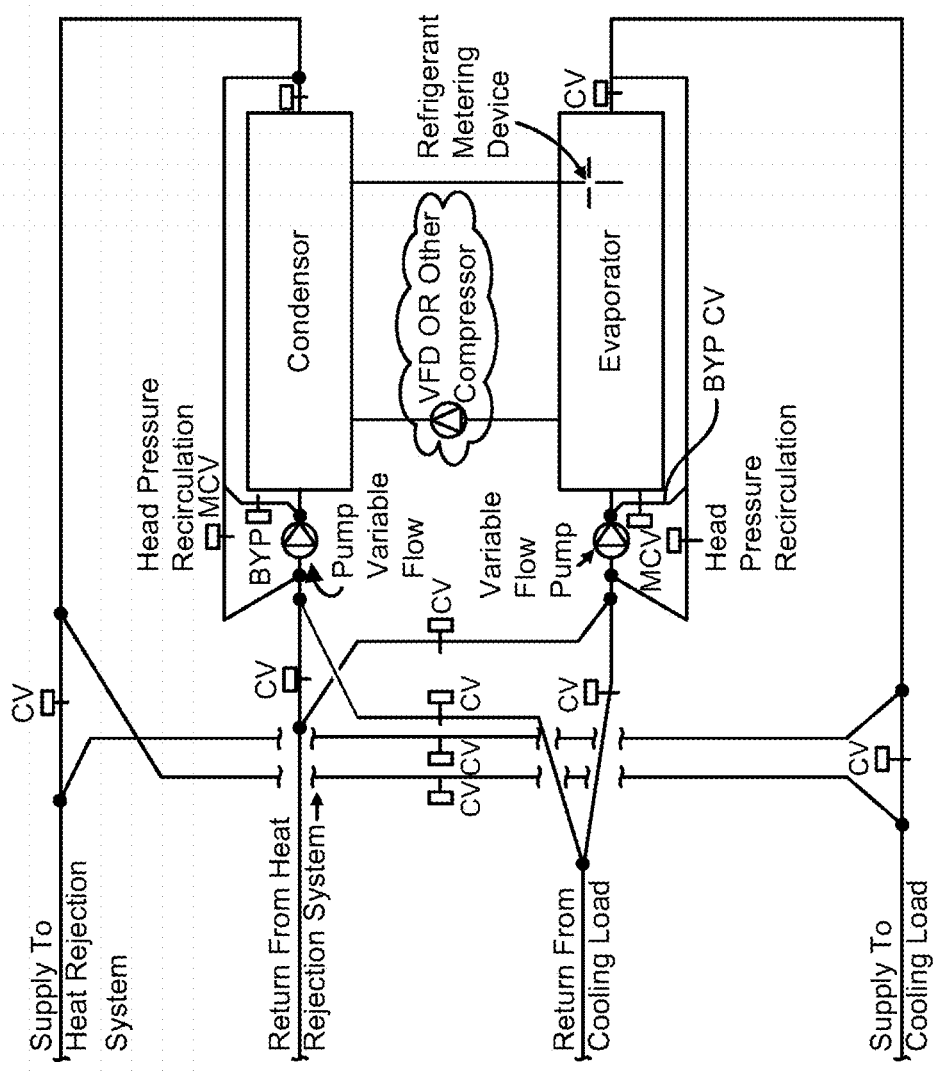

FIGS. 21-23 depict a cooling/heating plant based on a modified heat pump design (or standard chiller-based design) that is built to provide relative humidity control, even down to 0% cooling loads, while enhancing the capacity of the earth-coupled field that it is attached to.

Many existing earth sourced systems are no longer effective, as their heat rejection/absorption fields are undersized for the loads being served. Heating dominated HVAC or process load systems tend to overcool the earth source over time, and cooling dominated HVAC or process load systems tend to overheat the earth source over time. Implementations of the current subject matter can improve the performance of those systems.

In addition to increasing the effective capacity of the earth to store and reclaim energy, the systems described herein may solve many common problems associated with HVAC heating, cooling, dehumidification, reheat systems. Performance, ability to control relative humidity and mold growth, resiliency, reliability, robustness and energy consumption are addressed. The ability to be controlled to influence the electrical load on the grid by ramping up and ramping down, and to respond as a Distributed Energy Resource (DER), and be included in Demand Response (DR) programs, while still maintaining relative humidity control in the conditioned spaces, while consuming zero site water for heat rejections, is unique to implementations of the current subject matter described herein.

Heating and cooling load-side Thermal Energy Storage (TES) allows smaller systems to be utilized, or undersized systems to begin to serve their loads, or compressor systems to be utilized when renewable energy or less expensive energy is available and then shut down to utilize the stored thermal energy when renewable capacity is reduced, or when utility costs are higher. The load side design is unique, in that the TES tank can be utilized for heat energy storage as well as cooling energy storage with a very simple valve system and control strategy. While one implementation is shown, other implementations that may utilize different pumping and valve arrangements can be utilized as well. The load side TES system can be charged with heating or cooling energy via the compressor system, or when weather conditions are favorable, the HCRU equipment and the cooling and heating augmentation systems connected via the ground loop piping system may be able to provide capacity in an efficient manner. Stored energy that may be directly available from the earth field (without operating the compressors) can also be used to charge the load side TES systems.

These implementations significantly decrease the cooling and dehumidification loads that need to have heat rejected into the earth, and allow much colder heating water temperatures to be used to keep facilities warm or process loads met. Thus the effective capacity of the earth to work with the HVAC systems is greatly enhanced. The combined systems can greatly increase the applicability, effectiveness, efficiency and site availability for ground-sourced, or earth-sourced heat pump systems. (sometimes referred to as geothermal heat pumps, geo-exchange heat pumps, or earth-coupled heat pump systems).

The equipment sizing, design and control strategies allow the use of the cooling energy stored in the earth over the winter to be used directly to provide cooling to the cooling coils (CC), without running the compressor for a significant number of hours each year. The HEDS CC sizing is such that the "cold" water temperatures can be very high while still providing enough cooling energy to keep the facility cool. During the spring, in many locations, it is likely that the compressor will not be run until the humidity levels get too high, or the water temperature available from the earth-source is just below the desired dewpoint temperature. With these system implementations, compressor run time can be minimized, extending equipment life and reducing energy waste. When dehumidification is needed, the cold water temperatures being withdrawn from the earth loop can be as close as 2° F. to the desired dewpoint temperature of the air being supplied by the unit. Even as the cooling source energy is warmed up, there may be many hours a day when the cooling and/or cooling/dehumidification loads can be met with direct earth-sourced cooling, rather than compressor-augmented earth-sourced cooling.

Similarly, during the fall, when heating loads may be low, and the water temperatures available from the earth-sourced system are the highest, it is likely that the compressor will not need to be run to create heating hot water to meet facility or process needs, heating energy can be directly sourced from the earth fields.

There will be many hours when the cooling augmentation system can be utilized to provide chilled fluid to the HEDS CC 1-0015 to meet cooling needs without compressor operation, and the heating augmentation system can be utilized to provide warmed fluid to the HEDS CC 1-0015 to meet cooling needs without compressor operation, further reducing compressor run time and extending equipment life.

If this system is combined with Underground Thermal Energy Storage (UTES), Aquifer Thermal Energy Storage (ATES), or Borehole Thermal Energy Storage (BTES), the ability to utilize earth-sourced heating and cooling energy directly to meet facility or process needs, without the need to operate the compressor(s) to augment the temperatures is enhanced even further.

The system is shown to use closed loop systems on both sides of the heat pump 1-1300. With appropriate equipment and filtration, open loop can be utilized, where allowed, for the earth-sourced side of the system.

The system allows simultaneous heating and cooling using 100% recovered energy, for any or all loads connected to the system. Some loads may be in heating only, some may be cooling only, and some may be in cooling/dehumidification/reheat. Cooling and heating energy can be stored in the earth even when the compressor(s) are not running.

The diagrams depict multiple piping and equipment configurations that allow a multitude of different operating strategies and enhanced efficiency, capacity and energy storage to occur.

Implementations described herein can unload effectively and reliably down to 0% (zero percent) cooling load while providing the desired supply air dry bulb and dewpoint temperatures required to meet internal temperature, dewpoint and relative humidity conditions, where other systems cannot perform these duties. This helps prevent biological growth from occurring.

While the use of HGBP to add load to the compressor with existing designs will keep them running under light loads, it may negatively affect system operations and reliability as described elsewhere in this application.

Additionally, when HGBP is used to false load the compressor to keep it operational, there is no corresponding improvement in efficiency due to head pressure relief. With the systems described herein, reduced refrigerant pressures in the condenser result, as the heat is rejected to create the false load, which lowers the fluid temperature of the return stream that is used to cool the refrigerant in the condenser. Removing heat from the heat rejection system via the preheat coil and/or reheat coil to false load the compressor or control temperatures or RH reduces the refrigerant pressure in the condenser, improving energy efficiency and capacity.

These implementations are unique in at least that by using heat rejected from the compressor system via the preheat and reheat coils, or by direct injection into the CHWR line to the plant to false load the compressor, the condenser cooling liquid temperature can be reduced in a meaningful manner. This allows the head pressure (condenser side refrigerant pressure) to be reduced with essentially zero energy expended, improving compressor and system capacity and efficiency.

As an example: Assume that the ambient conditions are >55° F. and <60° F. and it is foggy or high humidity outside. The facility would typically be in the heating mode of operation, but if heating is provided without cooling and dehumidifying the air, the indoor conditions will have unacceptably high relative humidity, especially if the spaces are only heated to 68° F. as is the case with many facilities. To solve this problem, the fresh air being brought into the building needs to be sub-cooled down to 55° F. or lower and then reheated to some degree for most buildings to maintain the desired indoor RH levels. The cooling load of the fresh air being brought into the building is very small, too small for cooling systems to reliably serve, so the compressor serving that cooling load will cycle on and off. Every time the compressor cycles on, the cooling capacity is too high, even with Hot Gas ByPass (HGBP) or other false-loading technologies, so the air is overcooled, and the coil fin pack is loaded with a significant amount of condensed moisture. Because the supply air temperature is too low, the compressor cycles back off, in short order. Now, when the compressor cycles off, the near 100% RH fresh air being brought into the building is untreated, and in fact may be re-evaporating the moisture that is being held in the coil fin pack, so RH control of the spaces is lost. When this situation occurs with various implementations of these inventions, those very low loads can be met and controlled successfully. To ensure that the compressor does not cycle on and off and create RH and temperature control issues, load, in the form of rejected heat energy from the condenser side of the system, would be injected either upstream from the cooling coil in the preheat coil (PHC) to warm up the air entering the CC, or, in the absence of the need for a preheat coil, heat would be injected into the chilled fluid loop, to add load directly to the system. The controls would be enabled to keep the compressor operational with minimal to zero on/off cycling. If this situation occurs when there is fluid available from the earth loop or the HCRU's or the cooling augmentation system at a low enough temperature, the compressor would not be enabled at all, and the loads would be met directly through the use of the various piping, valve and pumping arrangements that interconnect the two sides of the system.

Multiple Heating/Cooling Recovery Units (HCRU) are shown. These devices are unique in at least that they can either recover heating or cooling energy from the piping loop to serve another load, or they can inject heating or cooling energy into the piping loop from other sources.

In some embodiments, the source of some or all of the cooling and heating energy could be the domestic water system.

The point of connection (POC) for the PHC and RHC could also be reversed if it is desired to have a higher quality heat available for the RHC to heat the air up to a higher temperature and to lower the RH of the air leaving the unit even further.

The earth-coupled field 1-2040 is shown to be connected into the piping loop in two different locations, although additional locations can be included as needed to meet the needs of the system. The two piping POC's that are shown allow the capacity of the ground field to be augmented and utilized in novel ways. During summer heat rejection to the ground, the heating energy going into the ground can either be decreased by rejecting heat to the atmosphere via the cooling augmentation system, or it can be increased by adding heat from another source, potentially renewable or reclaimed from another waste heat source.

During the winter, or heating season, added cooling energy can be obtained to augment the cooling earth source for the following cooling season. The earth-coupled field 1-2040 piping connections upstream from the augmentation systems can be used when the heat sink (or source) does not have enough instantaneous capacity and needs to be augmented to meet current needs. The downstream piping POC can be used when it is desired to augment the capacity of the heat sink (source) for the following season (or day).

Another unique part of the system described herein is the at least two sets of valves 1-4100 that provide two functions (see, e.g., FIG. 21). During the cooling season, especially at the start of the cooling season, on the earth-loop side of the piping system, there may be fluid being delivered from the earth loop into the condenser side of the system that is too cold to allow proper operation of the compressor system—the refrigerant pressure could be too low to allow proper refrigerant flow volumes and orifice/expansion valve operation to occur, so the system may fault and fail on a frequent basis. The earth loop pumping system will typically be variable flow, and to control refrigerant head pressure when excessively cold fluid is available, the pump speed will be modulated to its minimum flow setpoint. If the minimum flow from the earth loop is still too high, and the condensing pressure is too low, the pump flow rate would need to be reduced further, but the condenser heat exchangers have a minimum required flow rate through them. One of the valves performs two functions simultaneously, and is modulated to control both head pressure and minimum flow rate through the condenser heat exchanger system.

Another set of valves 1-4102 is utilized to completely bypass the condenser side (described for the cooling mode) of the heat pump, when there is the ability to utilize the cooling or heating energy stored in the earth loop, or available from the HCRU's or heating or cooling augmentation systems without the compressor being operated.

On the evaporator side of the heat pump (load side during the cooling mode) there is a similar set of valves that allows the evaporator to be completely bypassed to allow cooling or heating energy to be distributed on the load side of the system without the need to operate the compressor(s), or experience the pressure drop through the heat exchanger, as well as providing fluid recirculation from the leaving side of the evaporator to the entering side of the evaporator for both temperature control and flow control. Especially at the start of the heating season, the fluid temperature leaving the earth-source may be too high for proper compressor/chiller/heat pump operation. If the fluid temperature into the chiller is too high, these valves will be controlled in a manner to recirculate cold leaving water into the warm to hot entering water to reduce the water temperature into the chiller.

With this and other hydraulic diagrams, pressure relief valves are not shown, but may be required to any section of piping or equipment that can be isolated between two valves without direct hydraulic access to an expansion tank.

FIG. 23 is another embodiment of the current subject matter and depicts a cooling/heating plant based on standard chiller systems, which does not require a heat pump to perform heat recovery duties. The design is built to provide relative humidity control, even down to 0% cooling loads, using standard chillers. Utilizing existing chillers, or standard chiller designs can happen due to the ability of the HEDS equipment to utilize very low quality heat during the heating season, so the chillers do not have to be designed for high lift, high water temperature conditions. This will allow existing cooling/heating systems to be utilized vs. having to install completely new refrigeration and heating equipment to perform heating/cooling/dehumidification/reheat duties for facilities.

Piping and valving are shown that allow the cooling and heating flows through the equipment to be swapped, so that the load can either be provided with cooling or heating from either set of piping. The flows could also be reversed thru the heat exchangers when the switchover takes place.

The loads can still be simultaneously served with heating and cooling directly off of the chiller, and the same type of earth coupled field and cooling and heating energy recovery and augmentation systems can be utilized as is shown in FIGS. 21 and 22.

The functionality of this implementation essentially mirrors the functionality available with FIGS. 21 and 22, the main difference being that existing, or standard design chillers can be utilized with this implementation.

Figure 24A:
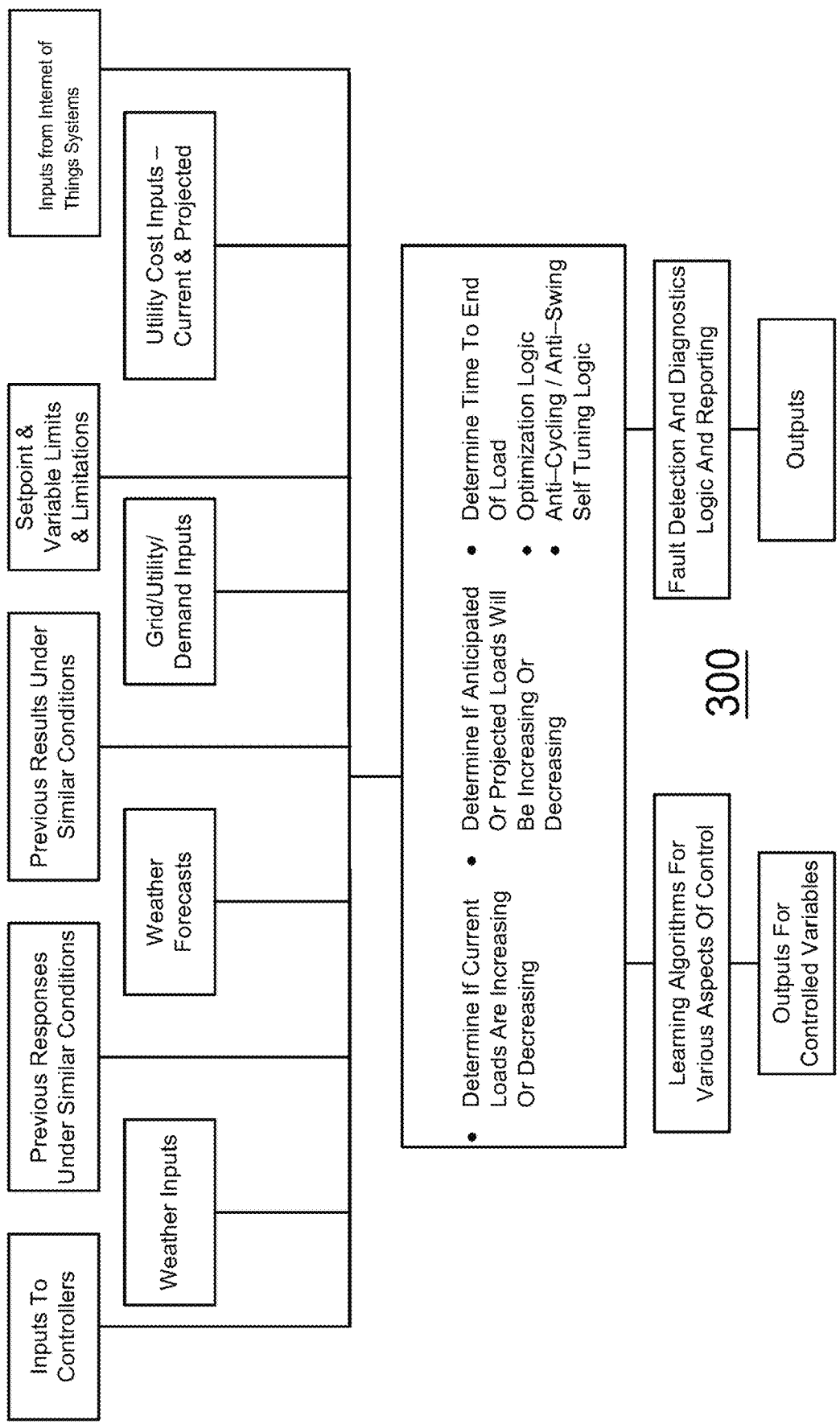
FIG. 24A depicts an abbreviated system architecture for the control system sequences of operation.
Figure 24B:
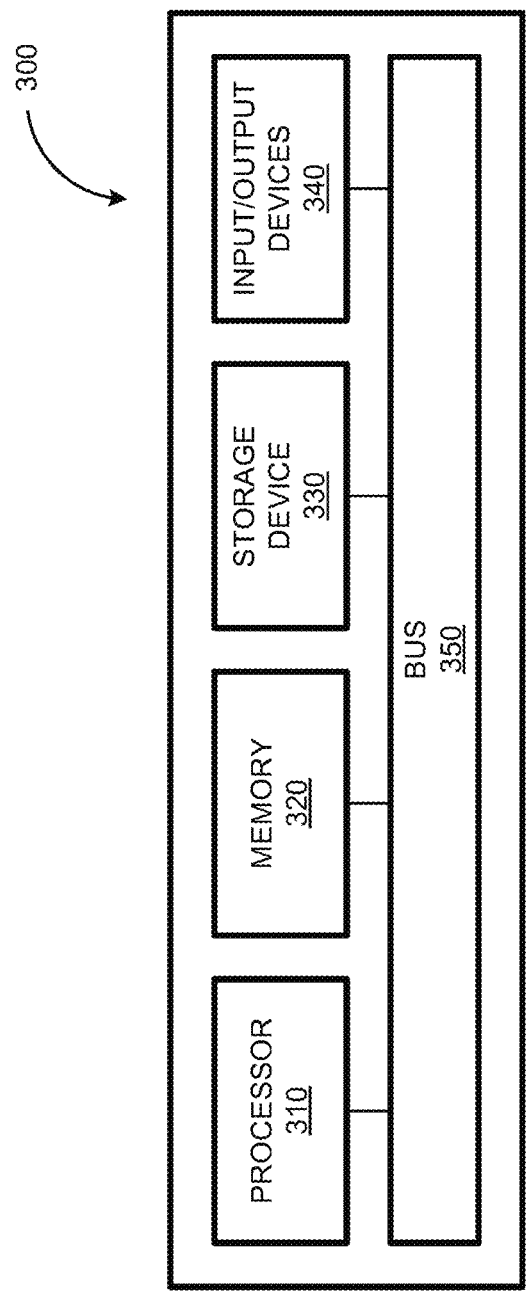
FIG. 24B depicts an abbreviated system architecture for the control system sequences of operation.

FIGS. 24A and 24B depicts an abbreviated system architecture for the control system 300 that controls sequences of operation described herein. For example, the control system that controls the AHUs (and various components thereof) and/or the plants coupled with the AHUs may include various control sequences that are performed using various inputs (e.g., input devices 340, which may include Internet of Things connections).

In some implementations, the control system measures and/or collects various weather-related inputs that may be used in the setpoint prediction sequences and control methods to proactively respond to changes before the changes occur and to enhance the response to changes that occur. The control methods associated with these inputs determine where the controlled variable setpoints will need to be based on historical data and the weather forecast. Once the control system determines where the variables need to be, the setpoints for the controlled variables may be used to modulate the equipment and systems that are responsible for controlling those variables. In some implementations, weather related inputs (e.g., input devices 340) include: Actual Weather, Weather Forecast, Historical Weather, Historical System Set points and actual variable conditions, Historical indoor conditions and condition setpoints, Historical Occupancy, and Historical Production.

In some implementations, the control system measures and/or collects various weather-related inputs that may be used to determine the specific needs that must be met by the HVAC/HEDS system and supporting equipment. Deviations from setpoints, modes, time of day, day of week, ambient conditions, and the like may all factor into the system responses to maintain facility or process conditions. The inputs may include and/or may be received by the control system from: Building Mass Temperature Sensors, Building moisture content (in various indoor locations), Dry bulb temperature (in various indoor and outdoor locations), Wet bulb temperature (in various indoor and outdoor locations), Dew point temperature (in various indoor and outdoor locations), Relative humidity (in various indoor and outdoor locations), and Humidification systems.

In some implementations, there are several methods to control the RH of the air in a space. The air volume being delivered to the space can be increased or decreased, the dewpoint temperature of the air being delivered to the space can be increased or decreased, and the dry bulb temperature of the air being delivered to the space can be increased or decreased. The control methods performed by the control system described herein may be performed individually, or concurrently to provide the desired effect of changing the relative humidity level in the conditioned space or process load.

Decrease Dewpoint Temperature to Reduce RH

If the control system associated with RH control determines that the dewpoint temperature being delivered to the space/process needs to be reduced to create a lower relative humidity level, the control system will modulate the various components of the system to create a lower dewpoint temperature. For any given drybulb temperature of air, a lower dewpoint temperature will result in a lower RH level. If the dewpoint temperature is being controlled in direct response to changes in the dewpoint of the conditioned spaces, rather than via a change in the RH, the control system described herein also applies.

In some embodiments, there are valve(s) (such as the valve configurations described herein) that control the flow (mass flow rate) of the chilled fluid being sent through the cooling coils (C/C) 1-0015. In order to decrease the dewpoint temperature, the valves may be modulated to increase the flow of chilled fluid passing through the C/C 1-0015. This higher volume of chilled fluid reduces the average temperature of the fluid within the heat transfer tubes. The lower average temperature of the fluid within the tubes reduces the temperature of the air passing over the coils to a greater extent, which will condense more moisture out of the air, thus reducing the dewpoint temperature.

In some embodiments, the control system communicates with variable speed/variable flow fluid pumping systems that control the flow (mass flow rate) of the chilled fluid being sent through the cooling coils (C/C) 1-0015. In order to decrease the dewpoint temperature, the control system may modulate the pump speed to a higher speed, to increase the flow of chilled fluid passing through the C/C 1-0015. This higher volume of chilled fluid will reduce the average temperature of the fluid within the heat transfer tubes. The lower average temperature of the fluid within the tubes will reduce the temperature of the air passing over the coils to a greater extent, which will condense more moisture out of the air, thus reducing the dewpoint temperature. The pump speed can be modulated by the control system directly, or via the use of an intermediate step (e.g., modulating the setpoint for the chilled water system differential pressure). A higher differential pressure setpoint will increase the pump speed, while a lower differential pressure setpoint will decrease the pump speed.

In some embodiments, the control system communicates with cooling systems/chillers that control the temperature of the chilled fluid being sent through the cooling coils (C/C) 1-0015. In order to decrease the dewpoint temperature, the chilled water supply temperature setpoint will be reduced, and the cooling system/chiller (such as via the control system) will modulate to a higher capacity. The higher available cooling system/chiller capacity will reduce the temperature of the fluid being supplied to the C/C 1-0015. This lower chilled fluid temperature will reduce the average temperature of the fluid within the heat transfer tubes. The lower average temperature of the fluid within the tubes will reduce the temperature of the air passing over the coils to a greater extent, which will condense more moisture out of the air, thus reducing the dewpoint temperature.

In some embodiments, the control system communicates with variable speed/variable flow air delivery/fan systems that control the flow (mass flow rate) of the air being sent through the cooling coils (C/C) 1-0015 and into the conditioned spaces or process loads. In order to decrease the dewpoint temperature, the control system may modulate a volume of air passing through the cooling coil 1-0015 to a lower volume, to decrease the flow of air passing through the C/C 1-0015. In some implementations, if no other changes occur, this lower volume of air will reduce the average temperature of the air passing over the heat transfer tubes. The lower average temperature of the air passing over the tubes will condense more moisture out of the air, thus reducing the dewpoint temperature.

Similarly, the control system can modulate fan speed command to deliver a higher volume of air. Sending a higher volume of air into the load by modulating the fan speed to a higher level, without changing the dewpoint temperature of the air being delivered to the conditioned spaces/process loads may also result in the RH levels being reduced. The fan speed can be modulated directly, or via the use of an intermediate step (e.g., modulating the setpoint for the supply air distribution system static/differential pressure). A higher static/differential pressure setpoint will increase the fan speed, while a lower differential pressure setpoint will decrease the fan speed.

Increase Dry Bulb Temperature to Reduce RH

If the control system associated with RH control determines that the drybulb temperature being delivered to the space/process needs to be increased to create a lower relative humidity level, the control system will communicate with the various components of the system to create a higher drybulb temperature. For any given moisture content level of air, a higher dry bulb temperature will result in a lower RH level.

In some embodiments, the control system controls one or more valves that may control the flow (mass flow rate) of the warmed fluid being sent through the cooling recovery coils (CRC), sometimes referred to as the Energy Recovery Coil or ERC (e.g., the CRC 1-0030). In order to increase the drybulb temperature, the control system may modulate the valve to increase the flow of warmed fluid passing through the CRC 1-0030. This higher volume of warmed fluid will increase the average temperature of the fluid within the CRC 1-0030 heat transfer tubes. The higher average temperature of the fluid within the CRC 1-0030 tubes will increase the temperature of the air passing over the coils to a greater extent, thus increasing the drybulb temperature.

In some embodiments, the control system communicates with one or more variable speed/variable flow fluid pumping systems that control the flow (mass flow rate) of the warmed fluid being sent through the CRC 1-0030. In order to increase the drybulb temperature, the control system may modulate pump speed to a higher speed, to increase the flow of warmed fluid passing through the CRC 1-0030. This higher volume of warmed fluid will increase the average temperature of the fluid within the heat transfer tubes. The higher average temperature of the fluid within the tubes will increase the temperature of the air passing over the coils to a greater extent, thus increasing the drybulb temperature. The pump speed can be modulated directly, or via the use of an intermediate step (e.g., modulating the setpoint for the system differential pressure). A higher differential pressure setpoint will increase the pump speed, while a lower differential pressure setpoint will decrease the pump speed.

In some embodiments, the control system communicates with one or more cooling systems/chillers that indirectly control the temperature of the warmed fluid being sent through the cooling recovery coils (CRC) 1-0030. Since the CRC 1-0030 relies on the approach temperature between the warmed fluid inside the coils and the air being delivered through the coils to raise the dry bulb temperature of the air, obtaining the highest quality heat (highest temperature), can increase the effectiveness, and thus the air temperature, leaving the CRC 1-0030. In some implementations, providing colder chilled water to the C/C 1-0015 will result in a lower volume of water being required to meet the loads served by the C/C 1-0015, but the fluid temperature leaving the C/C 1-0015 will be at a higher level, assuming that the C/C is under control. In order to increase the drybulb temperature of the air leaving the CRC 1-0030, the chilled water supply temperature setpoint may be reduced (e.g., by the control system), and the cooling system/chiller (such as via the control system) may modulate to a higher capacity. The higher available cooling system/chiller capacity will reduce the temperature of the fluid being supplied to the C/C 1-0015. This lower chilled fluid temperature entering the C/C 1-0015 may increase the temperature of the fluid leaving the C/C 1-0015 (e.g., assuming a constant load on the C/C). The higher CRC entering fluid temperature may increase the average temperature of the fluid within the CRC heat transfer tubes. The higher average temperature of the fluid within the tubes may increase the temperature of the air passing over the coils, thus increasing the drybulb temperature.

In some embodiments, the control system communicates with one or more variable speed/variable flow air delivery/fan systems that control the flow (mass flow rate) of the air being sent through the cooling coils (C/C) 1-0015 and into the conditioned spaces or process loads. In order to increase the drybulb temperature, the volume of air passing through the cooling coil will be modulated to a lower volume, to decrease the flow of air passing through the C/C. The C/C fluid flowrate may be modulated to a lower level (such as by the control system) (e.g., assuming that the dewpoint temperature setpoint for the C/C remains unchanged), which may result in a higher quality warmed fluid temperature leaving the C/C. The reduced air volume passing through the C/C 1-0015 reduces the loads on the C/C 1-0015, so the chilled fluid flow rate is reduced further, again, resulting in a higher quality warmed fluid temperature being available to the CRC 1-0030. The reduced air flow rate may also result in the dry bulb temperature of the conditioned spaces warming up on their own, due to the reduced cooling capacity available to remove the sensible heat from the spaces. This lower volume of air passing over the CRC coils, and the higher quality heat inside the CRC tubes, may increase the average temperature of the air passing over the heat transfer tubes. The higher average temperature of the air passing over the tubes may reduce the RH level.

Similarly, the control system may modulate fan speed command to deliver a higher volume of air. Sending a higher volume of air into the load by modulating the fan speed to a higher level, without changing the dewpoint and drybulb temperature of the air being delivered to the conditioned spaces/process loads may also result in the RH levels being reduced. The fan speed can be modulated directly, or via the use of an intermediate step (e.g., by modulating the setpoint for the supply air distribution system static/differential pressure). A higher static/differential pressure setpoint will increase the fan speed, while a lower differential pressure setpoint will decrease the fan speed.

Increase Dewpoint to Increase RH

If the control system associated with RH control determines that the dewpoint temperature being delivered to the space/process needs to be increased to create a higher relative humidity level, the control system may communicate with the various components of the system to create a higher dewpoint temperature. For any given drybulb temperature of air, a higher dewpoint temperature will result in a higher RH level.

In some embodiments, the control system communicates with valve(s) that control the flow (mass flow rate) of the chilled fluid being sent through the cooling coils (C/C) 1-0015. In order to increase the dewpoint temperature, the valve may be modulated to decrease the flow of chilled fluid passing through the C/C 1-0015. This lower volume of chilled fluid may increase the average temperature of the fluid within the heat transfer tubes. The higher average temperature of the fluid within the tubes may increase the temperature of the air passing over the coils to a greater extent, which may condense less moisture out of the air, thus increasing the dewpoint temperature.

In some embodiments, the control system communicates with one or more variable speed/variable flow fluid pumping systems that control the flow (mass flow rate) of the chilled fluid being sent through the cooling coils (C/C) 1-0015. In order to increase the dewpoint temperature, the pump speed may be modulated to a lower speed, to decrease the flow of chilled fluid passing through the C/C 1-0015. This lower volume of chilled fluid may increase the average temperature of the fluid within the heat transfer tubes. The higher average temperature of the fluid within the tubes may increase the temperature of the air passing over the coils to a greater extent, which may condense less moisture out of the air, thus increasing the dewpoint temperature. The pump speed can be modulated directly, or via the use of an intermediate step (e.g., modulating the setpoint for the chilled water system differential pressure). A higher differential pressure setpoint will increase the pump speed, while a lower differential pressure setpoint will decrease the pump speed.

In some embodiments, the control system communicates with cooling systems/chillers that control the temperature of the chilled fluid being sent through the cooling coils (C/C) 1-0015. In order to increase the dewpoint temperature, the chilled water supply temperature setpoint may be increased, and the cooling system/chiller may be modulated (e.g., by the control system) to a lower capacity. The lower available cooling system/chiller capacity may increase the temperature of the fluid being supplied to the C/C 1-0015. This higher chilled fluid temperature may increase the average temperature of the fluid within the heat transfer tubes. The higher average temperature of the fluid within the tubes may decrease the temperature of the air passing over the coils to a lesser extent, which may condense less moisture out of the air, thus increasing the dewpoint temperature.

In some embodiments, the control system communicates with one or more variable speed/variable flow air delivery/fan systems that control the flow (mass flow rate) of the air being sent through the cooling coils (C/C) 1-0015 and into the conditioned spaces or process loads. In order to increase the dewpoint temperature, the volume of air passing through the cooling coil may be modulated (e.g., by the control system) to a higher volume, to increase the flow of air passing through the C/C 1-0015. If no other changes occur, this higher volume of air may increase the average temperature of the air passing over the heat transfer tubes. The higher average temperature of the air passing over the tubes may condense less moisture out of the air, thus increasing the dewpoint temperature.

Similarly, the fan speed command can be modulated (e.g., by the control system) to deliver a lower volume of air. Sending a lower volume of air into the load by modulating the fan speed to a lower level, without changing the dewpoint temperature of the air being delivered to the conditioned spaces/process loads may also result in the RH levels being increased. The fan speed can be modulated directly, or via the use of an intermediate step (e.g., by modulating the setpoint for the supply air distribution system static/differential pressure). A higher static/differential pressure setpoint may increase the fan speed, while a lower differential pressure setpoint may decrease the fan speed.

Decrease Dry bulb to Increase RH:

If the control system associated with RH control determines that the drybulb temperature being delivered to the space/process needs to be decreased to create a higher relative humidity level, the control system will communicate with the various components of the system to create a lower drybulb temperature. For any given moisture content level of air, a lower dry bulb temperature may result in a higher RH level.

In some embodiments, the control system communicates with one or more valves that control the flow (mass flow rate) of the warmed fluid being sent through the cooling recovery coils (CRC) 1-0030, sometimes referred to as the Energy Recovery Coil or ERC. In order to decrease the drybulb temperature, the valve may be modulated (e.g., by the control system) to decrease the flow of warmed fluid passing through the CRC 1-0030. This lower volume of warmed fluid may decrease the average temperature of the fluid within the CRC 1-0030 heat transfer tubes. The lower average temperature of the fluid within the CRC 1-0030 tubes will increase the temperature of the air passing over the coils to a lesser extent, thus decreasing the drybulb temperature.

In some embodiments, the control system communicates with one or more variable speed/variable flow fluid pumping systems that control the flow (mass flow rate) of the warmed fluid being sent through the CRC 1-0030. In order to decrease the drybulb temperature, the pump speed may be modulated (e.g., by the control system) to a lower speed, to decrease the flow of warmed fluid passing through the CRC 1-0030. This lower volume of warmed fluid may decrease the average temperature of the fluid within the heat transfer tubes. The lower average temperature of the fluid within the tubes may increase the temperature of the air passing over the coils to a lesser extent, thus decreasing the drybulb temperature. The pump speed can be modulated directly, or via the use of an intermediate step (e.g., by modulating the setpoint for the system differential pressure). A higher differential pressure setpoint will increase the pump speed, while a lower differential pressure setpoint will decrease the pump speed.

In some embodiments, the control system communicates with one or more cooling systems/chillers that directly or indirectly control the temperature of the warmed fluid being sent through the cooling recovery coils (CRC) 1-0030. Since the CRC 1-0030 relies on the approach temperature between the warmed fluid inside the coils and the air being delivered through the coils to raise the dry bulb temperature of the air, obtaining the highest quality heat (highest temperature), can increase the effectiveness, and thus the air temperature, leaving the CRC 1-0030. In some implementations, providing colder chilled water to the C/C 1-0015 may result in a lower volume of water being required to meet the loads served by the C/C 1-0015, but the fluid temperature leaving the C/C 1-0015 may be at a higher level (e.g., assuming that the C/C is under control). In this case, where the control system increases the CRC air temperature to a lesser extent, lower quality heat can be used to save chiller energy. In order to increase the drybulb temperature of the air leaving the CRC to a lesser extent, the chilled water supply temperature setpoint can be increased (e.g., by the control system), and the cooling system/chiller will modulate (e.g., by the control system) to a reduced capacity. The lower available cooling system/chiller capacity may increase the temperature of the fluid being supplied to the C/C 1-0015. This warmer chilled fluid temperature entering the C/C 1-0015 may decrease the temperature of the fluid leaving the C/C (e.g., assuming a constant load on the C/C 1-0015). The lower CRC entering fluid temperature may decrease the average temperature of the fluid within the CRC heat transfer tubes. The lower average temperature of the fluid within the CRC tubes may increase the temperature of the air passing over the coils to a lesser extent, thus increasing the drybulb temperature.

In some embodiments, the control system communicates with one or more variable speed/variable flow air delivery/fan systems that control the flow (mass flow rate) of the air being sent through the cooling coils (C/C) 1-0015 and into the conditioned spaces or process loads. In order to decrease the drybulb temperature, the volume of air passing through the cooling coil may be modulated to a higher volume (e.g., by the control system), to increase the flow of air passing through the C/C 1-0015. The C/C fluid flowrate may be modulated to a higher level (e.g., assuming that the dewpoint temperature setpoint for the C/C remains unchanged), which may result in a lower quality warmed fluid temperature leaving the C/C 1-0015. The increased air volume passing through the C/C 1-0015 increases the loads on the C/C 1-0015, so the chilled fluid flow rate is increased further, again, resulting in a lower quality warmed fluid temperature being available to the CRC 1-0030. The increased air flow rate may also result in the dry bulb temperature of the conditioned spaces being raised, due to the increased cooling capacity available to remove the sensible heat from the spaces. This higher volume of air passing over the CRC coils 1-0030, and the lower quality heat inside the CRC 1-0030 tubes may decrease the average temperature of the air passing over the heat transfer tubes. The lower average temperature of the air passing over the CRC tubes may increase the RH level.

Similarly, the fan speed command can be modulated (e.g., by the control system) to deliver a lower volume of air. This is most effective at raising the RH levels if there are significant sources of moisture being generated in the spaces, or by moisture sources such as operable windows and doors being left open or poor facility construction being present. Sending a lower volume of air into the load by modulating the fan speed to a lower level, without changing the dewpoint and drybulb temperature of the air being delivered to the conditioned spaces/process loads may result in the RH levels being increased (e.g., if there are moisture generation sources such as those described above). The fan speed can be modulated directly, or via the use of an intermediate step (e.g., modulating the setpoint for the supply air distribution system static/differential pressure). A higher static/differential pressure setpoint may increase the fan speed, while a lower differential pressure setpoint may decrease the fan speed.

In some implementations, the control system may control one or more components of the systems described herein to anticipate increases and decreases in the loads in specific areas of a facility and to direct resources to those areas that will need more capacity, and reduce resource allocations to areas where the loads are dropping off. For example, the control system may receive inputs (e.g., input/output devices or systems, 340) from one or more of: Security Systems (e.g., badge control for workers and their locations in the facility, motion detectors to infer occupancy levels, window alarms and positions, door alarms and positions, etc., Fire/life safety systems, Elevator control systems, Parking lot and parking garage gate control, entry and exit gates, parking garage and parking lot occupancy monitoring system, Lighting control systems, Motion sensors, Occupancy scheduling system, Occupancy counting systems, Occupancy heat maps, Historical occupancy heat maps, Equipment scheduling systems, Room or area scheduling system (industrial, offices, schools, colleges, universities), Production scheduling systems, RFID system to plan for production increases and decreases, Building mass temperature sensors, Building mass moisture sensors, and the like.

When the control system determines the desired direction of the controlled variables, the control system communicates with the various components of the systems, as described above. In some implementations, setpoints such as dewpoint temperature, dry bulb temperature, fan speed command, pump speed commands, differential pressure and static pressure setpoints, and chilled water supply temperature setpoint can be varied pre-emptively to reduce swings in the conditioned spaces or process loads, (e.g., as would be the case in a reactive, rather than anticipatory control system).

In some implementations, the control system may control one or more components of the systems described herein to control the HEDS units, chillers, boilers and support equipment to increase demand or decrease demand based on signals from these various sources. To increase demand, the dewpoint temperature, RH and chilled water supply setpoints can be decreased, and airflow rates, static pressure setpoints and condenser water temperature or refrigerant temperature setpoints can be increased. To decrease demand, the opposite can occur. For example, in some implementations, the control system may receive inputs (e.g., inputs 340) from one or more of: Level of added demand requested, and duration of the event, Level of demand reduction requested, and the duration of the event, meter and submeter readings to provide feedback to the controller, Distributed Energy Resource Control System, Grid load shape control system, Renewables control and monitoring systems, Power plant load and efficiency information to increase or decrease loads on the grid, Local grid condition information to assist with load shaping, voltage and frequency control locally, Regional grid condition information to assist with load shaping, voltage and frequency control regionally, Electrical generator control systems—load, reserve load, efficiency, fuel consumption rate, frequency, voltage, amperage, exhaust gas temperatures, generator temperature and other information as required to optimize the use of the generators and their available fuel sources, Utility or Independent System Operator (ISO) inputs (e.g., input devices 340) for: Voltage and frequency regulation—up and down, Demand reduction request and future reduction request, Demand increase request and future increase request, Anticipated need for demand reduction, Anticipated need for demand increase, Power quality, Facility Owner/manager/operator/ other 3rd party inputs for: Voltage and frequency regulation—up and down, Demand reduction request and future reduction request, Demand increase request and future increase request, Anticipated need for demand reduction, Anticipated need for demand increase, etc., Frequency sensors at main power feed to facility, at transformers within the facility, and at local and regional substations, Voltage sensors at main power feed to facility, at transformers within the facility, and at local and regional substations, Power quality sensors at main power feed to facility, at transformers within the facility, and at local and regional substations, Thermal sensors at main power feed transformer to facility, at transformers within the facility, and at various loads within the facility, Thermal energy storage and battery energy storage and other forms of energy storage, and the like.

In some embodiments, the control system receives information from a variety of building systems and wired or wireless connections with electrical grid and building electrical infrastructure related systems. The control system utilizes current and historical data to anticipate the needs of the conditioned spaces or process loads, while varying loads based on inputs (e.g., input devices 340) from the grid and other systems. When the control system determines the desired direction of the controlled variables, the control system communicates with the systems and equipment, as described above.

Setpoints such as dewpoint temperature, dry bulb temperature, fan speed command, pump speed commands, differential pressure and static pressure, and chilled water supply temperature setpoint can be varied by the control system in a manner that provides benefit to the electrical grid and facility electrical infrastructure and utility costs, while minimizing negative impacts on the facility, it's occupants and process loads.

The control system described herein, unlike typical demand response (DR) or Distributed Energy Resource (DER) control systems, includes the effects of changing system setpoints on the RH and moisture content of the conditioned spaces. Utilizing the specialized control sequences and equipment described herein can allow for prolonged capacity reductions that still reduce the potential for biological growth to occur.

Traditional DR/DER systems may use brute force changes to the HVAC system, such as shutting off one or more chillers, demand limiting the chillers, sending fan speed limitation commands or reduced static pressure setpoints to fan speed controllers, raising the HVAC system supply air temperature setpoints, raising the chilled water supply temperature, lowering the chilled water system differential pressure setpoint or limiting the maximum pump speed commands. All of these strategies blindly increase the supply air temperature to the point that minimal to no dehumidification occurs. When this occurs, the dewpoint temperature and RH in the conditioned spaces can increase to the point that biological growth is likely, if not guaranteed.

To decrease electrical demands, the control system described herein can perform various functions. For example, the fan speed may be capped by the control system at various speeds—the lower the speed, the greater the demand reduction. The dewpoint temperature setpoint may be allowed to float higher than during normal operation, to be controlled to maintain the space or return air RH at up to 65%, rather than maintain a desired dewpoint temperature. The CRC control system may fully reclaim energy via the CRC 1-0030 and CRC2 1-0033. When combined with the reduced supply air volume and the increased dewpoint temperature setpoint, the full energy reclaim may significantly reduce the loads on the chillers and fan systems, while still controlling RH. The control system may analyze the outage and at set intervals (e.g., every 10 hours), the control systems may reduce the space/return air RH setpoint (e.g., to 50%) for a period of time (all setpoints may be automatically and/or manually adjustable) to help break the germination/ growth cycles for a variety of unwanted biologicals.

In some implementations, as deeper demand reductions are requested, the fan speeds may be limited in increasingly more aggressive manners. For example, the return air damper system may be closed completely, and the only air being brought into the building may be the fresh air. In such configurations, all of fresh air may pass through the HVAC equipment for dehumidification. In some implementations, the control system may shut off the exhaust systems (e.g., where appropriate and safe), and minimize the amount of fresh air brought into the building via adjusting one or more dampers to adjust the level required to keep the building positively pressurized. In some implementations, the control system may completely shut the HVAC system off, and at various time intervals (e.g., 10 hours), restart the systems to bring the space RH under control.

In some implementations, the control system 300 may reduce power consumption to extend the available resources and fuel supplies. Various levels of demand and consumption curtailment may be utilized, based on inputs (e.g., input devices 340) from the affected systems, as well as adjustable setpoints. In some implementations, inputs may be received, such as CNG, LNG, LPG, propane, hydrogen, alcohol, petroleum, gasoline, diesel, biodiesel, methane, ethane, methanol, ethanol, butanol, ammonia and other fuel storage systems, land based and maritime based systems, current and projected amounts of fuel available for power generation, propulsion, HVAC, lighting, general electrical loads, reheat/heating and current/historical/projected fuel consumption rates to stretch the available fuel to meet the scheduled need for fuel to reduce the possibility of running out of fuel, or running low on fuel, and the like. In some implementations, such as for large ships, or vessels, the control system may evaluate the projected time on station at current and historical fuel consumption rates, notify personnel of the projected time on station as compared to the desired time on station, and the like. In some circumstances, if projected time on station is less than desired time on station, the control system may automatically reset HVAC and other equipment setpoints, and on/off status as needed to exceed the desired time on station by an operator adjustable amount.

In some implementations, the control system 300 may evaluate current fuel consumption, historical trends in fuel consumption and loads served by the generation system and compare that information against currently available fuel reserves and anticipated refueling dates and refueling quantities to determine how to adjust various variables, including dewpoint temperature, drybulb temperature, flow rate, capacity, and the like.

In some implementations, the control system may communicate with one or more inputs (e.g., input devices 340), such as one or more water level monitoring systems, such as storage tanks, ponds, cooling tower basins, other vessels (e.g., low water level means to "produce more condensate" or "reduce chiller plant loads"). The control system 300 may determine where loads need to be supplied to meet desired water make up quantities and time availability duration. In some implementations, when added water is required, the dewpoint temperature setpoint and fan speed limitation may be modulated by the control system in a manner that dries the air out to a lower dewpoint setpoint, and provides a higher CFM, as may be required, via means described herein.

In some implementations, the control system 300 may communicate with input devices 340, such as water filters, reverse osmosis systems, distillation systems, UV light systems, and other purification systems.

In some implementations, the control system 300 may adjust setpoints to deal with the needs of the systems that provided the input data, such as from input devices 340. The input devices 340 may include HVAC optimized start/stop systems, Coasting cycle control systems, Low load shutdown control system, Chiller failure alarm system, Chiller load recycle systems, HVAC control and monitoring systems, Air sampling systems (CO2, particles, VOC's, other), visual monitoring systems, and the like.

In some embodiments, the control system includes an HVAC optimized start/stop system. The control system may evaluate the conditions at the time of the requested start time and determine what the desired dewpoint temperature and drybulb temperatures are, and/or the fan speed limitations. In some embodiments, if the facility is hot and humid inside, starting the fan system and delivering very cold air into the conditioned spaces may cause condensation to occur in the spaces. In some implementations, the control system may modulate the fan speed, dewpoint and dry bulb temperature setpoints in a manner that dries the building out quickly, such as by controlling the dewpoint temperature setpoint. For example, the control system may control the dewpoint temperature setpoint to be a few degrees (or more) above the chilled water supply temperature entering the C/C 1-0015 to maximize moisture removal from the space. The CRC dry bulb temperature may be controlled by the control system to provide a dry bulb temperature that is at least several degrees above the dewpoint temperature of the return air or conditioned space. The fan speed may be controlled by the control system to push as much air as possible. The fan speed may be limited by, for example, the maximum fan speed on startup, the need to maintain the C/C dewpoint temperature at its setpoint, and the need to maintain the CRC leaving drybulb temperature at its setpoint. If the dewpoint temperature or dry bulb temperature exceed their setpoints, the fan speed may be slowed down by the control system.

In some embodiments, the control system 300 may include a coasting cycle control system. The coasting cycle control system may allow the main HVAC system equipment to be shut down or capacity limited at/near the end of the day, when loads are typically their lightest and dropping. The control system 300 may evaluate the dewpoint and RH conditions of the space or return air. If the dewpoint and space/return RH conditions are under control, the fan speed command/static pressure setpoint may be modulated by the control system to a position that reduces the CFM being delivered to the spaces by 15% to 50% or more. The C/C valves and/or system may be modulated by the control system to 100% open, filling the C/C 1-0015 with cold water. The CRC valves and/or system may be modulated by the control system to maximum flow through the CRC 1-0030 and CRC2 1-0033. In this manner, the C/C 1-0015, CRC 1-0030 and CRC2 1-0033 may be all filled with a volume of cold water that will allow the main chiller systems to be shut down, while flowing chilled water around the facility, using the energy stored in the CHW loop, and the C/C 1-0015, CRC 1-0030 and CRC2 1-0033 as the chiller-equivalent. In some embodiments, the system may not include the CRC2 1-0033.

In some embodiments, the control system includes a chiller failure alarm control system. When a chiller failure occurs, the system may be put into one of the electrical grid load shaping levels, depending on the severity of the failure. Such configurations may prolong the ability of the HVAC system to provide moderately conditioned air to the desired spaces, even in the event of an equipment failure.

In some implementations, the control system 300 may monitor one or more building differential pressure sensors, which compare the pressure inside the building, in that location, to the pressure outside the building. In some embodiments, the control system 300 is configured to maintain a positive pressure when the facility is in a cooling/dehumidification mode. The control system may maintain a slightly negative pressure if the facility is humidity controlled during sub-freezing weather to reduce condensation in the wall and attic spaces for some occupancy types.

In some implementations, the control system 300 may receive inputs from input devices 340, such as Hospital system inputs, nurses call stations, room occupancy systems, IAQ feedback systems, scheduling systems for patient rooms, pre-op, post op, operating rooms (OR's), types of surgeries being scheduled and the desired IAQ conditions for each room, relative pressurization needs for the surgeries being scheduled, occupied unoccupied status for each occupancy type, minimum and maximum CFM setpoints and minimum and maximum setpoint values for dry bulb, wet bulb, dew point and relative humidity for various hospital areas, ultraviolet (U.V.) light control systems, and other air sterilization systems, and the like. In some implementations, the control system 300 may receive inputs from input devices 340, such as airport aircraft flight scheduling systems, aircraft size, passenger counts, and gate doorway status.

Some additional typical HVAC problems that the implementations of the current subject matter can resolve:

Cooling Coil Face Velocity is Too High Causing High RH and Moisture Carry Off from the Coils: HEDS systems described herein use low cooling coil face velocities, typically less than 450 feet per minute.

Coils That are Too Tall Creates Problems—Condensate Stacking and Moisture Carry Off: HEDS systems described herein use cooling coils that may be vertically short. For example, the cooling coils may be less than 30" tall, but the height may be taller, such as if the coil length is greater than 3× the coil height.

Cooling Coils That Are Too Small (Rows, Face Area, Surface Area): HEDS systems described herein use large rows, face area, surface area.

Condensate Stacking in the Coil/Condensate Carry-Off From the Coil: HEDS systems described herein eliminate condensate stacking—shorter vertical height, wider fin spacing, greater drainage area, intermediate drain pans Lack of Intermediate Drain Pans: HEDS systems described herein may be equipped with intermediate drain pans Low Delta T Syndrome is a Contributor to Mold Growth Caused by HVAC systems: HEDS systems described herein solve Low Delta T Syndrome by providing higher than "normal" chilled water system temperature differentials. Cooling Coil load TD's are typically in excess of 17° F., and can exceed 30° F.

Building Pressurization with Low RH Air Must Occur Continuously During Humid Days: HEDS systems described herein maintain building pressurization with low RH air in the building.

Vapor Migration Into Buildings Is a Significant Problem: HEDS systems described herein reduce vapor migration into buildings by, for example, keeping them positively pressurized, and keeping the air in the facility at a low RH level, below 60%.

Not Treating Dehumidification Loads at the Source: HEDS systems described herein treat dehumidification loads at the source to reduce RH in the conditioned spaces Supply Air Relative Humidity in the Supply Ducts is Too High: HEDS systems described herein lower duct air Relative Humidity, such as by injecting heat at the AHU via the CRC.

Over-Cooling of Spaces Creates Problems: HEDS systems described herein eliminate space overcooling related to RH control, by using reclaimed energy from the chilled water cooling coil (CC, or C/C) leaving water as the primary reheat heating source.

Constant Air Volume (CAV) Systems Create Problems: CAV with HEDS systems described herein eliminates these problems, HEDS provides free reheat, by, for example, using reclaimed energy from the chilled water cooling coil (CC, or C/C) leaving water as the primary reheat heating source.

Standing Water in Drain Pans Causes Mold Growth: HEDS systems described herein use dual-sloped drain dry pan designs to ensure no standing water remains in the drain pans.

Many Systems are Only Equipped with Pre-Heat Coils, Not Reheat Coils: HEDS systems described herein use preheat and reheat coils as needed, in addition to the cooling coils and cooling recovery coils Lack of Drain Pans in the Fresh Air/Mixed Air Plenums: HEDS systems described herein have drain pans in these locations DX Compressor Cycling/Poor Controls: HEDS systems described herein can unload down to 0% load effectively HVAC Fan Belts That Slip: HEDS systems described herein use direct drive motors, no belts to slip.

HVAC DOAS or Fresh Air Make-up Fan Belts That Slip: HEDS systems described herein use direct drive motors, no belts to slip Manual HVAC System Setpoint Over-rides: HEDS systems described herein include fail safe designs that provide reheat energy regardless of manual overrides or equipment failures Radiant Panel and Active and Passive Chilled Beam Systems Can Create Problems: HEDS systems described herein provide properly dehumidified air to reduce problems with these systems.

Chilled Water Based System Airside Temperature Swings Creates Problems: HEDS systems described herein include a failsafe design that ensures lower RH air leaves the unit, and has logic to reduce leaving air temperature swings.

Undersized Ductwork Causes Low Supply Air Temperature Requirement: HEDS systems described herein can provide low dewpoint, lower RH air to a space, so loads can be met with less CFM (e.g., dry air feels cooler than "wet" air).

Undersized VAV Boxes Causes Low Supply Air Temperature Requirement: HEDS systems described herein can provide low dewpoint, lower RH air to a space, so loads can be met with less CFM (e.g., dry air feels cooler than "wet" air).

Supply Air Reheat Non-Existent, or Not Being Used: HEDS systems described herein can provide low dewpoint, lower RH air to a space, new reheat energy is minimized or eliminated by, for example, using reclaimed energy from the chilled water cooling coil (CC, or C/C) leaving water as the primary reheat heating source.

Chiller Plants That Are Too Small: HEDS systems described herein increase effective chiller plant capacity by 18% to 37%

Chilled Water Piping That is Too Small: HEDS systems described herein can deliver >two times the BTU's per gallon of fluid delivered, essentially doubling the pipeline capacity Undersized Air Cooled Condensers Cause High Supply Air Temperatures and Lack of RH Control: HEDS systems described herein reduce cooling loads by 18% to 37%, taking load off of the condenser Chillers Overshooting Setpoint on the Low Side or High Side: HEDS systems described herein provide lower RH air, and may have significantly greater fluid mass within them, reducing effects of chilled fluid temperature swings Chillers That Don't Unload Below 30% to 40% Capacity: HEDS systems described herein have the ability to false load the chillers to reduce/eliminate low load cycling problems Chilled Water Supply Temperature "Optimization" Software can Contribute to Mold Growth: HEDS systems described herein seek first to meet RH and temperature requirements, then save energy HEDS optimization resets do not generally allow the dewpoint or RH to get out of control.

Lack of or Improper Use of Chilled Water System Differential Pressure Reset Logic: HEDS systems described herein seeks first to meet dewpoint temperature, RH and temperature requirements of the conditioned spaces or process loads, then save energy. The HEDS differential pressure setpoint reset sequence may be based on meeting the needs of the HEDS CC and CRC coil systems, which are based on meeting temperature, dewpoint and RH conditions required by the conditioned spaces or process loads.

Lack of or Improper Use of Chilled Water Supply Temperature Reset Logic: HEDS systems described herein seeks first to meet dewpoint temperature, RH and temperature requirements of the conditioned spaces or process loads, then save energy, the chiller chilled water supply temperature setpoint reset sequence may be based on meeting the needs of the HEDS CC and CRC coil systems, which are based on meeting temperature, dewpoint and RH conditions required by the conditioned spaces or process loads.

HVAC Airside Optimization Software—Chilled Water Based Systems: HEDS systems described herein seeks first to meet dewpoint temperature, RH and temperature requirements of the conditioned spaces or process loads, then save energy. The HEDS dewpoint temperature setpoint reset, dry bulb temperature setpoint reset and fan CFM related resets may all be based on meeting the needs of the HEDS CC and CRC coil systems, which are based on meeting temperature, dewpoint and RH conditions.

Direct Expansion (DX) System Cycling/Staged Control Creates Problems: HEDS systems described herein has the ability to false load the chillers to reduce/eliminate low load cycling problems Common Residential, Barracks, Dorm, Hotel, Apartment Complex HVAC Designs Create Situations for Mold Growth: HEDS systems described herein can help to eliminate HVAC-caused mold growth Water-Sourced Heat Pumps, Air Sourced Heat Pumps, Ground Coupled Heat Pumps can all Create Situations for Mold Growth: HEDS systems described herein can help to eliminate HVAC-caused mold growth High Occupancy Zones that are Rarely Highly Occupied can Create Situations for Mold Growth: HEDS systems described herein can provide low dewpoint, lower RH air to a space to reduce over-cooling and high space RH issues DX Systems that are Short of Refrigerant Charge, Or Over-Charged: HEDS systems described herein reduces equipment capacity issues, and can unload down to 0% load. HEDS can be used to pretreat the fresh air entering DX or refrigerant based systems (and chilled water based systems), to reduce the effects of capacity issues related to refrigerant charge problems.

HVAC Airside Optimization Software—DX Compressor Based Systems: HEDS systems described herein seeks first to meet dewpoint temperature, RH and temperature requirements of the conditioned spaces or process loads, then save energy. HEDS can be used to pretreat the fresh air entering DX or refrigerant based systems (and chilled water based systems), to allow refrigerant based systems to only have to deal with sensible loads, and potentially minimal latent loads, allowing the supply air temperatures from the refrigerant based systems to be set much higher, reducing lift and saving energy.

DX Compressors That Are Too Big: HEDS systems described herein reduces equipment capacity issues, and can unload down to 0% load Chillers That Are Too Big: HEDS systems described herein reduces equipment capacity issues, and can unload down to 0% load Single Chiller Buildings: HEDS systems described herein reduces equipment capacity issues, and can unload down to 0% load Constant Speed Chiller Compressors: HEDS systems described herein reduces equipment capacity issues, and can unload down to 0% load Two Pipe Chilled Water Distribution Systems Can Create Problems: HEDS systems described herein provides reheat energy where there is no reheat energy available by, for example, using reclaimed energy from the chilled water cooling coil (CC, or C/C) leaving water as the primary reheat heating source.

Desiccant Wheel Equipment Failures Can Contribute to Mold Growth: HEDS systems described herein provide low dewpoint, lower RH air to the loads and have many less points of failure and maintenance needs.

Mixed Air Bypass Systems Can Create Problems: HEDS systems described herein does not mix super-cooled air with mixed air that may have a high moisture content, eliminating the potential for misting, fogging and condensation to occur Return Air Bypass Systems Can Create Problems: HEDS systems described herein does not mix super-cooled air with return air that may have a high moisture content, eliminating the potential for misting, fogging and condensation to occur Face-Split DX Coil Circuiting Creates Problems: HEDS systems described herein does not mix super-cooled air with mixed air that may have a high moisture content, eliminating the potential for misting, fogging and condensation to occur Sub-Cooling DOAS Without Reheat Can Create Problems: HEDS systems described herein intrinsically delivers low dewpoint, lower RH air to the systems Sub-Cooling DOAS Without Preheat Can Create Problems: HEDS systems described herein can unload further then typical DOAS units Air to Air Heat Exchangers Can Create Problems in Humid Climates: Uncontrolled condensation and biological growth can occur in air to air HX systems, not in HEDS systems Drain Pans do not Extend Below the Cooling Coil Headers: HEDS systems described herein include drain pans that extend below the cooling coil headers Condensation in the After-Filters Creates Problems: HEDS systems described herein can provide low dewpoint, lower RH air into the after-filters to eliminate this issue Demand Response/Grid Load Shaping Systems Can Create High Humidity and Moisture Carry off Problems: HEDS systems described herein can control RH, even when in a Demand Response mode of operation.

FIGS. 25A-69 illustrate various configurations of AHUs and components of AHUs, which may include any of the components described herein, including, but not limited to, the PHC 1-0026, the first CC #1 1-0015, the second CC #2 1-0015A, the first CRC 1-0030, the second CRC 1-0033, and the RHC 1-0027, among other components.

Coil Cleaning and Management

As noted above, as coils used in various HVAC systems, and their heat transfer fins age, corrosion, dirt and biological growth can further degrade performance that was most likely inadequate in the first place, so the problems become worse over time. This can create situations where control systems are unable to maintain stable dry bulb temperature, dew point temperature and relative humidity control. Implementations of the current subject matter can help to clean and maintain the coils and other equipment, extending the usable life of the equipment, while reducing the overall size, weight and use of materials of the systems.

For example, AHUs in many harsh environments need to be replaced frequently due to heat transfer coil and fin corrosion and failure. Equipment in coastal regions, for example, may only last 2 to 7 years before needing to be replaced. In many cases, the AHU casings, fans and other equipment have many additional years of life left in them, but the coils fail, even coils that have had anti-corrosion treatments applied. If the coils were able to be cleaned and maintained on a regular basis, their life expectancy could be extended significantly. The construction of the typical AHU's is such that replacing the coils is very difficult, and more costly than just replacing the entire unit, so significant numbers of AHU's and many tons of steel, copper and aluminum are sent to the trash dump needlessly.

Many facilities and locations that have significant dehumidification loads do not receive properly conditioned air due to undersized or improperly designed cooling coils. Proper dehumidification requires a significant number of heat transfer tube rows to be built into each cooling coil, whether it be liquid based or refrigerant based.

The subject matter described herein applies to all heat transfer coils, whether they be sourced by steam, hot water, chilled water, cool water, mixed phase refrigerants, liquid refrigerants, gaseous refrigerants or any other heat transfer fluid.

Many applications require at least 8, 10, 12 or more rows of heat transfer tubing and extended surface heat transfer fins. A low "fin per inch" count helps to reduce the dewpoint of the air, but may not provide adequate heat transfer surface area to reduce the sensible temperature (drybulb) far enough. When light cooling/dehumidification loads exist, if there is excessive heat transfer surface area available, and the controls are not properly configured, the system may be difficult to control, and may over-cool the air, or swing between under-cooling and over-cooling, creating the need for excessive reheat energy to warm the air back up to meet comfort conditions or process needs.

Coils that have adequate depth (numbers of rows of heat transfer tubes and extended fin surface area) to meet the desired peak dehumidification loads, may be unable to have their innermost rows cleaned, demineralized and disinfected. ASHRAE recommends a maximum coil depth of 8 rows to allow proper cleaning and maintenance to occur. Depending on the fin density, 8 row, 6 row and even 4 row coils may not be able to be properly maintained.

During typical dehumidification processes, solids can be deposited, and gelatinous materials and biological growth can occur on the heat transfer surface areas of the coil systems. With many applications, these materials may be un-cleanable and inaccessible with currently available designs and technologies.

These materials and biological growths reduce the available cross section of the heat transfer surface area of the coil systems and can significantly increase the air velocity that is passing through the coil systems. The increased air velocities and nature of the materials can lead to liquid water (condensate) being carried off of the fin surfaces and into the AHU, after-filters, ductwork or conditioned spaces, creating habitats for biological growth to occur.

For heat transfer coil systems with non-condensing loads, these same problems can still exist if the relative humidity and availability of food occurs, or if liquid water is deposited onto the heat transfer surface areas.

In rare occasions, Ultra Violet lights (e.g., Ultra Violet Germicidal Irradiation, UVGI) are incorporated into the AHU, typically downstream from the cooling coils (such as in the configuration shown in FIGS. 1-19). UVGI may not reach very far into the heat transfer surface area, and thus may be ineffective at reducing most of the biological growth that occurs within the coil finned surface areas.

AHUs typically have significant distances between the individual coil sections to allow upstream and downstream access for cleaning, such as minimum distances of 18" to 22" (for short length coil sections) and to >36" (for longer length coil sections), which may be used to allow personnel to have access to the interior of the unit for inspections and cleaning.

HVAC AHU equipment can be built for ease of maintenance, or for low first cost, but not typically both. If the AHU is built to be easier to maintain, it can be significantly longer, and thus more expensive than the least expensive AHU designs. One factor in driving the "ease of maintenance" AHU costs higher is the need to be able to clean the front and back sides of the heat transfer coils, on a fairly frequent basis. Consistent cleaning may be required to maintain thermal performance, and to reduce the potential for biological growth, heat transfer fin corrosion and condensate being blown or pulled off of the cooling coils and landing downstream in the AHU or ductwork systems. In order to be able to clean the coils easily, access doors are provided between each coil section to allow them to be observed and cleaned. In many cases, the access doors are 18" clear width, which translates into a minimum distance between coil casings of approximately 22" in many cases.

Material costs are a driver of AHU costs. The longer the AHU, the higher the costs. Overall length increases of an AHU, as driven by the need for spaces and access doors between coils can add significant costs to the AHU. The added length required by these access door sections can also increase the required sizes of the mechanical spaces that house the AHU's. For example, if the AHU is roof mounted, or pad mounted, it can add considerable costs to the structural supports or concrete equipment pads. In many cases, there are existing mechanical spaces where AHU's designed for ease of maintenance will not fit when it is time to replace the installed equipment. If the current AHU is rooftop mounted, or in a mezzanine, or in a multi-floor building, the added weight associated with the significantly larger AHU's designed for ease of maintenance can disallow them from being installed.

Various combinations of ductwork, plenums, louvers, dampers, fan systems, air filters and other typically required items in an HVAC system can be located upstream or downstream or both from the coil sections shown.

Heat transfer coil sections and row counts are shown for depiction of specific coil combinations and are for illustrational purposes. Other row counts and configurations are also contemplated and may take advantage of the features of the current subject matter shown in this the figures and described herein.

Access doors or removable panel sections may be provided at each coil section to allow easy access to the cleaning and flushing equipment for performance of the cleaning process. The access doors and removable panel sections are not shown in the figures.

The dimensions shown in FIGS. 25A-28B are shown for illustrational purposes, are estimates, and may vary based one or more variables, including the actual number of different coil sections, the number of tube rows in each coil section, the width of the coil cleaning access areas, tube diameters, tube to tube centerline differences, and desired drain pan configurations, and the like. The fluid inside the fluid conduits does not change the function and intent of the systems. Refrigerant based, water based or other fluid based heat transfer coils all may be cleaned on their inlet and/or outlet sides.

In some embodiments, the systems can be used as an evaporative cooling system, by utilizing a clean water source and pumping, or otherwise circulating the water over the heat transfer surface area during normal operation. This has the added benefit of continually flushing solids that may have accumulated on the heat transfer surface of the coils.

At shutdown, the sump system would be drained, and the clean water source would be fed over the surface area to lessen any residual solids that may have been present.

Chemically treated and/or lightly de-ionized water can be utilized to kill unwanted biological growth. The chemical systems and level of de-ionization of the water must be compatible with the materials of construction, as well as the occupancies of the spaces or process loads being conditioned.

In hospital settings, or other settings where elimination of biological growth and elimination of airborne biologicals are critical, the cleaning cycle can be continuous, or as frequent as needed to obtain the desired end result. Designing the coil systems for very low face velocity will allow the process to be continuous if desired. Filtration systems for the recirculated fluids are included in the subject matter but not shown.

In some embodiments, the subject matter can be used as a humidification system, including preheat coils (such as the PHC 1-0026), cooling coils (such as the CC 1-0015), energy recovery coils (such as the CRC 1-0030, 1-0033), reheat coils (such as the RHC 1-0027), and other heat transfer coils as may be required for the specific application.

Some implementations of the current subject matter include co-locating the coils in the same frame or frames (e.g., bolted together), back to back, with multiple ways to clean and disinfect the coils, and may include coils in the middle of the coil banks that are typically inaccessible.

Implementations of the current subject matter address the needs to provide the proper number of rows to provide the desired dehumidification levels, reduce overall unit length and cost while enhancing the ability to maintain, clean and disinfect the entirety of the cooling coil, including both faces, and all of the rows in between, for example.

Implementations of the current subject matter address the need to reduce overall unit length and cost while enhancing the ability to maintain, clean and disinfect the entirety of the other heat transfer coils, including both faces of each coil, and all of the rows in between.

Implementations of the current subject matter include the provision of insulated access panels that can be removed, to allow the cooling coil systems and other heat transfer coil systems to be removed and replaced with new heat transfer coils with relative ease, without damaging the remaining structure of the AHU. Access panels and access doors to allow the coil cleaning slots to be easily usable are not shown for clarity, but may be included as a part of the various embodiments shown and described.

Figures 25A, 25B:
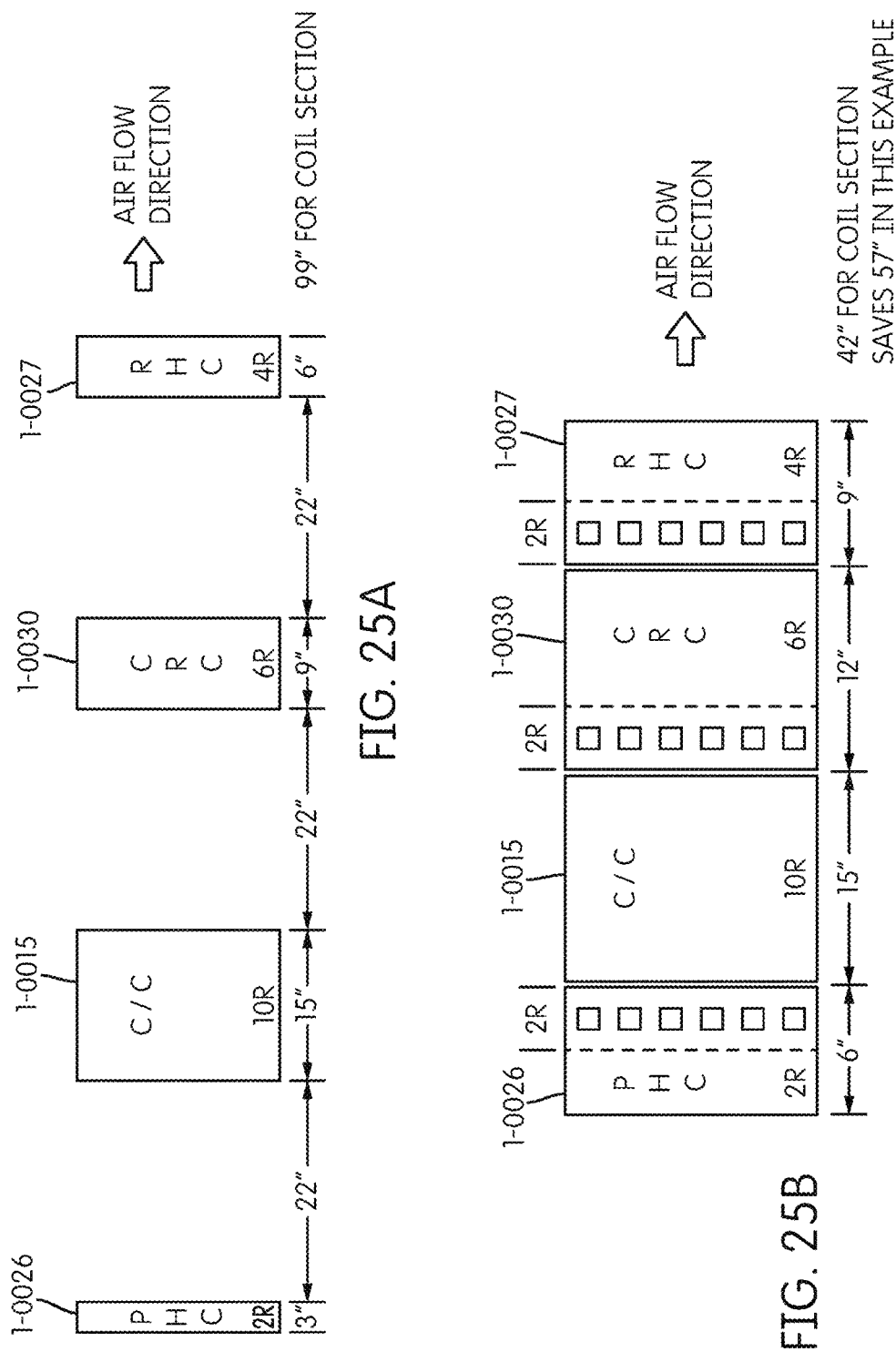
FIGS. 25A-25B illustrates depictions of an AHU coil configuration to extend the operational life of the AHU coil consistent with implementations of the current subject matter.

FIG. 25A illustrates a depiction of an AHU coil configuration designed to extend the operational life of the equipment and enhance thermal performance by incorporating typical maintenance access lengths. As shown in FIG. 25A, the AHU coil configuration includes a two row (2R) Pre Heat Coil (PHC) 1-0026 that is 3" deep, a 22" wide access bay between the coil casings, a ten row (10R) Cooling Coil (CC) 1-0015 that is 15" deep, a 22" wide access bay between the coil casings, a six row (6R) Cooling Recovery Coil (CRC) 1-0030 that is 9" deep, a 22" wide access bay between the coil casings, and a four row (4R) Re-Heat Coil (RHC) 1-0027 that is 6" deep, and has a total coil section length of 99". Other sizes and configurations are contemplated, as noted herein.

FIG. 25B illustrates a material optimized, resource efficient, coil bank layout that still allows the front and back of each of the coil sections to be accessed and cleaned. The same heat transfer row counts are included in FIG. 25B configuration as are in the FIG. 25A configuration.

In this implementation, the PHC 1-0026, CRC 1-0030 and RHC 1-0027 are all equipped with a two row (2R) wide access section, with removable plates shown as squares. The access section can be wider or narrower than depicted in FIG. 25B (as may be implemented for all depictions). The inlet side of the PHC 1-0026 is available for cleaning, typically by removing the air filters from their frames. The downstream side of the PHC 1-0026 is available for cleaning by opening up the access panels on the downstream side of the coil.

The inlet side of the CC 1-0015 may be accessed from the same openings that serve the discharge side of the PHC 1-0026. The downstream side of the CC 1-0015 may be available for cleaning by opening up the access panels on the downstream side of the coil. In some implementations, the inlet side of the CRC 1-0030 is accessed from the same openings that serve the discharge side of the CC 1-0015. The downstream side of the CRC 1-0030 may be available for cleaning by opening up the access panels on the downstream side of the coil.

In some implementations, the inlet side of the RHC 1-0027 is accessed from the same openings that serve the discharge side of the CRC 1-0030. The downstream side of the RHC 1-0027 can either be accessed from the AHU discharge plenum, or by installing a RHC 1-0027 that is equipped with the access panels on the inlet and discharge sides of the RHC 1-0027. The access sections can be wider or narrower than depicted in FIGS. 25A-25B (and as shown in all of the depictions). Coils and access panels and openings can be combined in a variety of ways as may be needed for constructability or performance issues. As shown in FIG. 25B, the configuration has a total coil section length of 42", reducing the length of the coil section by 57", or 58%.

FIG. 25B depicts one embodiment that co-locates four distinct and different heat transfer coil sections directly connected to one another, while providing access between each coil section for cleaning, observation and maintenance, and means and methods to introduce cleaning, disinfecting and flushing agents into the mid sections of each individual coil section.

In this embodiment, Coil Section #1 (1-0026) is shown as a Pre Heat Coil (PHC) that can use new or reclaimed energy to preheat the air entering the unit. Even though it is shown as a PHC, the coil can be designed for any suitable duty for the specific application. This PHC 1-0026 can function as a freeze-protection device, a heating device, or as a means to false load the cooling system compressors, so that additional heat can be reclaimed from the heat rejection side of the cooling system, and used to warm up the air, potentially as a means to lower the Relative Humidity (RH) of the air leaving the AHU and entering the spaces. It is shown as a two row coil, but can be any number of rows deep. The frame is shown as a standard four row frame, but the last two rows have not been punched for tubes, and access holes/panels/gaskets/covers have been included to allow equipment such as cleaning wands, sprayers, brushes, lights and cameras to be inserted between the two coil sections to allow observations to be conducted and maintenance to be performed. The coil frame can be any size, as long as there is adequate room for cleaning, flushing, observation and maintenance duties to be performed through openings in each side of the coil frame.

In some implementations, the co-location of the PHC 1-0026 in very close proximity to the Coil Section #2 coil (e.g., CC 1-0015) allows the PHC 1-0026 to perform freeze protection duties, even if the fan system has been shut down or has failed. Radiant heat and convection provide heat to the fluid in the CC 1-0015, and air movement will be induced through the other coil sections as well, protecting them from freezing. Upon determining that the airflow has been stopped or significantly reduced in an AHU, the control system will open the control valves on each heat transfer coil section and send notification to the heating and cooling systems to start circulating water throughout each affected AHU. The valve on the PHC 1-0026 will be commanded to 100% open, and the hot water supply temperature setpoint will be commanded to the maximum temperature. This sequence is based on the ambient conditions being below a user defined setpoint, initially set to be 40° F.

Coil Section #2 (1-0015) is shown as a cooling coil (but may include a different type of coil). It is shown as a 10 row coil, but can be any number of rows deep. The frame is shown as a standard 10 row frame. The coil frame can have access pathways as described in the 1-0026 coil description and can be any size, as long as there is adequate room for cleaning, flushing, observation and maintenance duties to be performed through openings in each side of the coil frame.

The access holes/panels/gaskets/covers are shown as being located at the end of the coil section, but they could be mounted at the front of the coil section, in the middle of the coil section, or towards the front or rear of the coil section. If the access holes/panels/gaskets/covers are located at other than the front or rear of the coil section, the heat transfer tubing or header systems must be designed to allow access for the required equipment to occur.

More than one set of access holes/panels/gaskets/covers can be installed in each coil section. In one embodiment, a heating, cooling and energy recovery system may have a 2 row PHC 1-0026, two 6 (six) row cooling coils 1-0015, 1-0015A, a six row energy recovery coil 1-0030, and a two row reheat coil 1-0027 required to meet their needs. To minimize the overall length and cost of the unit, this configuration could be assembled as one coil section if desired, with access holes/panels/gaskets/covers located between each of the individual coil sections.

In another embodiment, a twelve (12) row heat transfer coil may be required to meet the desired temperature and moisture removal duties, with a six (6) row energy recovery coil located downstream that uses the warmed up water from the CC chilled water return line to perform reheat duties. This could be built as three (3) coil sections of six (6) rows each, with access holes/panels/gaskets/covers between each of the three 6 row coils.

Coil Section #3 (1-0030) is shown as an energy recovery coil (e.g., CRC). It is shown as a 6 row coil, but can be any number of rows deep. The frame is shown as a standard 8 row frame, but the last two rows have not been punched for tubes, and access holes/panels/gaskets/covers have been included to allow equipment such as cleaning wands, lights and cameras to be inserted between the two coil sections to allow observations to be conducted and maintenance to be performed. The coil frame can be any size, as long as there is adequate room for cleaning, flushing, observation and maintenance duties to be performed through openings in each side of the coil frame. If there were not access holes/panels/gaskets/covers upstream from this coil, the frame could be a standard 10 row frame, with access holes/panels/gaskets/covers located upstream from, or in the middle of the 6 row active coil section. In this case, the energy is being recovered from the warmed up water sourced from the CC chilled water return line to perform reheat duties, but the heating energy could be provided by any source that has adequate capacity and heat quality to perform the desired functionality. The access holes/panels/gaskets/covers are shown to be square, but they can be of any size, shape and location, with as many or as few as are required to perform the necessary functionality.

Coil Section #4 (1-0027) is shown as a reheat coil. It is shown as a 4 row coil, but can be any number of rows deep. In this embodiment, the frame is shown as a standard 6 row frame, but the last two rows have not been punched for tubes, and access holes/panels/gaskets/covers have been included to allow equipment such as cleaning wands, sprayers, brushes, lights and cameras to be inserted between the two coil sections to allow observations to be conducted and maintenance to be performed. It is depicted as the last coil in the series, so, downstream access is likely to exist. If needed for the application, openings upstream and downstream of the coil cold be provided. The coil frame can be any size, as long as there is adequate room for cleaning, flushing, observation and maintenance duties to be performed through openings in each side of the coil frame. If there were not access holes/panels/gaskets/covers upstream from this coil, the frame could be a standard frame, with access holes/panels/gaskets/covers located upstream or downstream from the 2 row active coil section.

Figure 26A:
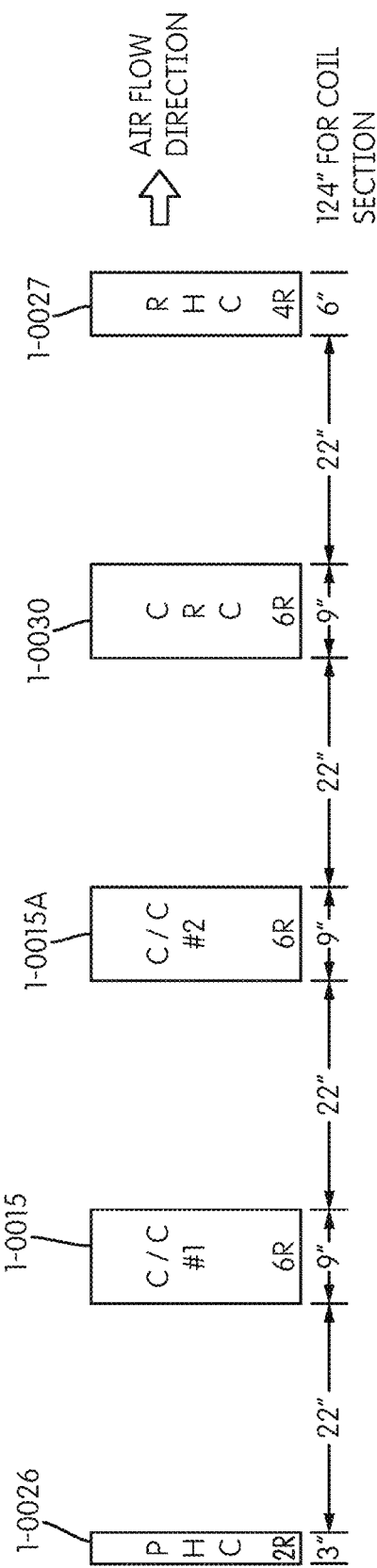
FIGS. 26A-26B illustrates depictions of an AHU coil configuration to extend the operational life of the AHU coil consistent with implementations of the current subject matter.

FIG. 26A is a depiction of an AHU coil configuration that includes a two row (2R) Pre Heat Coil (PHC) that is 3" deep, a 22" wide access bay between the coil casings, a first six row (6R) Cooling Coil (CC #1) that is 9" deep, a 22" wide access bay between the coil casings, a second six row (6R) Cooling Coil (CC #2) that is 9" deep, a 22" wide access bay between the coil casings, a six row (6R) Cooling Recovery Coil (CRC) that is 9" deep, a 22" wide access bay between the coil casings, and a four row (4R) Re-Heat Coil (RHC) that is 6" deep, and has a total coil section length of 124". Using two six (6) row cooling coils instead of a single 10 row or 12 row coil is fairly typical in hospital type environments, as it is easier to reach and clean the middle of a 6 row coil vs. being able to reach the middle of a 10 or 12 row coil.

Figure 26B:
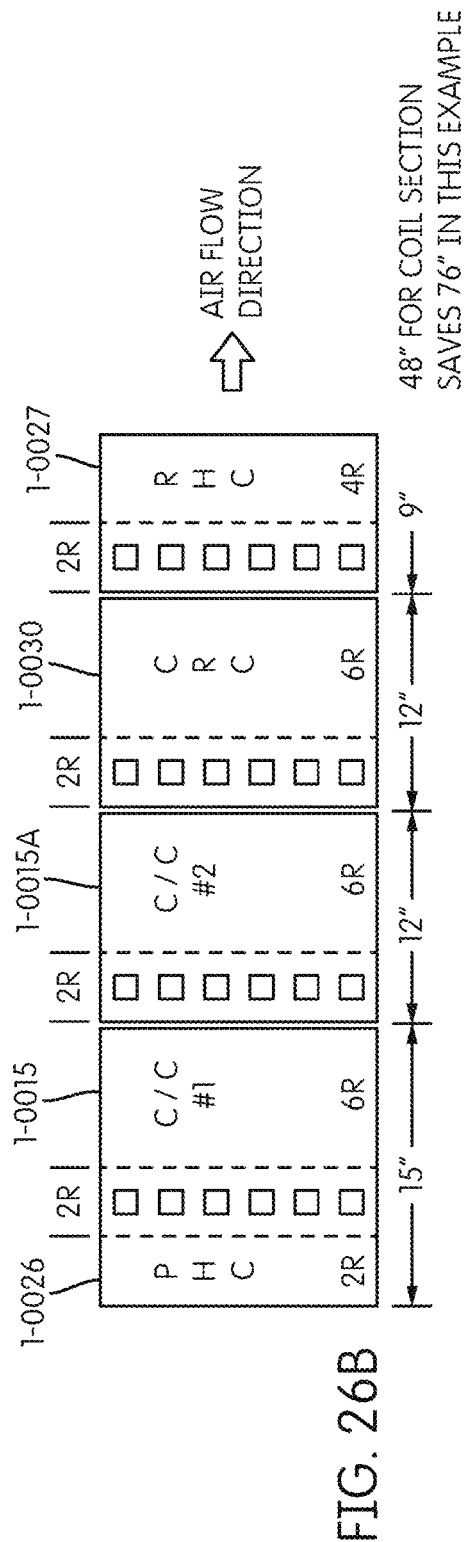

FIG. 26B is a material optimized, resource efficient, coil bank layout that still allows the front and back of each of the coil sections to be accessed and cleaned. The same heat transfer row counts are included in the CC2A configuration as are in the CC2 configuration. Variations of the 1-0026, 1-0015, 1-0030 and 1-0027 coils are included in this depiction, with added coils.

In this depiction, the PHC 1-0026 and CC #1 1-0015 are combined into one coil bank assembly that includes a two row (2R) wide access section between the two coils, with removable plates shown as squares. CC #2 1-0015A and the CRC 1-0030 coil bank assemblies includes six row (6R) coils with a two row (2R) wide access section shown at the entrance to each of the coils, with removable plates shown as squares. The RHC 1-0027 coil bank assembly includes a four row (4R) coil with a two row (2R) wide access section shown at the entrance to the coils, with removable plates shown as squares.

The access sections can be wider or narrower than depicted in the diagram, typical for all depictions. Coils and access panels and openings can be combined in a variety of ways as may be needed for constructability or performance issues.

The inlet side of the PHC 1-0026 may be available for cleaning, by removing the air filters from their frames. The downstream side of the PHC 1-0026 can be available for cleaning by opening up the access panels on the downstream side of the PHC 1-0026 coil. The inlet side of the CC #1 1-0015 is accessed from the same openings that serve the discharge side of the PHC1-0026. The downstream side of the CC #1 1-0015 is available for cleaning by opening up the access panels on the downstream side of the coil, shown as being installed on the CC #2 1-0015A inlet side in this depiction.

The inlet side of the CC #2 1-0015A is accessed from the same openings that serve the discharge side of CC #1 1-0015. The downstream side of the CC #2 1-0015A is available for cleaning by opening up the access panels on the downstream side of the coil, shown as being installed on the CRC 1-0030 inlet side in this depiction. The inlet side of the CRC 1-012 is accessed from the same openings that serve the discharge side of the CC #2 1-0015A. The downstream side of the CRC 1-0030 is available for cleaning by opening up the access panels on the downstream side of the coil, shown as being installed on the RHC 1-0027 inlet side in this depiction. The inlet side of the RHC 1-0027 is accessed from the same openings that serve the discharge side of the CRC 1-0030. The downstream side of the RHC 1-0027 can either be accessed from the AHU discharge plenum, or by installing a RHC 1-0027 that is equipped with the access panels on the inlet and discharge sides of the RHC 1-0027. The configuration shown in FIG. 26B has a total coil section length of 48", reducing the length of the coil section by 76", or 61%.

Figures 27A, 27B:
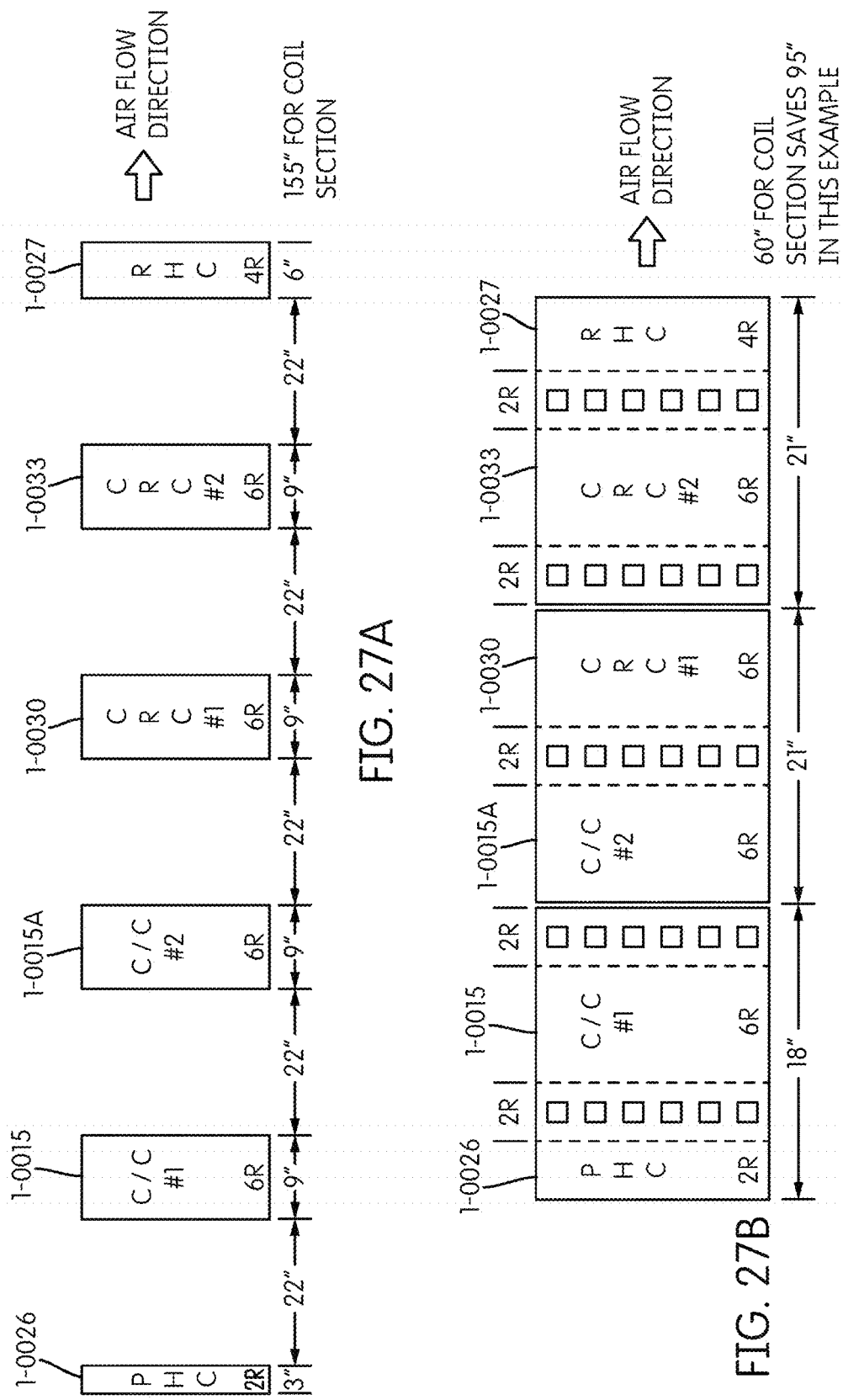
FIGS. 27A-27B illustrates depictions of an AHU coil configuration to extend the operational life of the AHU coil consistent with implementations of the current subject matter.

FIG. 27A is a depiction of an AHU coil configuration that includes a two row (2R) Pre Heat Coil (PHC) 1-0026 that is 3" deep, a 22" wide access bay between the coil casings, a first six row (6R) Cooling Coil (C/C#1) 1-0015 that is 9" deep, a 22" wide access bay between the coil casings, a second six row (6R) Cooling Coil (C/C#2) 1-0015A that is 9" deep, a 22" wide access bay between the coil casings, a first six row (6R) Cooling Recovery Coil (CRC #1) 1-0030 that is 9" deep, a 22" wide access bay between the coil casings, a second six row (6R) Cooling Recovery Coil (CRC #2) 1-0033 that is 9" deep, a 22" wide access bay between the coil casings, a four row (4R) Re-Heat Coil (RHC) 1-0027 that is 6" deep, and has a total coil section length of 155".

Using two six (6) row cooling coils instead of a single 10 row or 12 row coil, such as in hospital type environments, is easier to reach and clean the middle of a 6 row coil vs. being able to reach the middle of a 10 or 12 row coil.

FIG. 27B is a material optimized, resource efficient, coil bank layout that still allows the front and back of each of the coil sections to be accessed and cleaned. The same heat transfer row counts are included in the FIG. 27B configuration as are in the FIG. 27A configuration. Variations of the 1-0026, 1-0015, 1-0030 and 1-0027 coils are included in this depiction, with added coils.

In this depiction, the PHC 1-0026 and C/C#1 1-0015 are combined into one coil bank assembly that is equipped with a two row (2R) wide access section between the two coils, and an additional two row (2R) wide access section downstream from C/C#1, with removable plates shown as squares. C/C#2 1-0015A and the CRC #1 1-0030 are combined into one coil bank assembly that is equipped with a two row (2R) wide access section between the two coils, with removable plates shown as squares. CRC #2 1-0033 and the RHC 1-0027 are combined into one coil bank assembly that is equipped with a two row (2R) wide access section upstream from CRC #2 and an additional two row (2R) wide access section between the two coils, with removable plates shown as squares. The access sections can be wider or narrower than depicted in the diagram, typical for all depictions. Coils and access panels and openings can be combined in a variety of ways as may be needed for constructability or performance issues.

The inlet side of the PHC is available for cleaning, typically by removing the air filters from their frames. The downstream side of the PHC is available for cleaning by opening up the access panels on the downstream side of the PHC coil.

The inlet side of the C/C#1 1-0015 is accessed from the same openings that serve the discharge side of the PHC 1-0026. The downstream side of the C/C#1 1-0015 is available for cleaning by opening up the access panels on the downstream side of the coil, shown as being installed on the C/C#2 1-0015A inlet side in this depiction.

The inlet side of the C/C#2 1-0015A is accessed from the same openings that serve the discharge side of C/C#1 1-0015. The downstream side of the C/C#2 1-0015A is available for cleaning by opening up the access panels on the downstream side of the coil, shown as being installed on the CRC #1 1-0030 inlet side in this depiction.

The downstream side of the CRC #1 1-0030 is available for cleaning by opening up the access panels on the downstream side of the coil, shown as being installed on the CRC #2 1-0033 inlet side in this depiction. The inlet side of the CRC #2 1-0033 is accessed from the same openings that serve the discharge side of the CRC #1 1-0030. The downstream side of the CRC #2 1-0033 is available for cleaning by opening up the access panels on the downstream side of the CRC #2 1-0033 coil, shown as being installed on the RHC inlet side in this depiction.

The inlet side of the RHC 1-0027 is accessed from the same openings that serve the discharge side of the CRC #2 1-0033. The downstream side of the RHC 1-0027 can either be accessed from the AHU discharge plenum, or by installing a RHC 1-0027 that is equipped with the access panels on the inlet and discharge sides of the RHC 1-0027. This configuration has a total coil section length of 60", reducing the length of the coil section by 95".

Figure 28A:
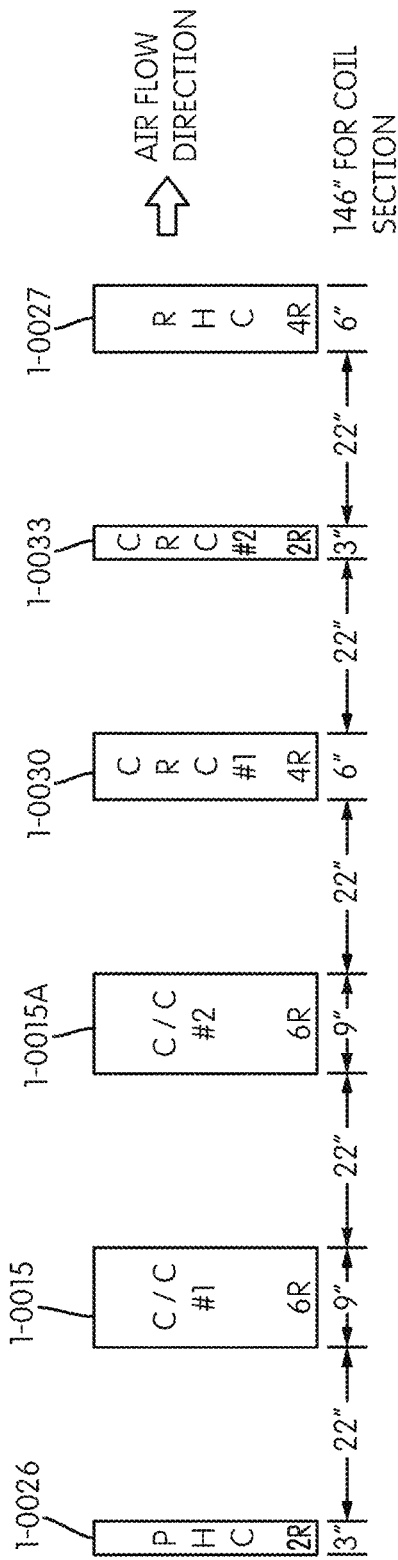
FIGS. 28A-28B illustrates depictions of an AHU coil configuration to extend the operational life of the AHU coil consistent with implementations of the current subject matter.

FIG. 28A is a depiction of an AHU coil configuration that includes a two row (2R) Pre Heat Coil (PHC) 1-0026 that is 3" deep, a 22" wide access bay between the coil casings, a first six row (6R) Cooling Coil (C/C#1) 1-0015 that is 9" deep, a 22" wide access bay between the coil casings, a second six row (6R) Cooling Coil (C/C#2) 1-0015A that is 9" deep, a 22" wide access bay between the coil casings, a first four row (4R) Cooling Recovery Coil (CRC #1) 1-0030 that is 6" deep, a 22" wide access bay between the coil casings, a second two row (2R) Cooling Recovery Coil (CRC #2) 1-0033 that is 3" deep, a 22" wide access bay between the coil casings, a four row (4R) Re-Heat Coil (RHC) 1-0027 that is 6" deep, and has a total coil section length of 146". Using two six (6) row cooling coils instead of a single 10 row or 12 row coil can be used in hospital type environments, as it is easier to reach and clean the middle of a 6 row coil vs. being able to reach the middle of a 10 or 12 row coil.

Figure 28B:
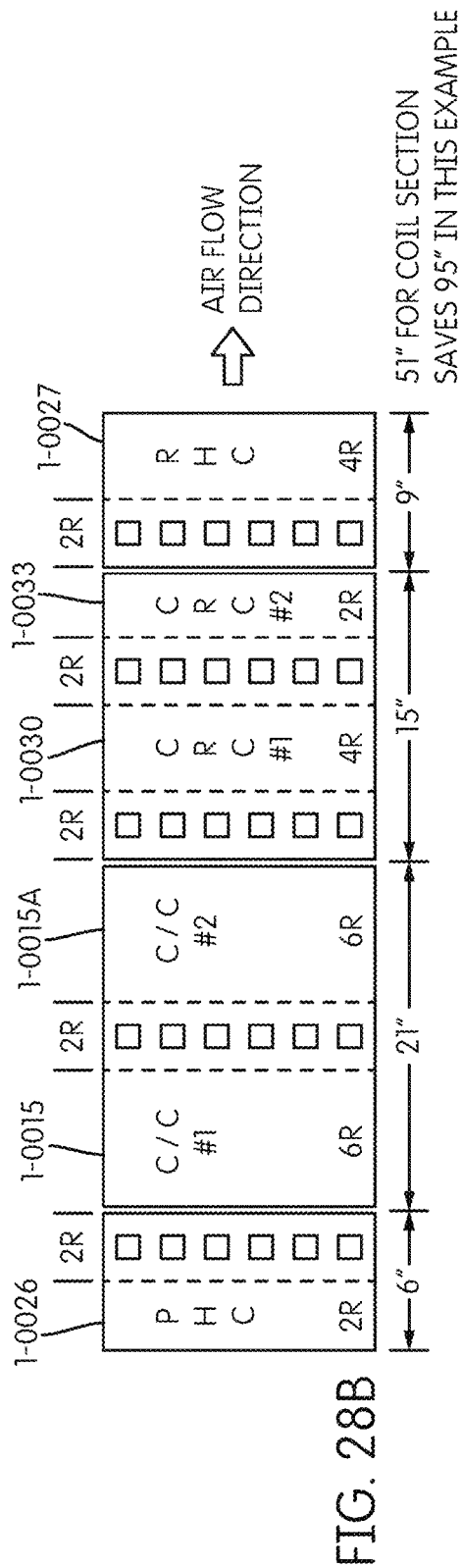

FIG. 28B is a material optimized, resource efficient, coil bank layout that still allows the front and back of each of the coil sections to be accessed and cleaned. The same heat transfer row counts are included in the FIG. 28B configuration as are in the FIG. 28A configuration. Variations of the 1-0026, 1-0015, 1-0030 and 1-0027 coils are included in this depiction, with added coils.

In this depiction, the PHC 1-0026 is equipped with a two row (2R) wide access section, with removable plates shown as squares. The access section can be wider or narrower than depicted in the diagram (and each of the other depictions)

C/C#1 1-0015 and C/C#2 1-0015A are combined into one coil bank assembly that includes a two row (2R) wide access section between the two coils, with removable plates shown as squares. CRC #1 1-0030 and the CRC #2 1-0033 are combined into one coil bank assembly that includes with a two row (2R) wide access section shown to be upstream from CRC #1 1-0030, with an additional two row (2R) wide access section between the two coils, with removable plates shown as squares. The RHC 1-0027 coil bank assembly includes a four row (4R) coil with a two row (2R) wide access section shown at the entrance to the coil, with removable plates shown as squares. The access sections can be wider or narrower than depicted in the diagram. Coils and access panels and openings can be combined in a variety of ways as may be needed for constructability or performance issues.

The inlet side of the PHC 1-0026 is available for cleaning, typically by removing the air filters from their frames. The downstream side of the PHC 1-0026 is available for cleaning by opening up the access panels on the downstream side of the PHC 1-0026 coil. The inlet side of the C/C#1 1-0015 is accessed from the same openings that serve the discharge side of the PHC 1-0026. The downstream side of the C/C#1 1-0015 is available for cleaning by opening up the access panels on the downstream side of the coil, shown as being installed between the C/C#1 1-0015 and the C/C#2 1-0015A in this depiction.

The inlet side of the C/C#2 1-0015A is accessed from the same openings that serve the discharge side of C/C#1 1-0015. The downstream side of the C/C#2 1-0015A is available for cleaning by opening up the access panels on the downstream side of the coil, shown as being installed on the CRC #1 1-0030 inlet side in this depiction. The downstream side of the CRC #1 1-0030 is available for cleaning by opening up the access panels on the downstream side of the coil, shown as being installed between the CRC #1 1-0030 and the CRC #2 1-0033 in this depiction.

The inlet side of the CRC #2 1-0033 is accessed from the same openings that serve the discharge side of the CRC #1 1-0030. The downstream side of the CRC #2 1-0033 is available for cleaning by opening up the access panels on the downstream side of the CRC #2 1-0033 coil, shown as being installed on the RHC 1-0027 inlet side in this depiction.

The inlet side of the RHC 1-0027 is accessed from the same openings that serve the discharge side of the CRC #2 1-0033. The downstream side of the RHC 1-0027 can either be accessed from the AHU discharge plenum, or by installing an RHC 1-0027 that is equipped with the access panels on the inlet and discharge sides of the RHC 1-0027. This configuration has a total coil section length of 51", reducing the length of the coil section by 95", or 65%.

Figure 29:
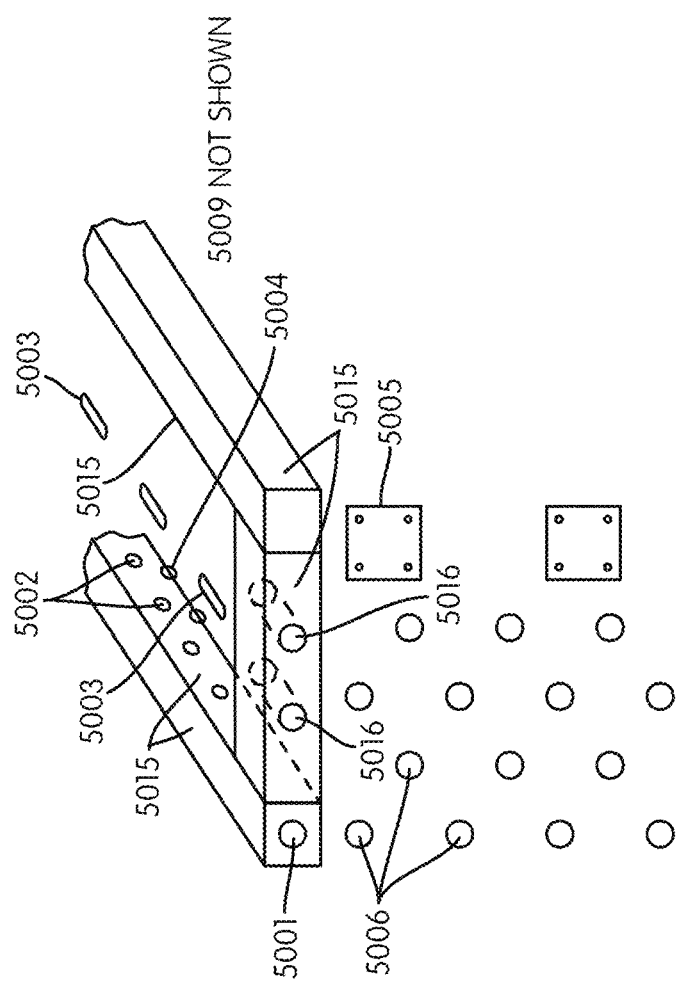
FIGS. 29-31 illustrate improved systems for distributing cleaning and flushing agents into a coil system consistent with implementations of the current subject matter.
Figure 30:
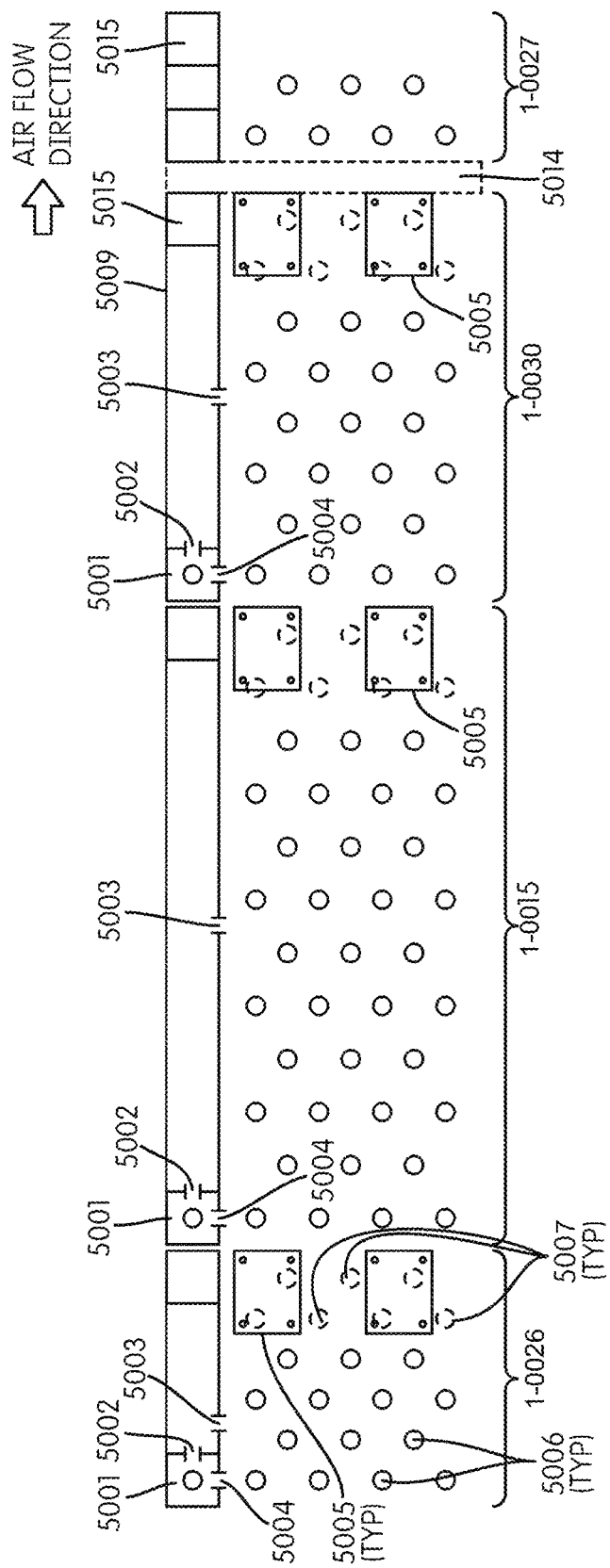
Figure 31:
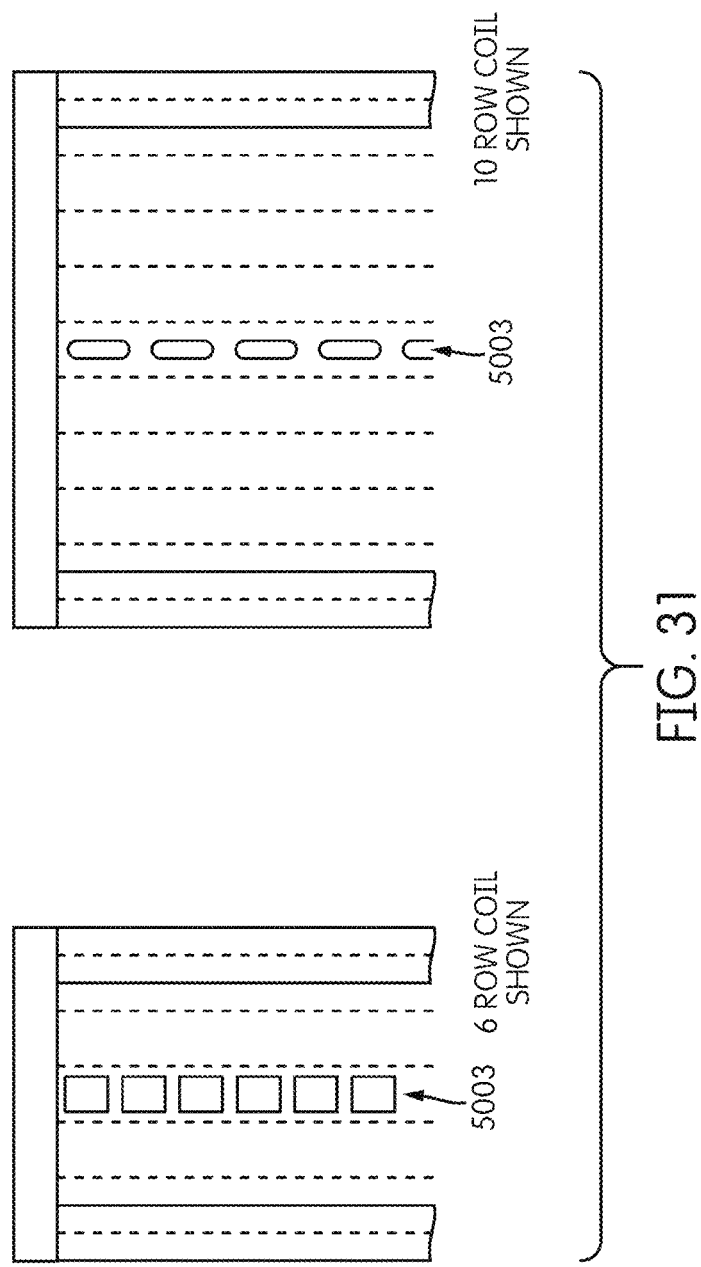
Figure 32:
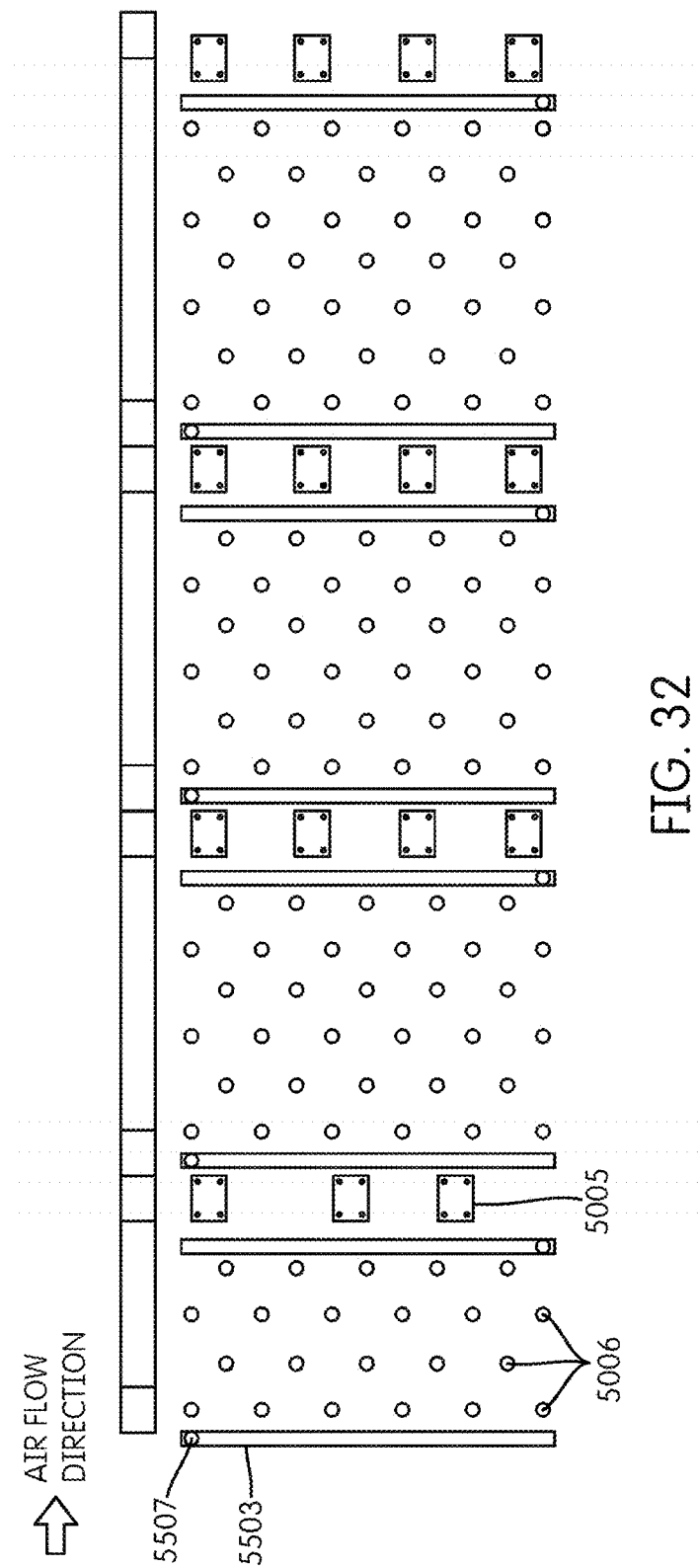
FIGS. 32-36 illustrate various coil configurations consistent with implementations of the current subject matter.
Figure 33:
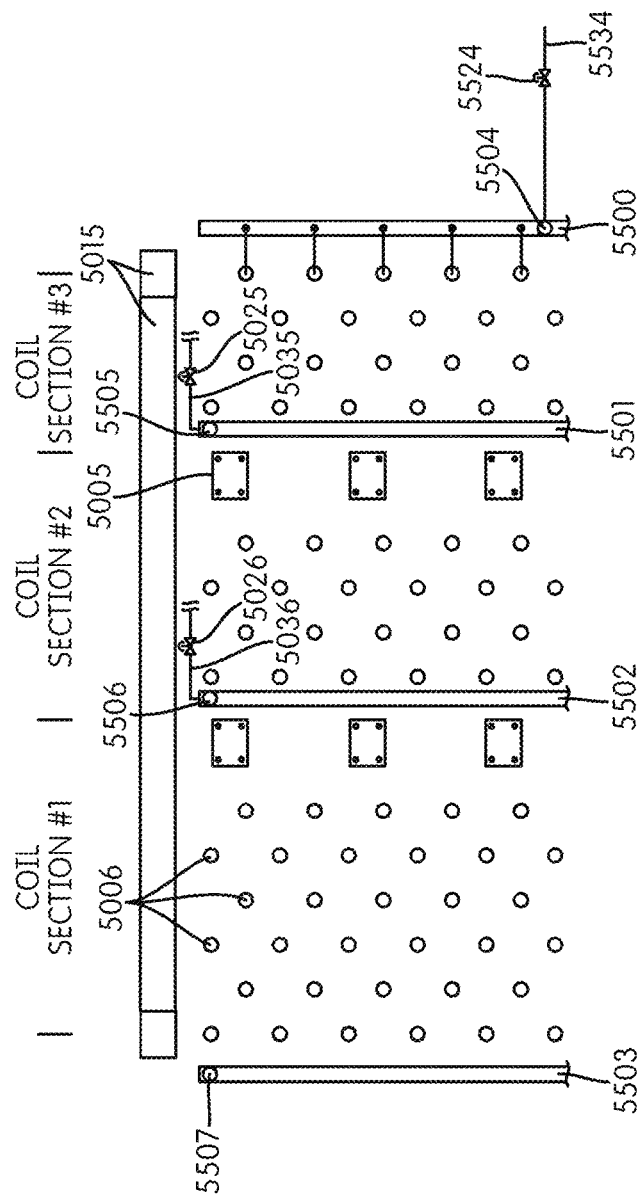
Figure 34:
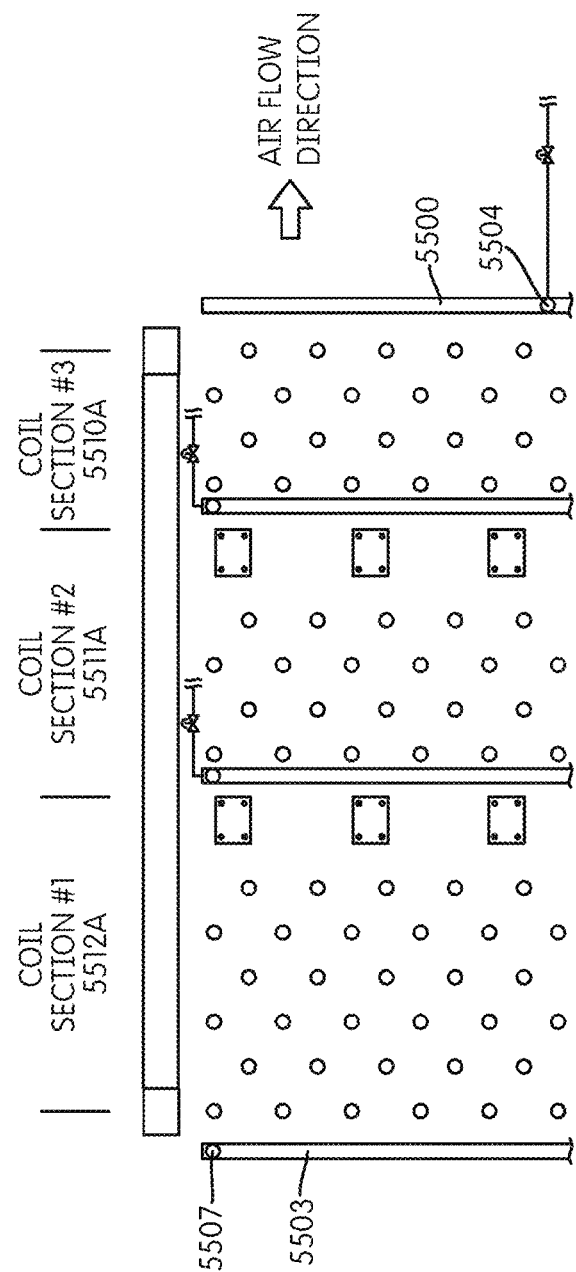
Figure 35:
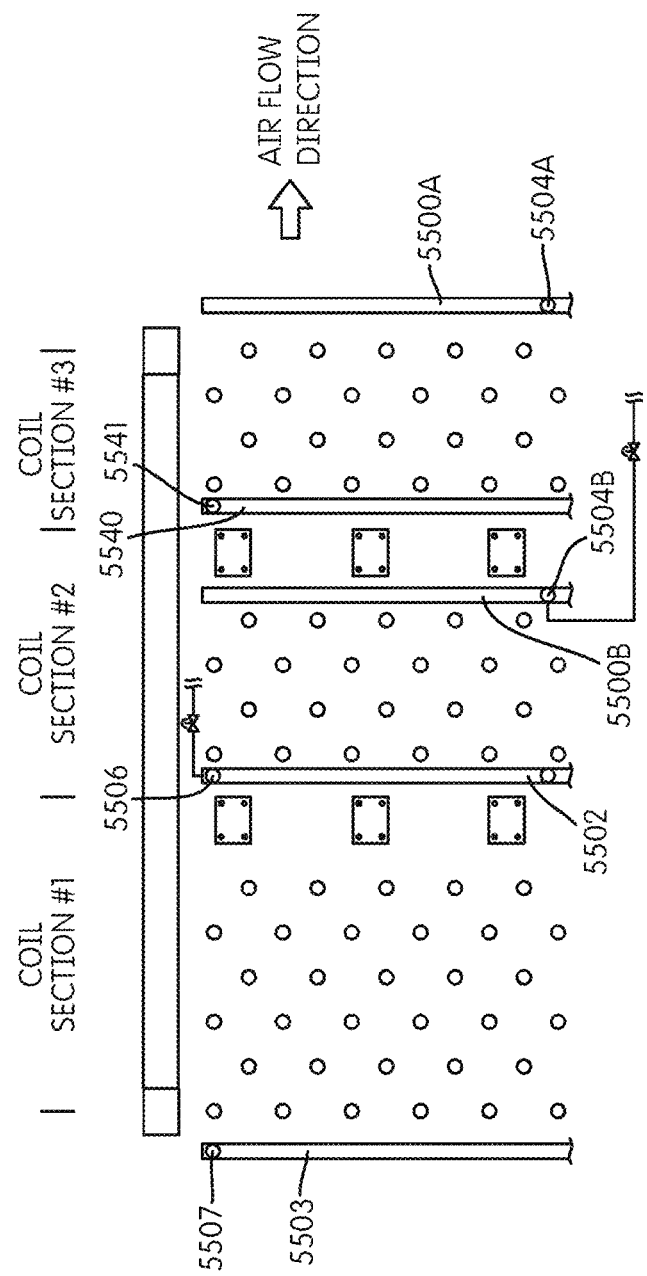
Figure 36:
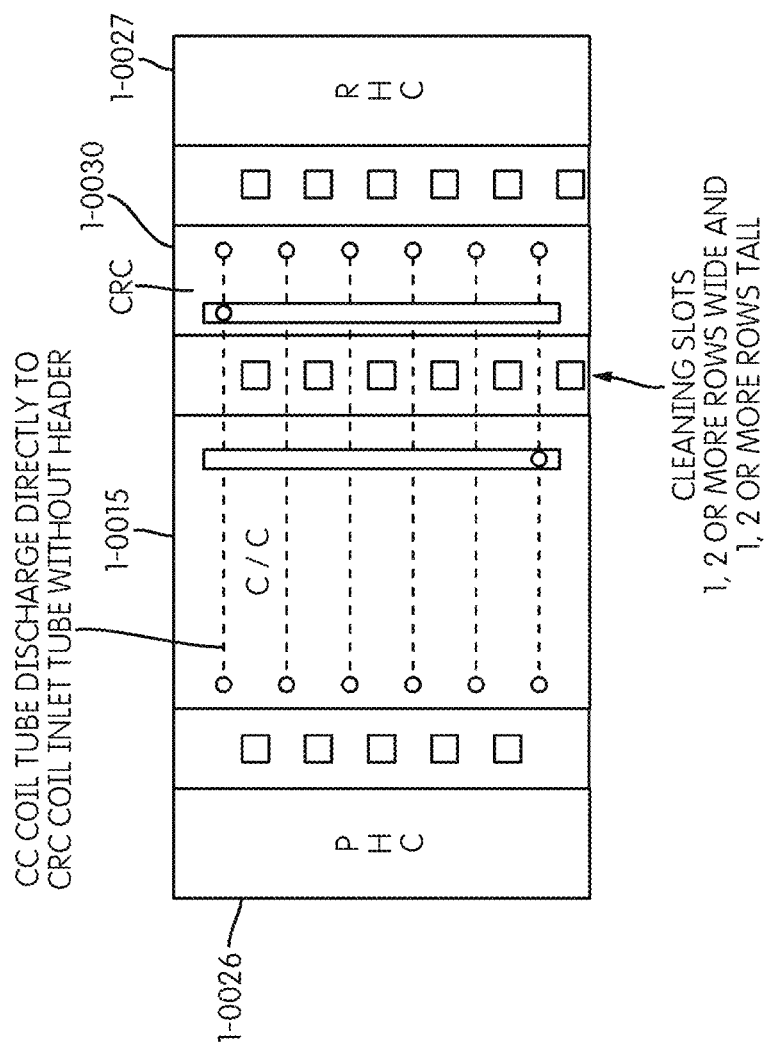

FIGS. 29-31 illustrate improved systems for distributing cleaning and flushing agents into a coil system (e.g., including any of the coils described herein, such as the PHC 1-0026, CC 1-0015, second CC 1-0015A, CRC 1-0030, second CRC 1-0033, and RHC 1-0027) consistent with implementations of the current subject matter. As shown in FIGS. 29-31, 5001 is a hose connection into the longitudinal member of the top frame. It is shown on the upstream side of the longitudinal member of the top frame, but it can be connected into the downstream member of the top frame, or the short sides of the frame as well, if interconnection holes are provided to allow fluid transfer to occur between the frame members. The hose connection can be supported within the unit, or connected to the exterior of the unit to enhance ease of use. A shut off valve or plug is provided to reduce treated air escaping from the unit when the fan is operational.

5002 are slots or holes in the coil casing/frame pointed inward towards the center of the coil. These holes are placed as needed and extend for the length of the coil casing/frame. These holes allow proper distribution of the cleaning/disinfecting/flushing agents to occur along the entire length of the coil. They may be placed low in the frame to reduce trapping any fluids inside the frame.

The term "slots or holes" is generic for openings in the coil casing or sheet metal as designed to allow cleaning/disinfecting/flushing agents to enter and be distributed throughout the heat transfer coil fin pack. The "slots or holes" can be of any shape or size and location to be used to evenly distribute fluids across the top of the finned surface area.

5003 are slots or holes in the top sheet metal that is in rough contact with the top of the heat transfer finned surface area, that allow cleaning/disinfecting/flushing agents to be spread evenly across the coil heat transfer surface area, from the top of the coil section, being gravity fed, or pressure fed from within the cavity formed by the casings/frames, and the sheet metal/aluminum etc. that is enclosing that space. Slots are positioned and sized to minimize air bypass around the heat transfer surface.

5004 are small diameter holes or slots in the bottom of the casing/frame/header as required to drain the cleaning/disinfecting/flushing agents from that space to prevent fluids being trapped within that cavity.

5005 are openings, blanks off plates, screws, attaching systems, gaskets, reinforcements, as required to be able to insert cameras, lights, cleaning and spraying tools between the coil banks or between rows of coils contained in a single coil bank, to facilitate observation, cleaning, disinfecting and maintenance of the heat transfer surface areas.

5006 are staggered heat transfer tube arrangements in heating, cooling and dehumidification heat transfer applications.

5007 illustrate locations where heat transfer tubes would be located, and are shown for reference only. In the illustrated configurations, the tubes and holes would not be located at the locations 1-5007.

5008 is a heat transfer coil section. Multiple coil sections are shown in some embodiments.

5009 is a top plate, used to enclose the area where the cleaning/disinfecting/flushing agents may be injected into the system. The top plate 5009 may be welded or otherwise fastened and sealed to allow the area to be pressurized, and to prevent air bypass or fluid leakage from this area. It is only shown in one location, but can be used for all embodiments using this methodology.

1-0026 is depicted as a PHC as described previously herein, but the heat transfer surface can be used for a variety of applications, including energy reclaimed from various sources, among others. Greater or lesser amount of rows can be used in this application and this location.

1-0015 is depicted as a CC (e.g., CC 1-0015) as described previously herein, but the heat transfer surface can be used for a variety of applications. Greater or lesser amount of rows can be used in this application and this location.

1-0030 is depicted as an energy recovery coil (ERC) or Cooling Recovery Coil (CRC), (e.g., CRC 1-0030) as described previously herein, but the heat transfer surface can be used for a variety of applications. Greater or lesser amount of rows can be used in this application and this location.

1-0027 is depicted as a RHC as described previously herein, but the heat transfer surface can be used for a variety of applications. Greater or lesser amount of rows can be used in this application and this location.

1-5014 is a sealing plate and gasketing system between the various coil banks to prevent air bypass and leakage between the various coil sections and the AHU. It is only shown in one place but may be applied as needed between all coil sections and AHU structure.

1-5015 is the coil casing/frame, typical for each coil section.

1-5016 are sealable openings where maintenance and observation equipment can be inserted.

FIGS. 32-36 illustrate various coil configurations consistent with implementations of the current subject matter. For example, FIGS. 32-36 depict variations of the easy to clean coil configurations, with the added abilities to remove or add fluid at different temperatures for different uses from the coil bank, and controlling the number of active rows to control the amount of sensible vs. latent heat being removed from, or added to the airstream. Many of the details depicted in the previous figures are omitted from these figures for clarity, but may be included in the described configurations herein.

In some applications, cool water, above the area dewpoint temperature, may need to be generated by these embodiments to serve radiant cooling systems, induction units, passive or active chilled beams, equipment or process cooling loads and other systems that need to avoid condensation at the unit, in the spaces or in the equipment/process.

In many cases, a completely separate cooling system, including low lift chillers, cooling towers, and distribution piping and pumping systems is incorporated into the facility to provide this cool water at significant added expense. Existing Cooling Coil (CC) and Air Handling Unit (AHU) designs do not provide the ability for partially warmed up water to be pulled from the cooling coil and used for other purposes, such as the uses described above. Significantly reduced equipment costs and energy use can be derived from implementation of the various embodiments.

In some embodiments of the current subject matter, control valves can be utilized to control the flow through, or eliminate the flow from individual coil sections to change the average fluid temperature within the coil, or at the coil finned heat transfer surface area by varying the amount of active heat transfer surface area to change the ratio of the sensible to latent capacity of the coil bank.

In some embodiments, control strategies for coil-based Thermal Energy Storage (TES) are incorporated to allow the cooling system to shut down, or significantly reduce the capacity being delivered from the refrigeration equipment. This can be especially effective during light load hours.

For DX based systems, refrigerant receiver thanks and refrigerant pumps may be utilized to help improve this process.

As shown in FIGS. 32-36, 5500 is a header where heat transfer fluid is either injected into, or withdrawn from a heat transfer coil system. 5501, 5502, and 5503 are also headers where heat transfer fluid is either injected into, or withdrawn from a heat transfer coil system. 5504, 5505, 5506, and 5507 are points of connection between heating or cooling systems and various heat transfer coil sections or systems. 5524, 5525, and 5526 are shown as control valve systems to control the flow of fluids into or out of the heat transfer coil sections or systems. 5534, 5535, and 5536 are shown as piping systems to allow transportation of the flow of fluids into or out of the heat transfer coil sections or systems.

Condensate Management

As noted above, common problems created by industry standard cooling coil, cooling unit, cooling systems and HVAC designs include, but are not limited to: high airside pressure drop; excessive cooling coil vertical height that creates a condensate "stacking" effect; inadequate numbers of coil rows can create a condensate stacking effect; inadequate and poorly designed cooling coil drain pans; excessive air velocity across the coil sections during deep dehumidification duties; excessive liquid water (condensate) being carried off of the coil into the unit and downstream ductwork; and condensate carry-off being re-evaporated into the airstream; condensate being carried off and re-evaporated off of the cooling coil and drain pan systems due to compressor cycling on and off; condensate being carried off and re-evaporated off of the cooling coil and drain pan systems due to temperature swings; inability to unload far enough to provide proper temperature and RH control when loads are light; energy waste, excessive water and chemical consumption; excessive energy rejection to, or withdrawal from, ground coupled HVAC systems; undersized ductwork and air distribution terminal units; and other common system design and operational problems. Implementations of condensate management systems described herein may help to solve one or more of these problems.

Generally, air conditioning cooling coils designed into most HVAC systems have been optimized to remove dry heat from the airstream, with dehumidification (moisture removal) being a byproduct of creating cold air. When a cooling coil cools air down below the "dewpoint" of the air, water vapor condenses on the cooling coil and forms what is called "condensate". With existing coil designs being optimized for dry heat removal, not moisture removal, a significant problem is created. In many cases, condensate can be generated by a cooling coil faster than the condensate can be drained out of the coil, due to the coil and heat transfer fin designs. Unfortunately, the condensate that remains in the cooling coil can significantly impede the heat transfer process. For example, condensate may not be removed from the coil heat transfer fins for much of the height of the coils, creating a condition called condensate stacking. When condensate stacking occurs, a significant portion of the cooling coil heat transfer finned surface area is filled with condensate. This can reduce the airflow, or completely stop the airflow through that section of the coil. When this occurs, significant other problems, such as chiller plant "Low Delta T Syndrome" and condensate being blown off the coil into the AHU and downstream ductwork can occur, wasting energy and creating conditions that can promote biological growth and systems/equipment corrosion, with all of the attendant problems.

Note that these condensate management heat transfer coil designs are independent of the fluid or vapor contained within the coil tubing and flowing over and around the coil tubing and heat transfer fin systems. It should also be noted that the condensate management fin variations described herein can be combined in various ways. For example, the configuration shown in FIG. 40 (e.g., dimpling), FIG. 41 (e.g., channeling), FIG. 42 (e.g., shaped fin extensions), FIG. 45 (e.g., variable length fin extensions), and FIG. 64 (e.g., condensate recovery system) can all be combined into one heat transfer system to rapidly remove condensate from a coil and promote more effective heat transfer between the coil and the airstream or other media passing over the heat transfer surface area. Note that variations of the type of fan and location of the fan are included, but not shown. Note that for all variations that show pre-heat coils (PHCs), Cooling Recovery Coils (CRCs), or reheat coils, (RHCs), pre-heat coils (PHCs), Cooling Recovery Coils (CRCs), or reheat coils may not actually be required by the process or end use needs, and for variations that do not show pre-heat coils (PHCs), Cooling Recovery Coils (CRCs), or reheat coils, they may actually be required by the process or end use need.

The various designs that include horizontal and angled coil arrangements, or enhanced fin arrangements that drop the condensate off of the coils and fins into the supply airstream have the benefit of being designed specifically for additional dehumidification and additional energy recovery. The condensate leaving the heat transfer finned surfaces can be very close to the temperature of the heat transfer finned surfaces, which can be several degrees below the air temperature leaving the cooling coil (C/C). This is especially true when the enhanced and extended finned surfaces are present. Normally, without the use of some form of energy recovery from the condensate system, this very cold water is sent down the drain, carrying with it a significant amount of cooling energy. With these condensate management designs, the very cold water droplets in the airstream are in contact with the supply air for a period of time, during their decent through the supply airstream and added time while the water is in the drain pans, flowing towards the condensate drain, on the path out of the AHU. Since the condensate droplets are at a lower temperature than the dewpoint temperature of the air, the water droplets actually condense more moisture out of the supply airstream, further drying the air out. Energy is transferred out of the airstream into the condensate, so less BTU's are sent out of the AHU in the form of cold condensate.

FIGS. 37-50 illustrate various coil fin configurations consistent with implementations of the current subject matter, that may be implemented in any of the coil configurations described herein (e.g., the PHC 1-0026, the CC 1-0015, the second CC 1-0015A, the CRC 1-0030, the second CRC 1-0033, and the RHC 1-0027, etc.).

Figure 37:
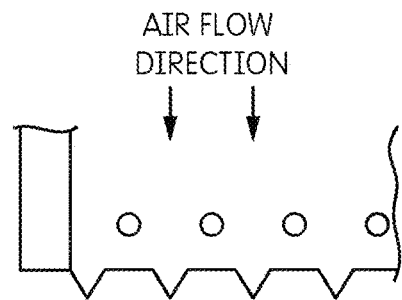
FIGS. 37-50 illustrate various coil fin configurations consistent with implementations of the current subject matter.

FIG. 37 illustrates horizontal cooling coil fins having flat bottom edges, which makes it more difficult for condensate being generated by the cooling coil system to gain enough mass to form a drip, and to drain from the heat transfer surface area. Draining condensate from the coil fins enhances the heat transfer ability. FIG. 37 depicts one form of a coil fin designed specifically to focus the condensate into a point, which will allow the coil to drain more rapidly and effectively. A triangle shape, located between the coil tubes is shown. A rounded fin extension, as opposed to a triangular fin extension, could be used as well, to reduce the potential for the tip to be broken or bent easily. Other shapes, sizes and locations may be utilized for the fin extensions as well.

Figure 38:
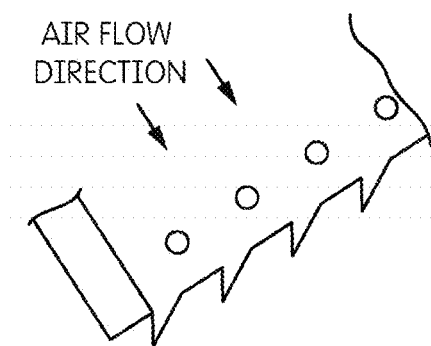

As shown in FIG. 38, many cooling coils are installed in a position that is neither horizontal, nor vertical. As with the horizontally mounted coils, these coils typically have flat edges, with no focal point for the condensate. This makes it more difficult for condensate being generated by the cooling coil system to gain enough mass to form a drip, and to drain from the heat transfer surface area. Draining condensate from the coil fins enhances the heat transfer ability. FIG. 38 depicts one form of a coil fin designed specifically to focus the condensate into a point, which will allow the coil to drain more rapidly and effectively. A triangle shape, located between the coil tubes is shown. This depiction shows the point of the fin extension pointed directly down. Other shapes, such as the shape depicted in FIG. 37, sizes and locations may be utilized for the fin extensions as well.

Figure 39:
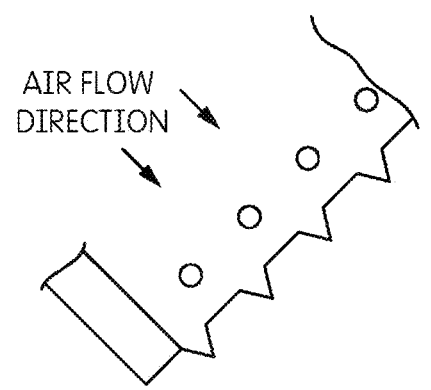

FIG. 39 is another variation of FIG. 37, with the coil depicted as being installed in a non-horizontal fashion.

Figure 40:
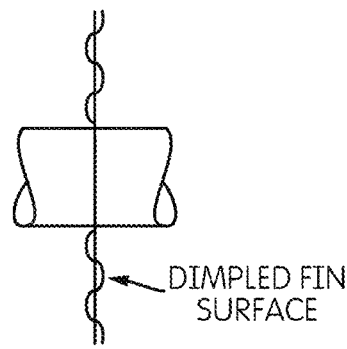

FIG. 40 depicts the finned surface, as well as the extended fin surfaces, as having dimpled surfaces, along the lines of a golf ball. Dimpled surfaces reduce air pressure drop, and increase heat transfer effectiveness as well. FIG. 40 can be applied to any of the coil configurations described herein.

Figure 41:
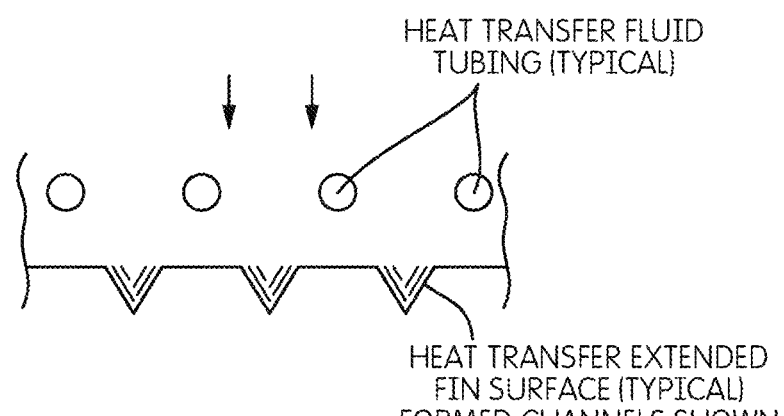

FIG. 41 shows a version of FIGS. 37-47, 49, and 50 with the extended surface having channels (e.g., slight indentations), which guide the condensate to the tip of the extended fin surface for more rapid condensate removal. For the FIG. 38 variant, or other non-horizontal versions, the channels would be configured differently, with the channels configured in a manner that guides the condensate to the tip, or other drip-point, of the extended fin surfaces. This configuration can also be utilized in coils that do not have the extended fin surface, the channels would focus the condensate in a manner that promotes more rapid condensate removal.

Figure 42:
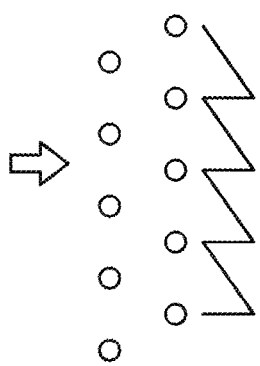

FIG. 42 shows a variation of the extended fin surface area for a coil with airflow moving in a horizontal, or near horizontal direction. In this variation, there are significant fin extensions shown. The condensate will tend to drip from the higher fin extensions to the lower fin extensions, rather than be trapped in the main body of the coil, where it will impede heat transfer. As with the other variations, FIG. 42 can be built with dimpled, or channeled, or both, fin enhancements.

Figure 43:
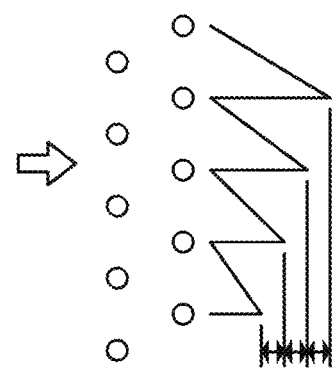

FIG. 43 is a variation of FIG. 42. This variation includes longer fin extensions on the upper coil rows than on the lower coil rows. In this variation, rather than the condensate from the upper row fin extensions dripping onto the lower row fin extensions, the upper row fin extensions are slightly longer than the lower fin extensions, such that condensate that drips off of the upper fin extensions does not come in contact with the lower fin extensions, promoting more rapid condensate removal, and thus more active and effective heat transfer surface area.

This same effect can be obtained by installing one of the other coil configuration variations in a slightly off of vertical orientation, with the angle of the coil being such that condensate dripping from the upper rows extended fin surface will not hit the fin extensions on the lower rows, so condensate will be removed from the heat transfer surface area more rapidly, again promoting more active and effective heat transfer surface area.

Figures 44, 45:
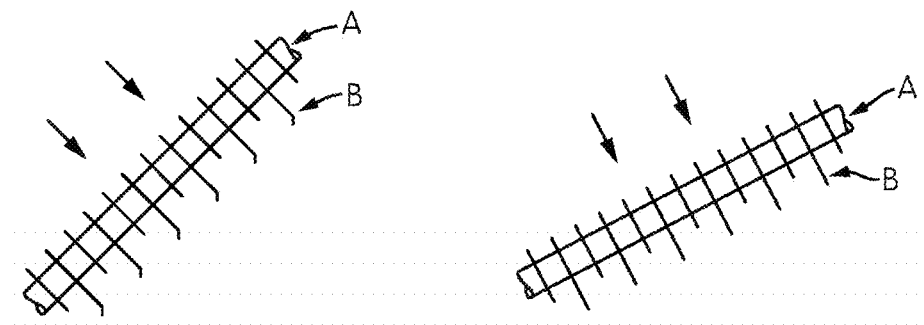

In FIG. 44, every other fin is extended slightly longer than the fin on either side of it. The slightly longer length is adequate to reduce the air pressure drop associated with this design. The extended fin surface is equipped with an angle that would tend to accumulate condensate and form it into a "river" flowing down the "inside" of the angle. Water is attracted to water, so this continually flowing stream of condensate will tend to attract condensate from the fin directly adjacent to it, on the inside of the angle. Condensate from the one side of the fin adjacent to the extended surface fin will tend to be attracted to the longer fin as well, on the "outside" of the angle, as there may be condensate bridging between the fin surfaces.

FIG. 45 is a variation of FIG. 44 that does not have the angle built into the longer extended fin surface. The function is similar, in that the condensate will tend to accumulate on both sides of the extended fin surface between the two shorter length fin surfaces. Condensate will drain more rapidly from a coil, when it is concentrated and is not "sandwiched" between two fins. The condensate will tend to leave the shorter fins, and be attracted to the longer fins, and be pushed by the air flowing through the coil to the "downwind" side of the longer heat transfer fin, out and away from the body of the coil, enhancing the heat transfer coil effectiveness.

Figure 46:
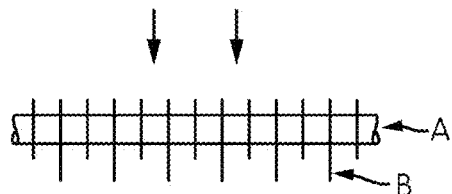

FIG. 46 is a variation of FIG. 45, with the coil mounted horizontally. The horizontal nature of the fins enhances the drainage from the extended fin surfaces.

Figure 47:
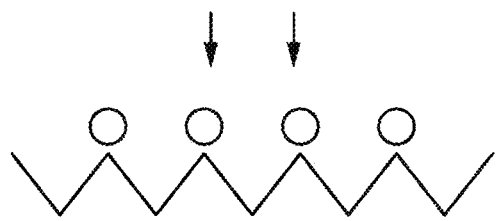

FIG. 47 is a variation of FIG. 37 and FIG. 42. The configuration in FIG. 47 is depicted with a horizontal coil configuration, but vertical and slanted coil orientations will function in a similar manner. With this variation, there are no "flat spots" on the extended fin surfaces—the entire leaving edge of the heat transfer fin is a shaped fin. With this variation, the shortest length of the extended fin is located closest to the heat transfer tubing, where the air velocity is the lowest. Because the air velocity is greatest between the tube-rows, the longest part of the extended fin surface will be exposed to the highest velocity air, so the air contact time across the shaped fin surface will tend to be equalized, enhancing heat transfer effectiveness.

Figure 48:
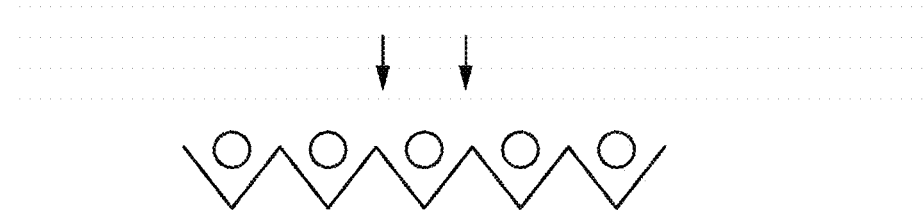

FIG. 48 is a variation of FIG. 47. FIG. 48 shows a different fin orientation that may be required to optimize condensate management for different coil orientations (vertical, sloped, horizontal) and different air velocities and entering and leaving conditions. When air velocities are low, the low pressure area on the leaving side of the heat transfer tubing will tend to draw condensate into that low pressure zone. On low air velocity coils, the shortest length of the extended fin may be located somewhere between the coils in order to take advantage of this nature. The installation angle of the coils may contribute to determining where the "short" length of the extended fin will be located.

Figure 49:
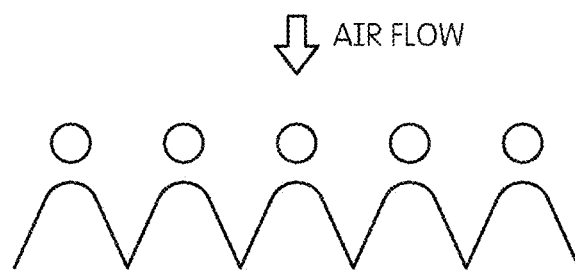

FIG. 49 is a variation of the extended fin surface shape, shown for reference. In the diagram, it is depicted as having vertically down airflow, although the coil orientation can be vertical, or any angle in between as well. There are a multitude of extended fin surface shapes that can be utilized effectively, that will depend on fluid velocities and fluid characteristics flowing across and through the coil, and the desired leaving fluid conditions, as well as the characteristics of the fluids contained within the heat transfer tubing.

Figure 50:
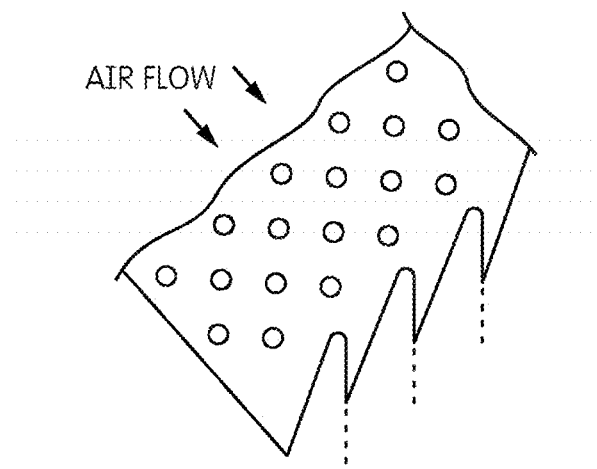

FIG. 50 is similar to FIG. 49 and shows a variation of the extended fin surface, with the coil shown being installed at an angle.

FIGS. 51-64 illustrate various condensate management air handling unit configurations consistent with implementations of the current subject matter, the can be implemented with any of the components of the AHUs described herein (e.g., the PHC 1-0026, the CC 1-0015, the second CC 1-0015A the CRC 1-0030, the second CRC 1-0033, and the RHC 1-0027, etc.).

Figure 51:
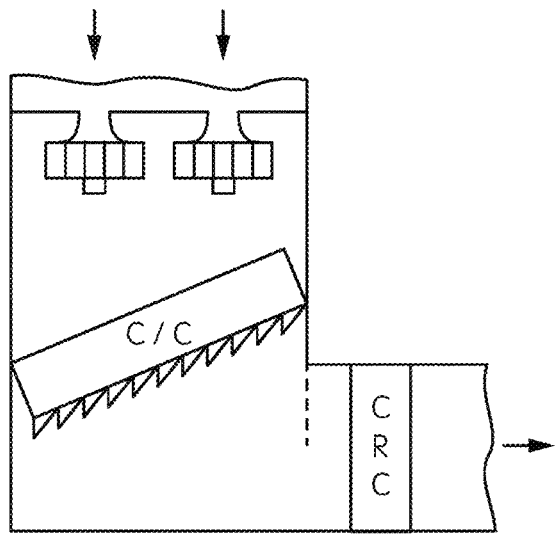
FIGS. 51-64 illustrate various condensate management air handling unit configurations consistent with implementations of the current subject matter.

FIG. 51 is one depiction of a condensate management designed Air Handling Unit (AHU) equipped with a "Cooling Recovery Coil" (CRC) 1-0030. The AHU may include pre- and post-AHU air filtration systems 1-0100, pre-heat coils 1-0026, reheat coils 1-0027, humidification systems, UGVI 1-0031, PCO 1-0032, mist eliminators, drain pans and the like, which are not shown for clarity. This condensate management AHU is shown with a pair of variable speed ECM driven plug fans pushing a constant or variable volume of air through a cooling coil (e.g., CC 1-0015 as described herein), with the cooling coil shown to be equipped with extended heat transfer fins for enhanced condensate management. The cooling coil can be a large, low air velocity coil as needed to meet the needs of the end use and also provide adequate heat quality (a high enough chilled water return temperature) in the chilled water return stream leaving the cooling coil to meet the needs of the CRC (e.g., CRC 1-0030 as described herein) for the control of relative humidity and temperature in the conditioned spaces or process loads. In this depiction, the Cooling Coil (C/C) is shown to be installed at an angle, to reduce the overall size of the AHU, and the CRC is shown as a smaller cross sectional coil, with higher air velocities to reduce AHU construction costs and mesh with potential space restrictions that may be present.

Figure 52:
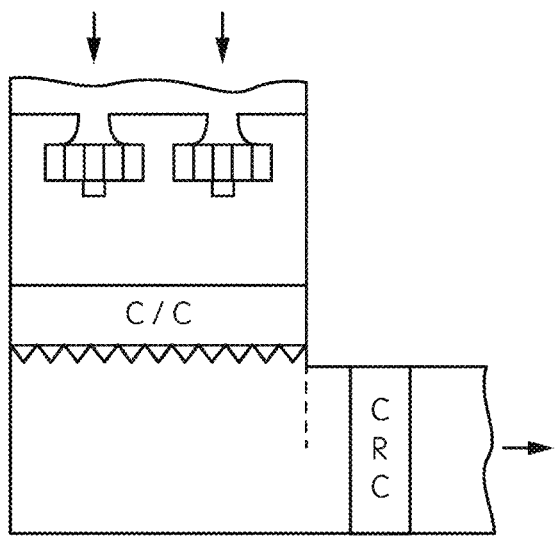

FIG. 52 is a variation of FIG. 51, shown with the C/C mounted in a horizontal fashion with the air blowing vertically downward through the cooling coil, for maximum condensate removal effectiveness.

Figure 53:
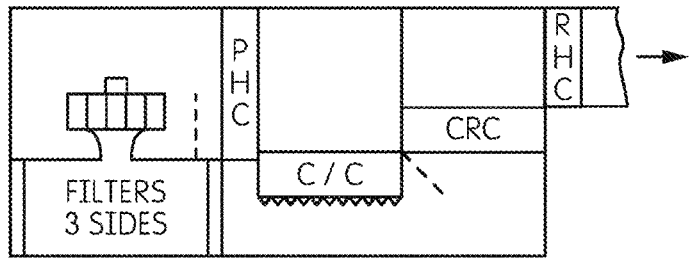

FIG. 53 illustrates a horizontally configured, compact, condensate management, CRC-based AHU. The configuration in FIG. 53 is shown with air filters that pull air from three sides of the AHU to keep the air filter air velocities low, and lowering the vertical height of the AHU. The ECM plug fan(s) is (are) pressurizing a plenum, and a velocity killing perforated plate is shown between the fan wheel and the PHC—preheat coil. The PHC discharges into a plenum, where a horizontally mounted condensate management C/C is located. Air from the C/C discharge plenum enters a CRC, where the air is reheated using reclaimed chilled water return line energy. The CRC discharge plenum sends air into the system where a reheat coil or coils may be located for final conditioning of the air, as may be required.

Figure 54:
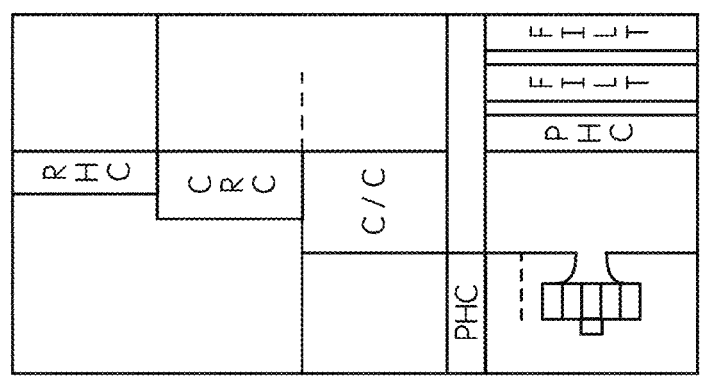

FIG. 54 is one version of a vertically configured, compact, condensate management, CRC-based AHU. The configuration of FIG. 54 is shown with two different sets of air filters in series with one another, and a PHC shown in two potential locations, one, just after the filters, one downstream from the plug fan(s). The ECM plug fan(s) is (are) pressurizing a plenum, and a velocity killing perforated plate is shown between the fan wheel and the PHC—preheat coil alternate location. The PHC discharges into a plenum, where a vertically mounted condensate management C/C is located. Air from the C/C discharge plenum enters a CRC, where the air is reheated using reclaimed chilled water return line energy. The CRC discharge plenum sends air into the system where a reheat coil or coils may be located for final conditioning of the air, as may be required.

Figure 55:
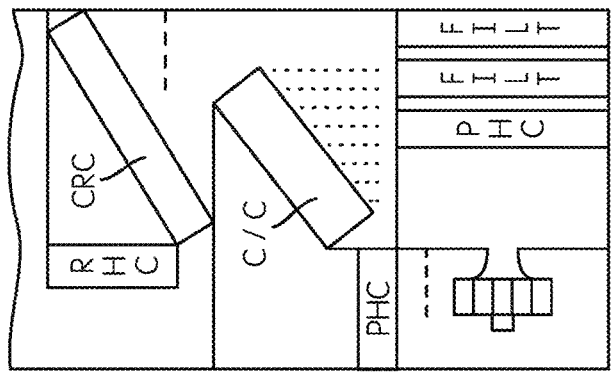

FIG. 55 is one variation of a vertically configured, compact, condensate management, CRC-based AHU, consistent with implementations of the current subject matter. The configuration of FIG. 55 is shown with two different sets of air filters in series with one another, and a PHC shown in two potential locations, one, just after the filters, one downstream from the plug fan(s). The ECM plug fan(s) is (are) pressurizing a plenum, and a velocity killing perforated plate is shown between the fan wheel and the PHC—preheat coil alternate location. The PHC discharges into a plenum, which is feeding air into an angle-mounted condensate management C/C. The condensate management C/C is configured in such a manner that the coil is still a blow through coil, with the leaving air side of the coil at the lower elevations and the various forms of condensate management fin designs can enhance condensate removal from the C/C. Air from the C/C discharge plenum enters a velocity reducing (or eliminating) perforated plate that is shown to help equalize the air flow through an angle-mounted CRC, where the air is reheated using reclaimed chilled water return line energy. The CRC discharge plenum sends air into the system where a reheat coil or coils may be located for final conditioning of the air, as may be required.

Figure 56:
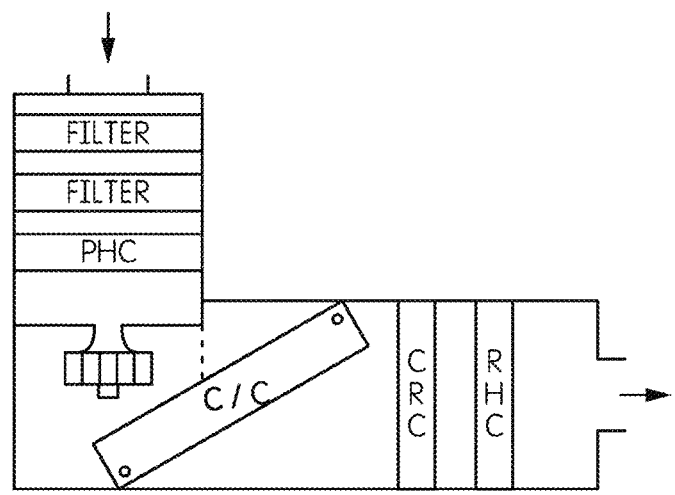

FIG. 56 is a variation of a compact, condensate management, CRC-based AHU. The configuration of FIG. 56 is shown with two different sets of air filters in series with one another, and a PHC shown upstream from the fan inlet. The ECM plug fan(s) is (are) pressurizing a plenum, and a velocity killing perforated plate is shown between the fan wheel and an angle-mounted condensate management C/C. The condensate management C/C is configured in such a manner that the coil is still a blow through coil, with the leaving air side of the coil at the lower elevation and the various forms of condensate management fin designs can enhance condensate removal from the C/C. Air from the C/C discharge plenum enters a vertically oriented CRC (could be an angle-mounted CRC to further reduce the AHU profile) where the air is reheated using reclaimed chilled water return line energy. The CRC discharge plenum sends air into the system where a reheat coil or coils may be located for final conditioning of the air, as may be required.

Figure 57:
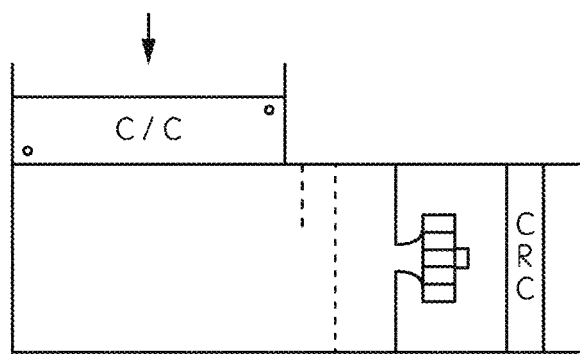

FIG. 57 shows a draw through variation of the condensate management AHU, where the fan is pulling (or "drawing") air through the C/C. The configuration of FIG. 57 is depicted without most of the various accessories associated with AHU's for clarity. The condensate management C/C is shown as a horizontal coil in this depiction, but it can be angled or vertical as well. In this depiction, the C/C discharges air vertically down into the suction plenum of the fan systems. There is a velocity killing perforated plate is shown between the C/C and the mist eliminator and the inlet to the fan wheel(s). There may be significant condensate "raining" down into the fan suction plenum, so mist eliminators are shown in the fan suction plenum. The fan is depicted discharging into a fan discharge plenum, which is also the CRC inlet plenum. Air from the fan discharge plenum enters a vertically oriented CRC (could be an angle-mounted CRC to further reduce the AHU profile) where the air is reheated using reclaimed chilled water return line energy.

Figure 58:
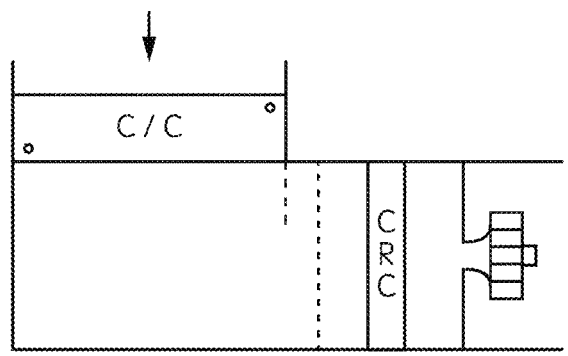

FIG. 58 is a variation of FIG. 57, in which the vertical CRC is mounted downstream from the velocity killing perforated plate and the mist eliminator, and upstream from the fan inlet plenum. The CRC could be angle-mounted to further reduce the AHU profile.

Figure 59:
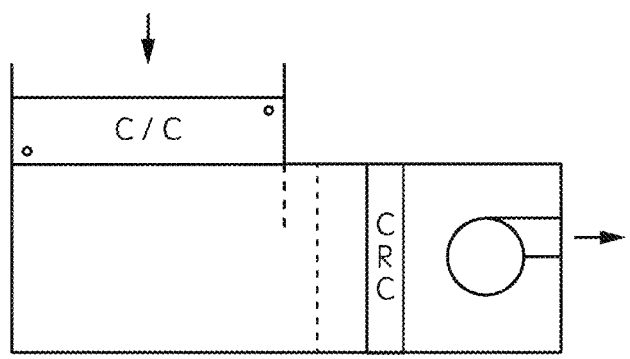

FIG. 59 is a variation of FIG. 58, in which a different fan type is being depicted.

Figure 60:
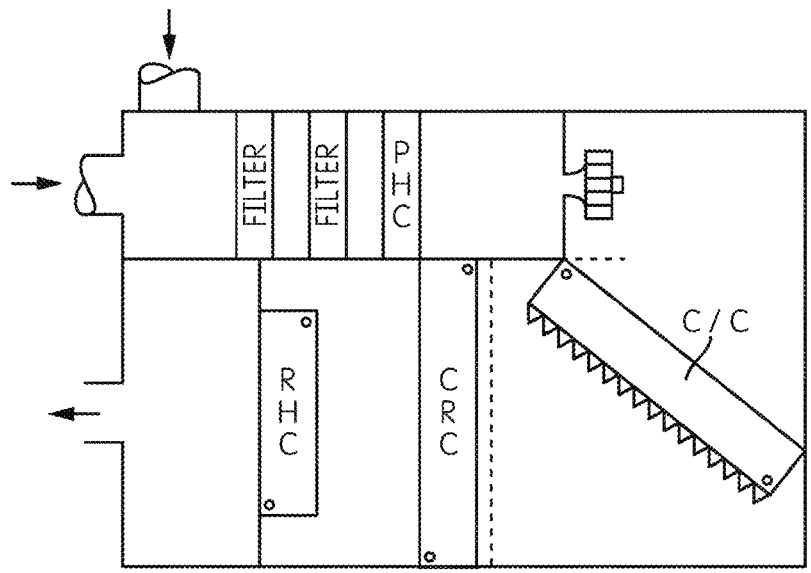

FIG. 60 illustrates a compact, condensate management, CRC-based AHU. The configuration of FIG. 60 is shown with two different sets of air filters in series with one another, and a PHC shown upstream from the fan inlet. The ECM plug fan(s) is (are) pressurizing a plenum, and a velocity killing perforated plate is shown between the fan wheel and an angle-mounted condensate management C/C. The condensate management C/C is configured in such a manner that the coil is still a blow through coil, with the leaving air side of the coil at the lower elevation and the various forms of condensate management fin designs can enhance condensate removal from the C/C. A mist eliminator is shown between the C/C and the CRC, this may or may not be required. Air from the C/C discharge plenum enters a vertically oriented CRC (could be an angle-mounted CRC to further reduce the AHU profile) where the air is reheated using reclaimed chilled water return line energy. The CRC discharge plenum sends air into a RHC or into the system where a reheat coil or coils may be located for final conditioning of the air.

Figure 61:
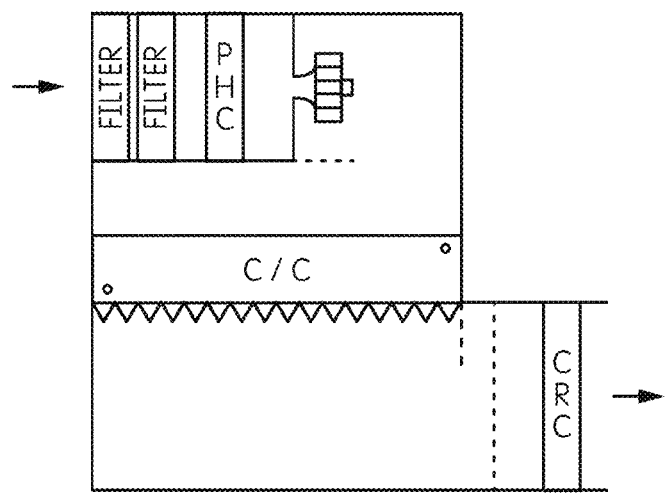

FIG. 61 is another variation of a compact, condensate management, CRC-based AHU. The configuration of FIG. 61 is shown with two different sets of air filters in series with one another, and a PHC shown upstream from the fan inlet. The ECM plug fan(s) is (are) pressurizing a plenum, which is feeding a horizontally-mounted condensate management C/C. The condensate management C/C is configured in such a manner that the coil is still a blow through coil, with the leaving air side of the coil at the lower elevation and the various forms of condensate management fin designs can enhance condensate removal from the C/C. A velocity killing perforated plate is shown between the C/C and a mist eliminator, which is also shown between the C/C and the CRC, this may or may not be required. Air from the C/C discharge plenum enters a vertically oriented CRC (could be an angle-mounted CRC to further reduce the AHU profile) where the air is reheated using reclaimed chilled water return line energy. The CRC discharge plenum sends air into the system where a reheat coil or coils may be located for final conditioning of the air as may be required.

Figure 62:
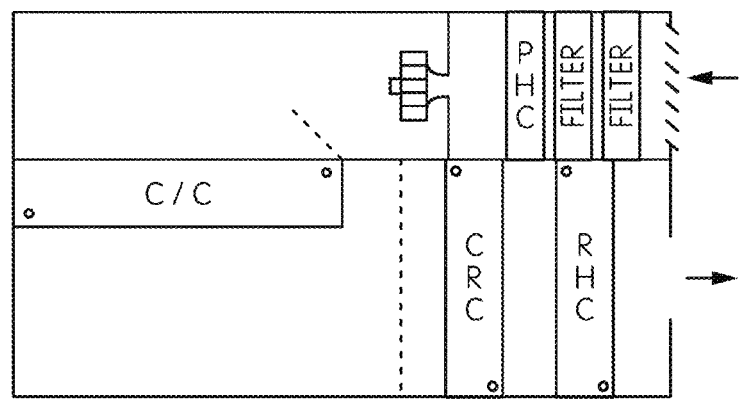

FIG. 62 illustrates another version of a compact, condensate management, CRC-based AHU. It is shown with two different sets of air filters in series with one another, and a PHC shown upstream from the fan inlet. The ECM plug fan(s) is (are) pressurizing a plenum, which is feeding a horizontally-mounted condensate management C/C. A velocity killing perforated plate is shown between the fan discharge and the condensate management C/C. The condensate management C/C is configured in such a manner that the coil is still a blow through coil, with the leaving air side of the coil at the lower elevation and the various forms of condensate management fin designs can enhance condensate removal from the C/C. A velocity killing perforated plate is shown between the condensate management C/C and the mist eliminator that is also shown between the C/C and the CRC, this may or may not be required. Air from the C/C discharge plenum enters a vertically oriented CRC (could be an angle-mounted CRC to further reduce the AHU profile) where the air is reheated using reclaimed chilled water return line energy. The CRC discharge plenum sends air into the system where a reheat coil or coils may be located for final conditioning of the air as may be required.

Figure 63:
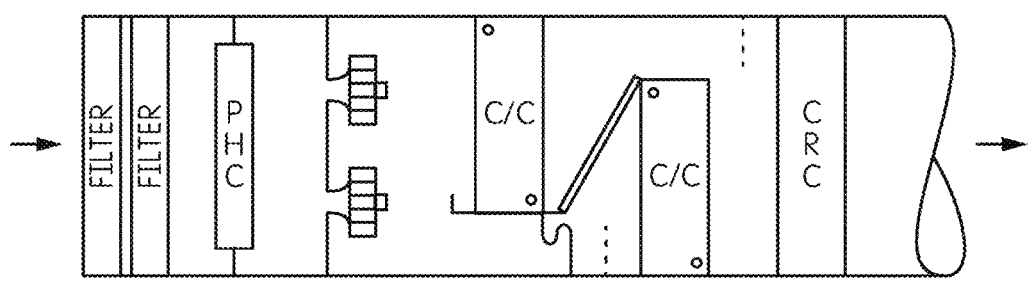

FIG. 63 is a variation of a horizontally oriented, low vertical height condensate management, CRC-based AHU. The configuration of FIG. 63 is shown with two different sets of air filters in series with one another, and a PHC shown upstream from the fan inlets. The ECM plug fan(s) is (are) pressurizing a plenum, which is feeding a pair of vertically-mounted condensate management C/Cs, in a staggered arrangement. The support structure for the upper coil bank is not shown for clarity. The staggered C/C's can each be 50% to approximately 80% of the clear vertical height within the AHU cabinet. Some implementations can be as high as two (2) 90% tall coil heights, providing an effective 180% height C/C. Velocity reducing perforated plates are not shown, but may be used to equalize the air flow rates through the two coil banks, or to reduce or eliminate high velocity regions across the coil faces. The condensate management C/Cs are configured in such a manner that the coil is still a blow through coil. As with other designs described herein, the various forms of condensate management fin designs can enhance condensate removal from the C/Cs. Air from the C/C discharge plenum enters a vertically oriented CRC (could be an angle-mounted CRC to further reduce the AHU profile) where the air is reheated using reclaimed chilled water return line energy. The CRC discharge plenum sends air into the system where a reheat coil or coils may be located for final conditioning of the air as may be required.

Figure 64:
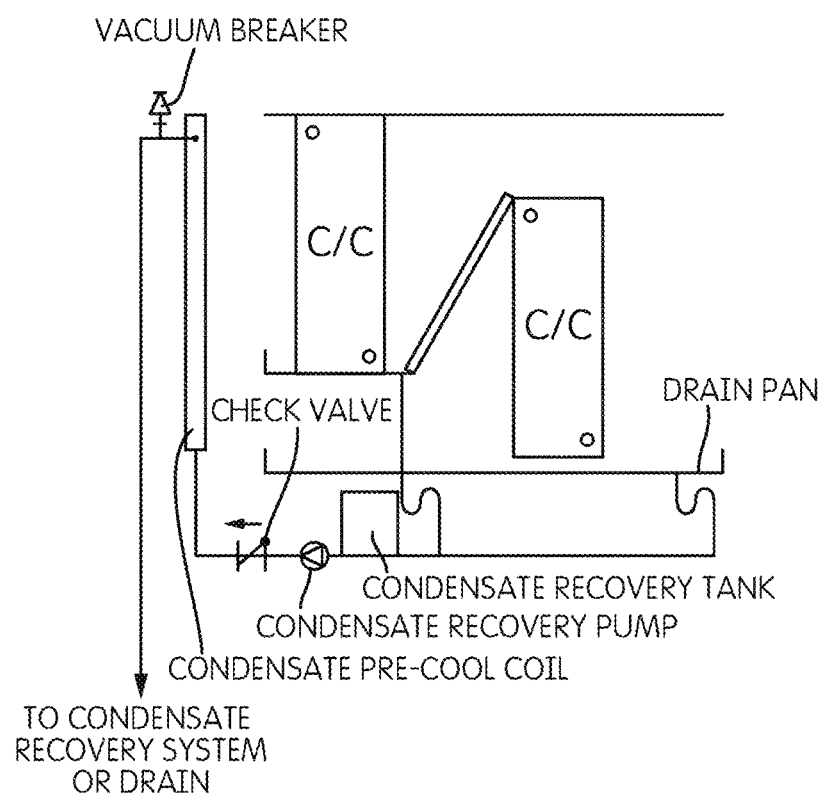

FIG. 64 is a variation of FIG. 63 that is effective such as where very high condensate removal requirements exist, or where there is the desire to reclaim the condensate for other uses. Natatoriums and indoor agriculture HVAC systems for crops such as Cannabis and Hemp, are samples of high condensate generation uses. Using the configuration shown in FIG. 64, a condensate recovery system is used to trap the condensate generated by the C/C or C/Cs. The condensate is gathered into a condensate recovery tank, located at each individual AHU, or gathered together into one tank from multiple AHU's or C/C systems. In the example depicted in FIG. 64, the condensate is being pumped out of the condensate recovery tank, using a condensate recovery pump that is controlled based on the level of fluid in the condensate recovery tank, into the PCC (Condensate Pre-Cool Coil). While in the PCC, the condensate, which can be at or below the actual supply air temperature receives heat from the airstream where the PCC is located. The PCC can be located remotely from the AHU, or co-located with the AHU, and serve to precondition the fresh air stream, the mixed air stream, the return air stream as deemed appropriate. For condensate recovery systems that incorporate a Reverse Osmosis (RO) membrane into the purification design, the ability of the PCC to add heat to the condensate can improve the ability of the RO membrane to function effectively, as warmer water can be processed more effectively than cold water.

As mentioned previously, if the design includes one, or more of the configurations shown in FIGS. 37-63 that drips condensate into the air stream, additional dehumidification and energy recovery occurs, in addition to the energy recovery described in FIG. 64.

The use of UVGI or other methods to kill/disable biological growth is described in various variations and may be used to reduce fouling inside the PCC if the UV light is directed at the CC and drain pan systems. Insulated piping may be used, as the temperature of the condensate will be below the dewpoint temperature of the air in many locations.

FIG. 65 is a variation of a condensate management system consistent with implementations of the current subject matter that utilizes variable heat transfer fin densities for different rows in the heat transfer coils. In the depiction shown, the air to be treated is entering on the left side of the coil, while the fluid used to remove heat from the air, contained within the coil tubing, enters the coil on the right side and the two fluid streams cross each other in a counter-flow direction for the heat exchange process. Rows with tighter (closer) fin spacing will have a higher fin surface temperature than rows that are built with fins that are spaced further apart. Rows that have tighter fin spacing have higher air pressure drops and are less able to condense moisture out of the air than rows with wider fin spacing. Rows with tighter fin spacing are better at treating sensible loads than rows with wider fin spacing, since they have more surface area to transfer heat between the air and the fins. The variation shown starts with tight fin spacing as the air enters the coil to pull sensible heat out of the air more effectively, and as the air is cooled down, and the need for moisture removal is increased, the fin spacing is widened out to create a more effective moisture removal coil. More air will "bypass" the fins as the fin spacing is widened out, so less sensible cooling overall will occur. Such configurations may maximize moisture removal, while minimizing sensible cooling loads.

The gaps between the heat transfer fins for the different fin densities allow the air pressure drop to equalize between the length and width and height, as well as allowing condensed moisture to find the least restrictive path to the drain pan.

FIG. 66 is a variation of FIG. 65 that uses two separate coil casings to house the different fin densities. The coils can be connected together, or separated as may be desired to allow more effective coil cleaning, or to have two sets of UVGI lights installed, one between the two coil banks, and one downstream from the second coil bank.

Figure 67:
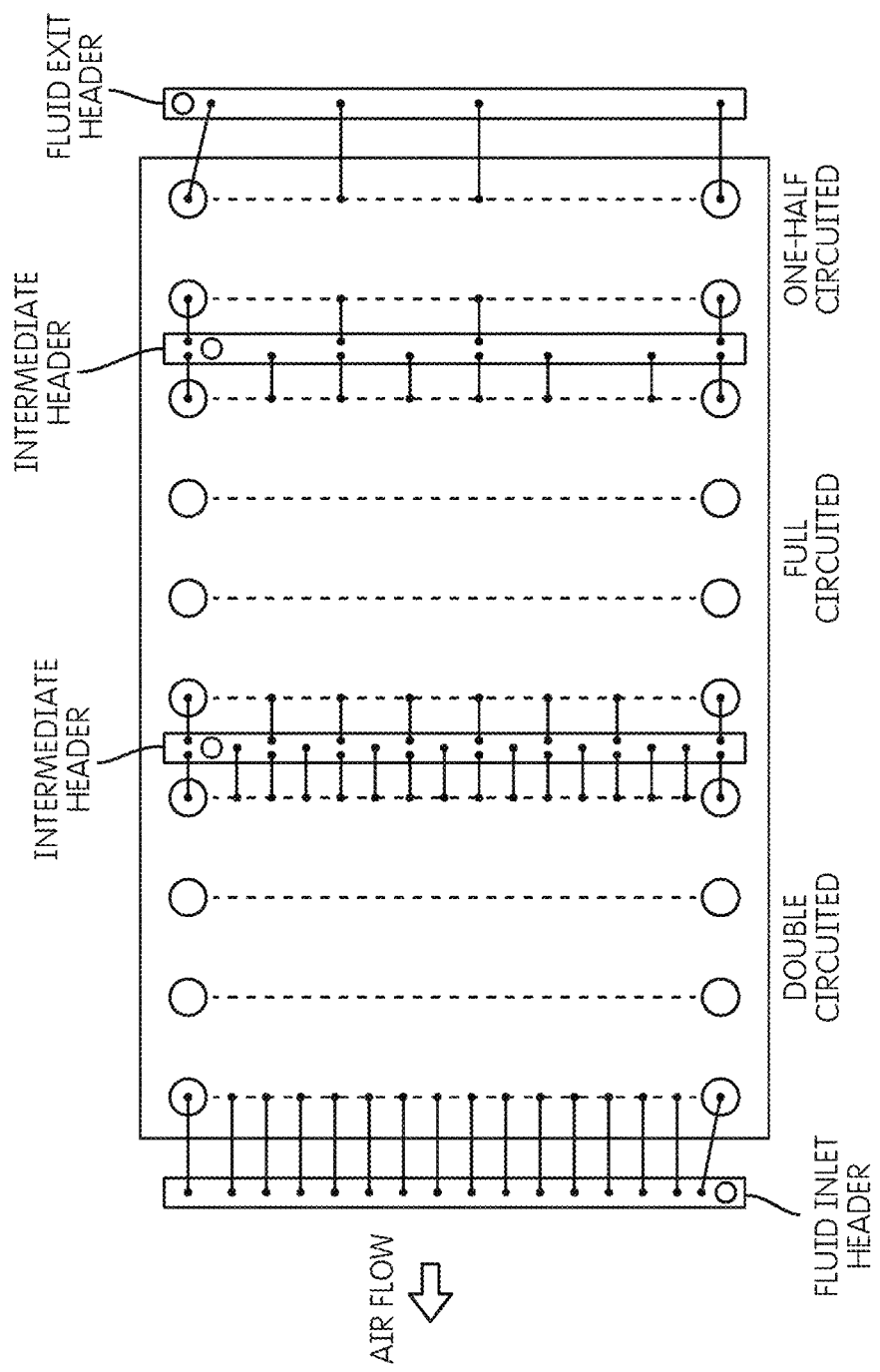
FIGS. 67-68 show example coil circuiting consistent with implementations of the current subject matter.

FIG. 67 shows an example of variable coil circuiting, consistent with implementations of the current subject matter, that optimizes heat transfer between the fluid contained inside the heat transfer tubing and the fluid, typically air, flowing through the finned surface of the coil. To enhance effectiveness, the approach temperatures need to be maximized. The best heat transfer efficiency would be if the fluid inside the coil was flowing fast enough that the inlet and outlet temperature were nearly identical. For a chilled water based cooling system, this may not be possible. Even using low chilled water system temperature differentials to improve the effectiveness at the coil creates very significant problems for the system—pipe and pump sizes can become enormous and costly to build and operate, chiller efficiency can be very poor and chiller and equipment wear can be accelerated. In the system depicted, to optimize dehumidification, the first rows are "double-circuited", which means that every tube in the first two rows of coil are fed directly from the supply header, so the coils and finned surfaces are at their coldest temperature. The coil circuiting then transitions to another circuiting variation, in this case it is shown as full circuited. This transition can most easily be accomplished by the use of an intermediate header that changes the number of tubes fed between the inlet side of the header and the outlet side of the header. Another transition is shown as being half-circuited, again using a header to change the number of tubes being fed. The coil circuiting can vary in numerous ways. The transition headers are shown to have piping connections to allow partially warmed up fluid to be withdrawn from the coil and used elsewhere.

Figure 68:
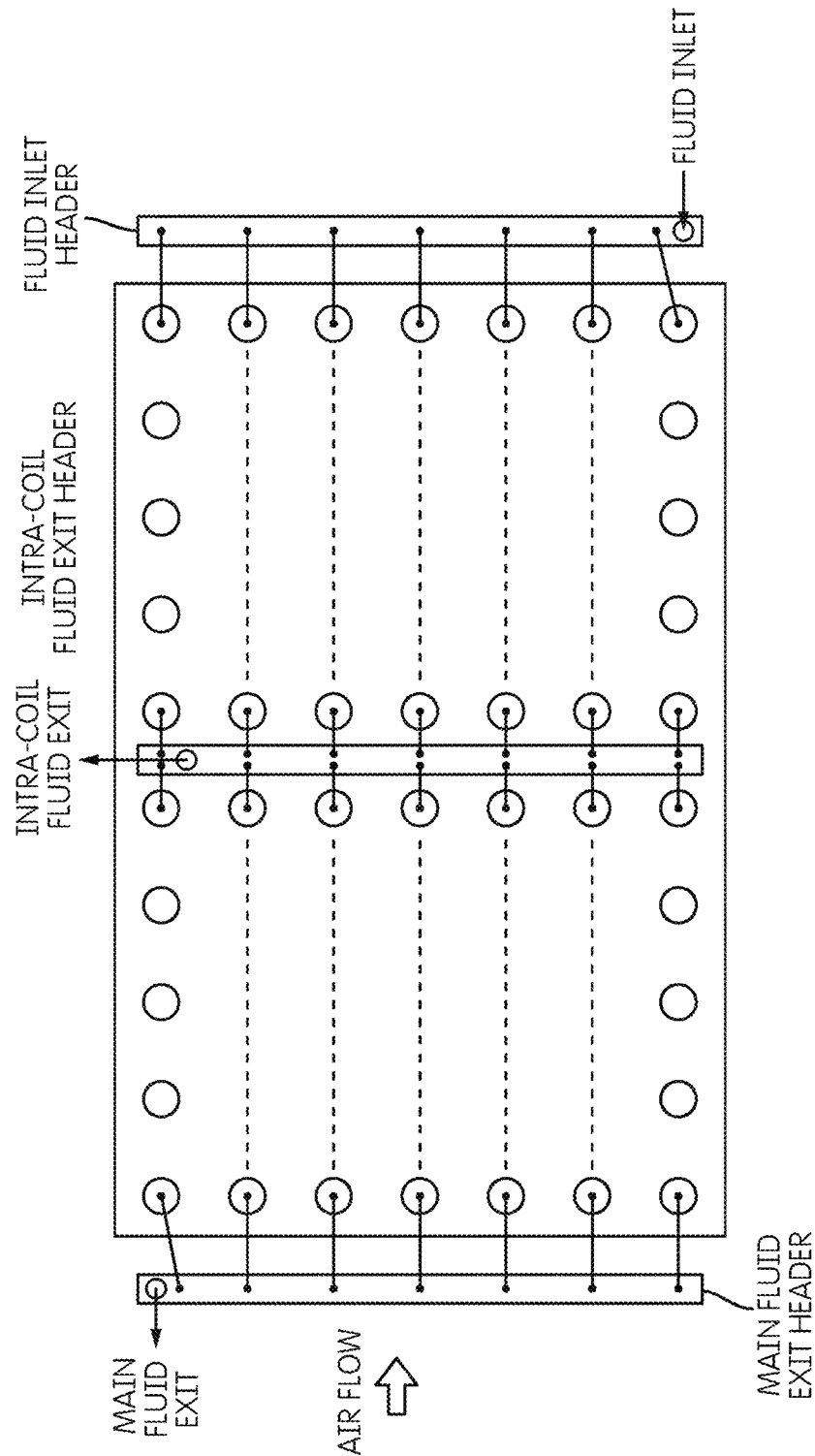

FIG. 68 is an example of the coil circuiting consistent with implementations of the current subject matter, using the same coil circuiting throughout the coil. It is shown with an intermediate header that is used to withdraw partially warmed up fluid from the coil bank for use elsewhere.

Figure 69:
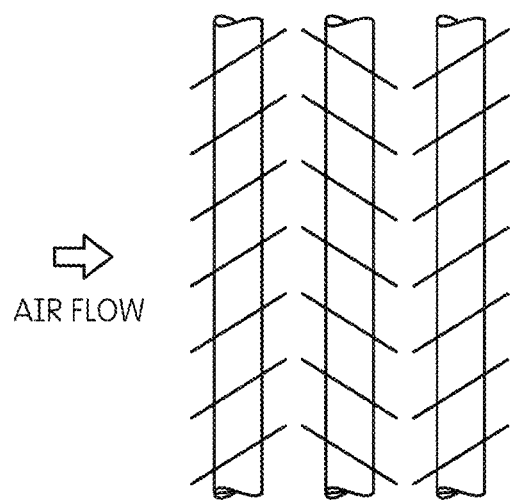
FIG. 69 shows an improved heat transfer fin design consistent with implementations of the current subject matter.

FIG. 69 shows an improved heat transfer fin design consistent with implementations of the current subject matter that increases the finned surface heat transfer area, and has air gaps between each row. The angle of approach between the fins can be varied to create more or less heat transfer area per row. For added surface area to provide more effective sensible cooling, the entering air side rows can have larger angles, to provide longer fins. For reduced surface area to provide more effective latent (moisture removal) cooling, the leaving air side rows can have narrower angles, to the point of being perpendicular to the airflow, to provide shorter fins. The angles between the entering and leaving side can have various angles/fin lengths, or the entire coil can have consistent angles between the fins as desired. Utilizing coils that have finned surfaces with angular approaches to the next row of coils increases turbulence and heat transfer effectiveness, especially at lower air velocities which can be typical of Variable Air Volume (VAV) air distribution systems.

Although a few embodiments have been described in detail above, other modifications are possible. Other embodiments may be within the scope of the following claims.

Referring to FIG. 24B, FIG. 24B depicts a block diagram illustrating a control system 300 consistent with implementations of the current subject matter. Referring to FIGS. 1-24A and 25A-69, the computing system 300 can be used to implement control systems for controlling one or more features of the AHUs and/or any components of the AHUs described herein.

As shown in FIG. 24B, the control system 300 can include a processor 310, a memory 320, a storage device 330, and input/output device 340. The processor 310, the memory 320, the storage device 330, and the input/output device 340 can be interconnected via a system bus 350. The processor 310 is capable of processing instructions for execution within the control system 300. Such executed instructions can implement one or more components of, for example, the AHUs described herein. In some example embodiments, the processor 310 can be a single-threaded processor. Alternatively, the processor 310 can be a multi-threaded processor. The processor 310 is capable of processing instructions stored in the memory 320 and/or on the storage device 330 to display graphical information for a user interface provided via the input/output device 340.

The memory 320 is a computer readable medium such as volatile or non-volatile that stores information within the control system 300. The memory 320 can store data structures representing configuration object databases, for example. The storage device 330 is capable of providing persistent storage for the control system 300. The storage device 330 can be a floppy disk device, a hard disk device, an optical disk device, a tape device, a solid-state device, and/or any other suitable persistent storage means. The input/output device 340 provides input/output operations for the control system 300. In some example embodiments, the input/output device 340 includes a keyboard and/or pointing device. In various implementations, the input/output device 340 includes a display unit for displaying graphical user interfaces.

According to some example embodiments, the input/output device 340 can provide input/output operations for a network device. For example, the input/output device 340 can include Ethernet ports or other networking ports to communicate with one or more wired and/or wireless networks (e.g., a local area network (LAN), a wide area network (WAN), the Internet).

In some example embodiments, the control system 300 can be used to execute various interactive computer software applications that can be used for organization, analysis and/or storage of data in various formats. Alternatively, the control system 300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 340. The user interface can be generated and presented to a user by the control system 300 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

FIGS. 1 through 20, 51 through 64 and 66 depict heat transfer coils separate from one another for clarity, and for inclusion of non-coil components in the figures. One skilled in the art would understand that some of these coils could be constructed with the cleaning enhancements and size reductions depicted in FIGS. 25B, 26B, 27B and 28B.

The invention claimed is:

1. A high efficiency dehumidification system for an air handling unit (AHU), the system comprising:
   a cooling coil including an inlet to receive chilled liquid at a first temperature from a cooling plant to cool and dehumidify air that passes over the cooling coil, and including an outlet to output spent chilled liquid at a second temperature, the second temperature being greater than the first temperature due to heat exchange from the air to the chilled liquid;
   a first fluid conduit including an input connected with the outlet of the cooling coil, the first fluid conduit further including an output junction comprising first and second outputs;
   a cooling recovery coil including an inlet connected with the first output of the output junction of the first fluid conduit to receive at least a portion of the spent chilled liquid at about the second temperature, and including an outlet to return the spent chilled liquid from the cooling recovery coil to the cooling plant, a remaining portion of the spent chilled liquid bypassing the cooling recovery coil via the second output of the output junction of the first fluid conduit and returning to the cooling plant;
   a second fluid conduit including at least one input connected with each of the first and second outputs of the output junction, the second fluid conduit further including an outlet to return the spent chilled liquid to the cooling plant; and
   a control mechanism on the second fluid conduit to control a flow rate of the spent chilled liquid that bypasses the cooling recovery coil to the cooling plant, based on at least a dewpoint temperature of the air, wherein the control mechanism provides a failsafe operation by at least increasing the amount of the remaining portion of the spent chilled liquid bypassing the cooling recovery coil when there is an increase in a flow rate of the at least the portion of the spent chilled liquid passing from the cooling coil to the cooling recovery coil, wherein the control mechanism increases the amount of the remaining portion of the spent chilled liquid bypassing the cooling recovery coil by at least opening the control mechanism, and wherein the at least the portion of the spent chilled liquid is circulated through the cooling recovery coil when the control mechanism is fully open.

2. The system of claim 1, wherein the control mechanism includes a control valve.

3. The system of claim 1, wherein the control mechanism includes a variable flow pump.

4. The system of claim 1, further comprising a manual bypass line valve between the second output of the first fluid conduit and the input of the second fluid conduit, to control an amount of the portion and the remaining portion of the spent chilled liquid entering the at least one input of the second fluid conduit.

5. The system of claim 1, further comprising a differential pressure control valve between the second output of the first fluid conduit and the at least one input of the second fluid conduit, to control an amount of the portion and the remaining portion of the spent chilled liquid entering the input of the second fluid conduit.

6. The system of claim 1, further comprising an automatic flow control valve between the second output of the first fluid conduit and the at least one input of the second fluid conduit, to control an amount of the portion and the remaining portion of the spent chilled liquid entering the input of the second fluid conduit.

7. The system of claim 1, further comprising a control system to evaluate input data representing one or more variables, and to determine one or more outputs to control the system to control the one or more variables.

8. The system of claim 1, further comprising a second cooling recovery coil comprising:
   an inlet configured to receive at least a portion of the spent chilled liquid from the first cooling recovery coil; and
   an outlet configured to return the spent chilled liquid from the second cooling recovery coil to the cooling plant.

9. The system of claim 8, further comprising a modulating control valve connected with the first and second outputs of the output junction, the modulating control valve configured to modulate an amount of the spent chilled liquid passing from the cooling recovery coil to control a temperature of air that passes over the second cooling recovery coil.

10. The system of claim 1, further comprising a preheat coil for preheating air passing over the preheat coil to the cooling coil.

11. The system of claim 1, further comprising a reheat coil for controlling a temperature of the air passing from the cooling recovery coil.

12. The system of claim 1, further comprising a control system configured to modulate the control mechanism to control an amount of the portion of the spent chilled liquid entering the cooling recovery coil and an amount of the remaining portion of the spent chilled liquid bypassing the cooling recovery coil and returning to the cooling plant.

13. A method of operating a high efficiency dehumidification system for an air handling unit (AHU), the high efficiency dehumidification system including a failsafe operation, the method comprising:
   receiving, via an inlet of a cooling coil, chilled liquid at a first temperature from a cooling plant to cool and dehumidify air that passes over the cooling coil,
   transmitting, via an outlet of the cooling coil through a first fluid conduit, spent chilled liquid at a second temperature, the second temperature being greater than the first temperature due to heat exchange from the air to the chilled liquid, wherein the first fluid conduit includes an input connected with the outlet of the cooling coil, and wherein the first fluid conduit further includes an output junction comprising first and second outputs;
   receiving, via an inlet of a cooling recovery coil that is connected with the first output of the output junction of the first fluid conduit, at least a portion of the spent chilled liquid at about the second temperature,
   returning, via an outlet of the cooling recovery coil, the spent chilled liquid from the cooling recovery coil to the cooling plant, a remaining portion of the spent chilled liquid bypassing the cooling recovery coil via the second output of the output junction of the first fluid conduit and returning to the cooling plant; and
   controlling, via a control mechanism connected with a second fluid conduit, a flow rate of the spent chilled liquid that bypasses the cooling recovery coil to the cooling plant, based at least in part on a dewpoint temperature of the air, wherein the controlling provides the failsafe operation by at least: increasing the amount of the remaining portion of the spent chilled liquid bypassing the cooling recovery coil when there is an increase in a flow rate of the at least the portion of the spent chilled liquid passing from the cooling coil to the cooling recovery coil, wherein the increasing the amount of the remaining portion of the spent chilled liquid bypassing the cooling recovery coil comprises opening the control mechanism, wherein the at least the portion of the spent chilled liquid is circulated through the cooling recovery coil when the control mechanism is fully open;

wherein the second fluid conduit comprises at least one input connected with each of the first and second outputs of the output junction, the second fluid conduit including an outlet to return the spent chilled liquid to the cooling plant.

14. The method of claim 13, further comprising controlling, via a manual bypass line valve, an amount of the portion and the remaining portion of the spent chilled liquid entering the at least one input of the second fluid conduit.

15. The method of claim 13, further comprising controlling, via a differential pressure control valve, an amount of the portion and the remaining portion of the spent chilled liquid entering the at least one input of the second fluid conduit.

16. The method of claim 13, further comprising controlling, via an automatic flow control valve, an amount of the portion and the remaining portion of the spent chilled liquid entering the at least one input of the second fluid conduit.

17. The method of claim 13, further comprising evaluating, via a control system, input data representing one or more variables, and to determine one or more outputs to control the system to control the one or more variables.

18. The method of claim 13, wherein the flow control valve is an automatic flow control valve.

19. The method of claim 13, further comprising:

receiving, via an inlet of a second cooling recovery coil, at least a portion of the spent chilled liquid from the first cooling recovery coil; and returning, via an outlet of the second cooling recovery coil, the spent chilled liquid from the second cooling recovery coil to the cooling plant.

20. The method of claim 19, further comprising modulating, via a variable flow pumping system connected with the first and second outputs of the output junction, an amount of the spent chilled liquid from the cooling recovery coil to control a temperature of air that passes over the second cooling recovery coil.

\* \* \* \* \*